US012792203B2

(12) United States Patent
Singh et al.

(10) Patent No.: US 12,792,203 B2
(45) **Date of Patent: *Nov. 10, 2026**

(54) SYSTEM AND GRAPHICAL USER INTERFACE FOR GENERATING CROSS-PLATFORM CONTENT IN A COLLABORATION PLATFORM

(71) Applicant: Atlassian Pty Ltd., Sydney (AU)

(72) Inventors: Abhinav Singh, Seattle, WA (US); Dhanraj Jadhav, Union City, CA (US); Emile Givental, San Francisco, CA (US); Heather Andrulis, New York, NY (US); Niraj Agarwal, Milpitas, CA (US); Peter Liang, Los Altos, CA (US); Stacy London, San Francisco, CA (US); Sathish Sugumaran, Sunnyvale, CA (US); Vivian Jacobitz, Omaha, NE (US)

(73) Assignee: ATLASSIAN PTY LTD., Sydney (AU)

( * ) Notice: Subject to any disclaimer, the term of this patent is extended or adjusted under 35 U.S.C. 154(b) by 214 days.

This patent is subject to a terminal disclaimer.

(21) Appl. No.: 18/622,683

(22) Filed: Mar. 29, 2024

(65) Prior Publication Data

US 2025/0110619 A1 Apr. 3, 2025

Related U.S. Application Data

(63) Continuation-in-part of application No. 18/374,598, filed on Sep. 28, 2023, now Pat. No. 12,499,162.

(51) Int. Cl.

*G06F 3/0484* (2022.01)
*G06F 3/0482* (2013.01)
*G11B 27/031* (2006.01)

(52) U.S. Cl.

CPC .......... *G06F 3/0484* (2013.01); *G06F 3/0482* (2013.01); *G11B 27/031* (2013.01)

(58) Field of Classification Search

CPC .... G06F 3/0484; G06F 3/0482; G11B 27/031
See application file for complete search history.

(56) References Cited

U.S. PATENT DOCUMENTS 11,734,501 B1 * 8/2023 Gui ....................... G06F 16/986 715/256

2023/0101588 A1 * 3/2023 Dasdan ................ G06F 40/134 715/234

OTHER PUBLICATIONS

Automatic video creation webpage (Year: 2020).*

* cited by examiner

*Primary Examiner* — Cao H Nguyen
(74) *Attorney, Agent, or Firm* — Fish & Richardson P.C.

(57) ABSTRACT

Embodiments are directed to system and processes for adding a video object to a content panel of a content collaboration system. The processes can include instantiating a client application displaying a graphical user interface having a content panel operating an editor configured to receive input from the client device and receiving a command to initiate creation of a video object. In response to receiving the command, the processes can invoke a video-creation service overlaying the interface and including a content region, a user video region showing a video preview of a user of the client device and a first selectable option configured to initiate a recording session for the video object. The system can initiate a recording session for the video object and cause display of the recoded video object in an editing interface. The video object can be added to the content panel of the content collaboration system.

20 Claims, 37 Drawing Sheets

SYSTEM AND GRAPHICAL USER INTERFACE FOR GENERATING CROSS-PLATFORM CONTENT IN A COLLABORATION PLATFORM

CROSS-REFERENCE TO RELATED APPLICATION(S)

This application is a continuation-in-part patent application of U.S. patent application Ser. No. 18/374,598, filed Sep. 28, 2023 and titled "System and Graphical User Interface for Generating Documents from Remote Content items," the disclosure of which is hereby incorporated herein by reference in its entirety.

TECHNICAL FIELD

The present disclosure is generally directed to a content collaboration system, and more particularly, to systems and methods for generating video objects from within the content collaboration system.

BACKGROUND

Modern electronic devices facilitate a myriad of uses, both for business and personal endeavors. For example, electronic devices like personal computers, tablets, and mobile phones, are used in both business and personal contexts for creating and storing documents, writing computer code, communicating with other individuals (e.g., via email, chat services, voice and video calls), and the like. Some modern enterprises use software systems to manage various digital items that are used for product development or other professional activities. For example, content collaboration systems may facilitate the creation, presentation, and management of user-generated documents.

SUMMARY

Embodiments are directed to methods for adding a video object in a content panel of a content collaboration system. The methods can include instantiating a client application on a client device, where the client application displays a graphical user interface having a content panel operating an editor configured to receive input from the client device. The methods can include receiving a command to initiate creation of a video object at the client application and in response to receiving the command, invoking a video-creation service that causes display of a video-creation interface overlaying the content panel. The video-creation interface can include a content region, and a user video region showing a video preview of a user of the client device, where the user video region is overlayed with the content region. The video-creation interface can also include a first selectable option configured to initiate a recording session for the video object. In response to detecting an input to the first selectable option, the methods can include initiating a recording session for the video object and the recording session can include a video recording of the user video region overlayed with the content region. In response to a command indicating an end of recording, the methods can include causing display of the video object in an editing interface. The editing interface can include a second selectable option to edit the video and a third selectable option to insert the video in a content page of the content collaboration system. In response to a user selection of the third selectable option, the methods can include adding the video object to the content panel.

Embodiments are also directed to a content collaboration system comprising a plurality of content collaboration pages and configured to cause a client computer to display a graphical user interface. The graphical user interface can include a content panel configured to display content of a selected content item and a navigational panel including a hierarchical element tree. The hierarchical element tree can include a plurality of hierarchically arranged selectable elements, and each respective selectable element is selectable to cause display of respective content associated with the respective selectable element in the content panel. In response to receiving a command, the system can be configured to invoke a video-insert service causing display of a video-selection window. The video-selection interface can include a test input region, a content service selection element and a results region that is configured to display a set of video objects obtained from a search query that is performed on an external video platform. The search query can be generated using text inputs received at the text input region and a content type indicated by the content service selection element. In response to receiving a selection of a particular video object of the set of video objects, the system can be configured to generate a collaboration page including the particular video object and cause a selectable element associated with the collaboration page to be displayed in the hierarchical element tree. In response to receiving a selection of the selectable element, the system can cause the collaboration page including the particular video object to be displayed on the client computer.

Embodiments can further include a content collaboration platform that includes a content collaboration backend application operating on one or more servers. The content collaboration backend application can be operably coupled to a frontend application operating on a client device. The content collaboration backend application can be configured to cause display of a graphical user interface on the frontend application operating on the client device, where the graphical user interface including a content-creation region. In response to receiving a command to initiate creation of a video object from a collaboration page managed by the content collaboration platform, the content collaboration backend can be configured to invoke a video-creation service causing display of a video-creation interface overlaying the content panel. The video-creation interface can include a content region having a user selected content object, a user video region showing a video preview of a user of the client device, where the user video region overlayed with the content region, and a first selectable option configured to initiate a recording session for the video object. In response to detecting an input to the first selectable option, the content collaboration backend can be configured to initiate a recording session for the video object, where the recording session comprises a video recording of the user video region overlayed with the content region. In response to a command indicating an end of recording, the content collaboration backend can be configured to add the video object to the collaboration page.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
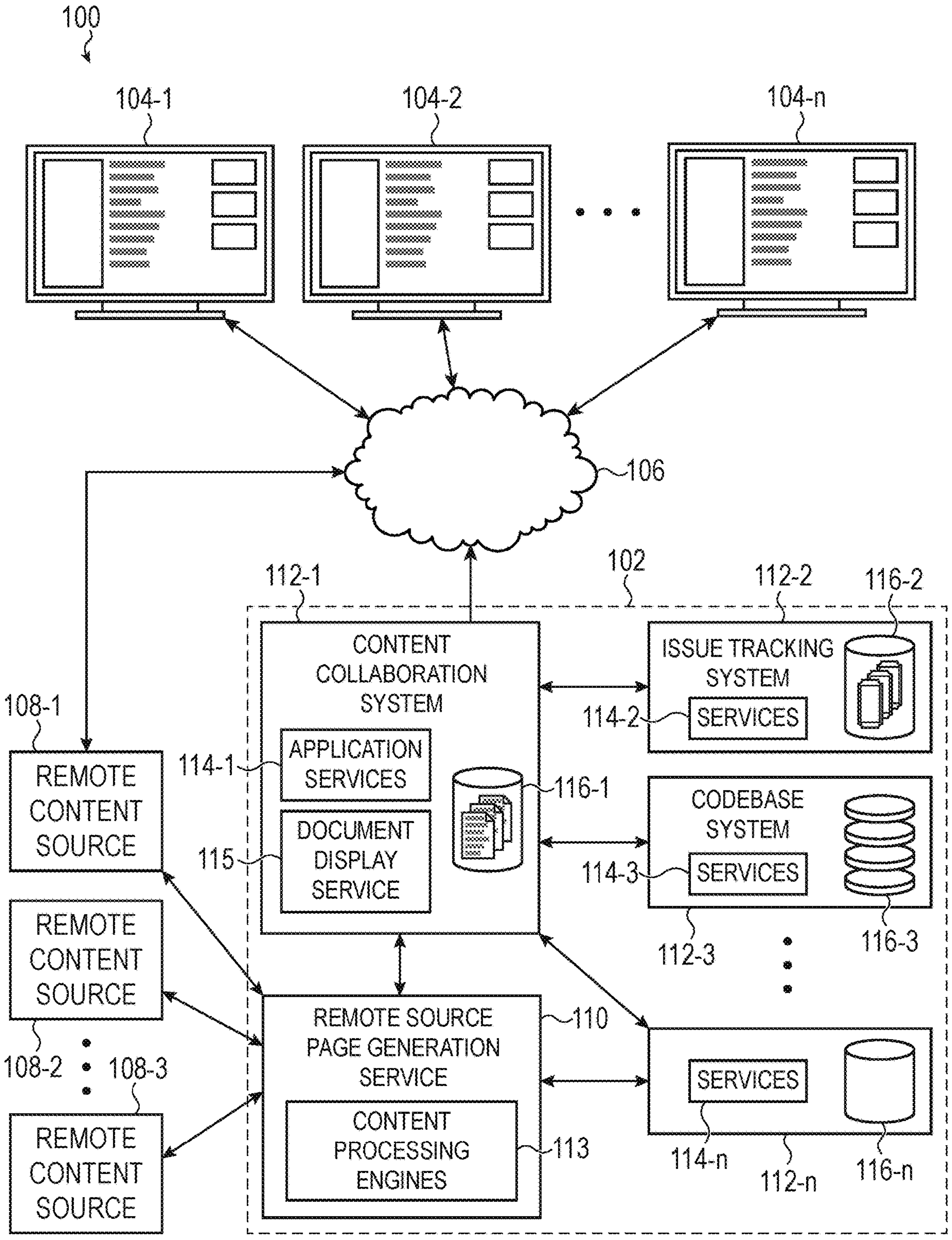
FIG. 1 depicts an example networked computer system in which various features of the present disclosure may be implemented.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION OF THE EMBODIMENTS

Embodiments described herein relate to content collaboration platforms and systems and in particular how such systems can integrate with, and/or embed content from or hosted by, other platforms.

Specifically, platforms that facilitate sharing of digital information or content between users accessing the platform and one or more non-users of the platform. Herein, a user of a platform may be referred to as an "authenticated user" and a non-user of a platform may be referred to as an "unauthenticated user." As with many systems, when unauthenticated users attempt to access a secure content item, the user will be presented with a blocking dialog indicating a permissions mismatch between the content and the user or that user's role.

In particular, embodiments described herein relate to sharing digital content in web-based collaboration platforms specifically configured to store confidential, private, or otherwise protected information (herein, generally "secure content"). For example, a content collaboration platform may be configured as a documentation platform by an organization to be used by its employees to memorialize, describe, and record completion of work. In these configurations, different teams of employees can create and modify digital content stored (and served) by the web-based platform so that other teams of employees can access and use that secure content at a later time.

As one example, a design team may leverage an organization's documentation platform to document product specifications while a developer group of the same organization tracks progress in implementing those specifications. In other cases, a documentation platform may be used to store and present company financial information, human resources or benefits information, trade secret information, and the like.

In this manner, collaboration platforms may be understood, generally and broadly, as software tools and services, typically used by an organization or enterprise, to create, store, modify, exchange, and present information internal to that organization. Such information is typically protected from external access by design; third parties should not have access to information or content internal to an organization.

More simply, only authenticated users are permitted to access secure content. Anonymous users are denied access to secure content, by design.

Although many conventional content collaboration platforms are intentionally designed with authentication and authorization systems and policies so as to prevent unauthorized external access, circumstances may exist in which an organization or an employee may benefit from embedding digital content external to the organization into internal content of the organization in a reduced friction manner that does not require internal users to consider permissions models of third-party content items and services.

As an example, it may be more convenient for an internal documentation to embed external documents, media, or pages. In this way, users of the documentation tool are not required to context switch to multiple platforms (some of which may be external) in order to review related or cross-informative content. In another example, it may be convenient for a web view of an internal file storage system to display internal files alongside external related files hosted by a third party system.

In other cases, an internal information technology service management system (ITSM) may benefit from organizing content from multiple third-party helpdesk platforms into a single user interface for an agent—in this example, the ITSM tool can display for an agent internal content (e.g., troubleshooting workflows, problem identification techniques, FAQs, internal policy documents) and external content (e.g., third-party software troubleshooting workflows, web searches, status of external tools/platforms, and the like).

Beyond convenience or a reduction in context switching, embedding third party content into first party content can include several information security benefits. For example, first party stored content that is particularly sensitive (e.g., financial data, information related to unreleased products, R&D information) may be associated with third party stored content that is likewise sensitive. Displaying this information in the same graphical user interface (e.g., a web view within a browser application or an embedded web view of a native application) can reduce password sharing or requirements for repeated authentication to the third party platform.

As one example, an organization is developing an unreleased new product. The features and functionality of the unreleased product are documented within a documentation tool, internal to the organization. However, it may also be useful to display media (e.g., photos, images, screen capture walk-throughs, and the like) embedded within related content of the documentation tool. In this way, the media can assist with comprehension of the content rendered in a page of the documentation tool and improve information sharing with new employees, new team members, vendors, consultants, and the like. In brief, it is often very useful to contextualize text content with rich media content. In some cases, however, the media may be stored by a media platform external to the organization. As may be appreciated by a person of skill in the art, the third-party hosted media may be more sensitive information than the text of the internal documentation tool.

In another example, an organization may present or summarize financial reports within a content collaboration platform used by that organization. For example, a documentation tool may be used to present a financial summary of the preceding quarter. In many cases, it may be desirable, within such a summary, to embed a digital copy of the underlying complete financial report. In many cases, such a financial report may be hosted by a third party service (e.g., financial software). In this example, the documentation tool may include an iFrame through which the digital copy of the underlying complete financial report is rendered. In this way, the summary document can conveniently also render a copy of the complete financial report.

However, in conventional systems, a third party service is likely to have a different permissions system that will block access to financial reports. It is often not trivial to synchronize users, accounts, roles, and permissions between two separate systems especially if those systems leverage different single sign-on services, different permissions models, and so on. Permissions synchronization may be particularly between across companies or permissions schemas.

As one example, unless users and roles are defined in two systems in substantially the same manner, synchronization of permissions requires a directory translation service or integration that must be both carefully designed, and well-maintained; risks associated with granting permissions to secure content incorrectly are extremely high, especially in respect of information regarding unreleased products or company financial data.

In many cases, due to the inherent risk in synchronizing or translating permissions schemas between first and third party platforms, organizations simply do not permit embedding of third-party secure content within first-party secure content. Instead, employees may be encouraged to embed a link to the third-party content, which may require a separate login. This experience is not frictionless, and as a result employees (and contractors and others with access to internal resources and tools) are often motivated to design around such policy-driven limitations.

For example, users of systems such as the above described example documentation tool often circumvent policy by creating local copies of third party secure content (in the preceding example, the financial report), and embed the copy instead into a first party tool. However, this technique is time-consuming for users, increases data storage requirements of the documentation tool, and more importantly, renders the copied content (e.g., financial report) stale as of any change made to the original content as stored in the third party software tool. Of course, stale financial data or other important business decision informative data can present challenges to decision makers of an organization.

Further, by copying the financial data/report, the user inherently creates additional vectors by which that information can be accessed by malicious actors. Phrased another way, by storing a copy of the third-party content, a user increases difficulty of ensuring appropriate permissions checks are executed each time the coped content is viewed. In sum, users that copy secure information in order to embed that information elsewhere introduce uncontrollable and potentially un-trackable risks that the copied information is disclosed unintentionally.

Additionally, these and related user behaviors to circumvent content sharing policies may introduce significant legal liability for organizations. For example, a human resources professional may desire to embed employee-tailored HR information into an internal page of an organization, so as to share that page with the employee. For example, an employee may have a question about medical coverage. In response, the HR employee may choose to prepare a document with detailed answers and links to or embeddings of documents relevant to the employee's question. Even if this page is shared only with the employee, any information or documents copied (for convenience) by the HR employee may be discoverable.

More specifically, as with the financial data example, the HR employee may be motivated to work-around information security policy, potentially copying information from a third-party HR tool that includes personally identifying information (PII), personal health information (PHI), or other identity, salary, or otherwise personal sensitive information. For example, an HR employee may be asked confidentially by another employee what substance abuse resources are available for employees.

As noted above, the HR employee may wish to create a custom, private, internal document with an embedded copy of the inquiring employee's health plan election information, so that the employee can have a convenient reference document. Information security policy may prevent the HR employee from creating such an embedding, which may result in the HR employee copying the document (which may include both health information, health choice information, personally identifying information, and/or substance abuse resource information) from the third-party HR tool.

By copying this information, the HR employee may unintentionally cause the information to be stored on the first-party documentation platform in a manner that is accessible to other employees, or worse, to those outside the organization. For example, the HR employee may leverage a personal or shared file storage allocation to store the document. Of course, handling of personal employee information in this irresponsible manner can expose significant liability for the employer. More broadly, it may be appreciated that aggressive information security policies, although well intentioned, can lead to significant liability for an organization if those policies encourage, either implicitly or explicitly, employees to find work-arounds.

Copying secure information so as to embed it or otherwise share it is not the only conventional work-around explored by employees of an organization. In other cases, users of systems such as documentation tools described above may opt to decrease or eliminate permissions within the third party tool such that an embedding of a third-party stored financial report in its real-time, current, form is possible within the documentation tool. As an example, a user of the documentation tool may create a "public sharing URL" as an option within the financial software. As may be appreciated, reducing or eliminating permissions for accessing financial data is not at all advisable.

Financial data, personal health information, and/or unreleased product information are merely examples. In other cases, third-party software platforms may host other data or secure content that employees may be motivated to embed into first-party content.

For example, a user of a documentation tool may prefer to embed a screen capture into a page of the documentation tool so as to demonstrate how to use a particular internal software product or how to complete a particular internal task (e.g., how to access HR systems to retrieve salary or paycheck information). In other cases, the screen capture may guide a viewer through features of an unreleased product. In many cases, the screen capture itself may be captured and/or hosted by a third party software tool.

In these examples, as with the financial reporting examples, a user of the documentation tool may prefer to and attempt to embed a recording into a page of the documentation tool through an iFrame. The user may encounter the same problem as described above. Specifically, either the user (1) copies the recording onto the documentation tool, straining both storage resources and loading times, or (2) reduces permissions at the screen capture third party tool such that live embedding is possible.

In the former circumstance, stale video data presents a problem, as does storage capacity. In the latter circumstance, accidental disclosure of confidential or trade secret information is possible if a URL anchored to the screen capture is discovered or inadvertently disclosed. In other cases, a screen capture can provide valuable information about a company's backend services to malicious third parties who obtain the screen capture. More simply, a malicious actor may find information detailing exactly how (and through what services or addresses) to access company financial data or employee identity information extremely valuable when mapping an attack surface of the organization.

These foregoing described security and efficiency challenges with embedding secure content stored by one platform into secure content of another platform tend to increase with the number of platforms licensed by a particular organization—the more software tools used by an organization, the more likely employees of the organization will find design-arounds, work-arounds, or other policy-flouting techniques that allow for co-rendering of related content, whether such co-rendering is via embedding, copying, or otherwise.

Broadly, it is often good policy (and convenient for users) to equip content collaboration platforms with well-designed features supporting external and/or public content sharing, despite that such platforms are conventionally designed specifically to prevent such access.

As noted above, some content collaboration systems permit ad hoc changing of global access permissions of a particular URL path so as to enable embedding of that content into secure content of another platform. This technique has many disadvantages, including exposing potentially many internal identifiers in URL arguments or path parts that can encourage or motivate attackers to attempt enumeration of services.

In addition, as URL structures change (or as domain names change, or subdomains are renamed), such shared URLs can break, reducing experience consistency. Further, this technique requires access to and control over the host content collaboration system; control of permissions or global URLs cannot be managed from the platform embedding the shared content.

Still other conventional software systems and platforms implement reduced-friction registration and sign-on for unauthenticated users, so that when content stored by that platform is embedded elsewhere, creation of new user accounts is not unreasonably inconvenient. More simply, some systems define reduced permissions user accounts and require anonymous users to register before sharing content.

Moreover, in many cases, anonymous users may be hesitant to share information such as email addresses or names to register a limited purpose account. In addition, collecting personally identifying information to facilitate creation of even limited-access accounts can expose an organization to data breach liabilities and/or data privacy concerns, introducing additional costs and data management expense.

For simplicity of description, the embodiments and examples that follow reference a documentation tool and a screen capture platform as examples of a first party secure content collaboration system and a third party secure content collaboration system, respectively. In these examples, the documentation tool may render pages via a frontend user interface that, in turn, may include screen capture content hosted by the screen capture platform. It may be appreciated, however, that this pairing of platforms is merely one example and the techniques, methods, and systems described herein can be leveraged to securely share content between may different types of first party, second party, and third party platforms.

To address these and other challenges associated with embedding secure content of one platform into secure content of a second platform, embodiments described herein include a permissions reference table, or association table, that can serve as a common directory between two different permissions schemas.

In particular, the association table can store associations between user accounts of a first platform with user groups of a second platform. In this manner, when content of the second platform is embedded into content of the first platform, the second platform may request of the first platform whether the user making the request is associated with the user group of the second platform. In response, the first platform can return an authentication token to the second platform indicating that the user is permitted to access the content.

For example, a first platform may be a documentation platform configured to render pages with user-generated content (including rich or otherwise formatted text, media, embedded links, and so on). A second platform may be a screen capture system. In this example, each platform can maintain different permissions systems and user directories. The schemas may not be inter-compatible.

Following this example, a user of the documentation platform may desire to embed content from the screen capture platform into a page/document of the documentation platform. The user may insert a link to a screen capture into a page, and thereafter may publish the page (or otherwise save the page in manner that permits the page to be accessible to other users within the organization).

On publication (or save) of the page, the documentation platform may request that the screen capture platform augment permissions of the screen capture. Specifically, the documentation platform may obtain a content identifier from the inserted URL and/or a content identifier associated with the page itself and submit a query to the screen capture platform to restrict permissions of the embedded screen capture. In response, the screen capture platform can be configured to create a user group identifier, a unique identifier specific to the recording, that can be returned back to the documentation platform. In some cases, the user group identifier can be generated by the screen capture platform based on the content identifier of the screen capture. In other cases, the screen capture platform may use the content identifier of the screen capture itself as the user group identifier.

In response the documentation platform creates an association within a database, such as within an association table between the page and the user group identifier. In this manner, the user group identifier serves as a by-reference permissions link between the permissions schema of the screen capture platform and the permissions schema of the documentation platform.

More specifically, a permissions association between the two systems is made such that when the page embedded with the screen capture is loaded (i.e., requested by a frontend), the screen capture platform receives an iframe-originating request that includes cookies and/or other header information associated with the parent page (e.g., the documentation platform). Generally and broadly, such information is associated to the user of the documentation platform and may be a user ID, a user account ID, a username, an email address, a JWT, or other similar data item unique to a user of the documentation system.

The screen capture platform receives this data item, and in combination with user group identifier(s) associated with the requested screen capture, sends an authentication request back to the documentation platform to determine whether the received data item is associated to at least one user group identifier associated with the requested screen capture. In response, the documentation system can process the authentication request by accessing the association table to determine whether an association exists between the data item and the user group identifier. In response to determining that an association exists, the documentation platform can return a token or similar string, certificate, or other suitable data to the screen capture platform to permit the screen capture platform to serve the requested media.

In a simpler and non-limiting phrasing, two separate platforms can be co-operated in a manner that respects permissions of both platforms. Simplistically, without limitation, a user of a first platform submits a request, via a particular page of the first platform, to view an asset of a second platform. The second platform receives a user-identifying data item, but because that data item is not associated with an account at the second platform, the second platform returns a request back to the first platform to ask whether the identified user has permission to access the requested media. In response, the first platform makes an authentication determination and returns a result back to the second platform. If the result includes a first indication that authentication succeeded, the screen capture is served to the iframe requester. Alternatively, if the result includes a second indication that authentication did not succeed, a message can be rendered for the user of the documentation platform that permission to access the media was denied.

In many embodiments, the user group identifier associated to a particular third party secure content item can be directly related to, duplicative of, or otherwise derived from a content identifier of content stored by the documentation platform. For example, in many cases, a documentation platform presents "pages" organized into "documents" or "spaces." Each page can include different content items of different types, including text, graphics, media, and the like. Each page (and parent data objects likewise) can include a content identifier unique to that page. In these examples, the content identifier of a page can be used to generate and/or used as the user group identifier of the screen capture platform. In this manner, permissions to view a screen capture are tied to permissions to view the page that embeds that content within the documentation platform.

In a simplistic, and nonlimiting, phrasing when a request is made of the screen capture platform to serve a particular recording, the screen capture platform asks the documentation platform "does this user ID have permission to access this page ID?" In response, the documentation platform can execute an ordinary permissions/authentication decision process (identical to, in many embodiments, a process executed to determine whether to load the page for the user in the first place). Presuming the user ID has permission to access the page ID (within the documentation platform), the documentation platform can return an indication to the screen capture platform that the media can be served. In this manner, access to the page in the documentation platform determines whether access is granted to a particular recording in the screen capture platform.

As may be appreciated, a single third-party platform content item (e.g., a single recording stored by a screen capture system) can be associated with multiple user group identifiers. In another phrasing, a single screen capture can be associated with two or more pages of a documentation platform, each page associated with a respective one user group identifier. In this manner, an administrator of the screen capture platform can revoke permissions for a particular recording, in respect of a particular page of the documentation system. Likewise, an administrator of the documentation platform (and/or any other person, user, or role having access and/or permissions to control or modify permissions on a page-by-page basis) can control whether a particular user or role is able to view a particular page, thereby controlling whether particular users have access to particular content stored in a third party system.

As noted above, a system as described herein can be configured to manage permissions across multiple platforms by associating access groups of one platform with access groups of another platform in an association table. For embodiments described herein, the documentation platform (i.e., the "host" platform that embeds content form a "secondary" platform) maintains and modifies the association table, but it may be appreciated that this is merely one example and is not limiting. In other cases, an association table as described herein can be maintained and/or managed by the secondary platform (e.g., a screen capture platform). In some constructions, multiple platforms can maintain association tables so as to associate user groups of one platform's directory service with user groups of another platform's directory service. For example, more than two systems can manage permissions as described herein. For example, a first system may store content that embeds content hosted by a second platform that, in turn, associates the embedded content with a user group identifier that is associated with user permissions managed by yet a third platform. In this example, the first, second, or third platforms may be tasked in different circumstances with validating different permissions and/or authentication decisions. Many constructions are possible.

As noted above, an advantage of these systems as described herein is that permissions can be controlled from both platforms by modifying respective user groups. Similarly, permissions can be expanded from a particular platform only in respect of the permissions scope of that particular platform. More specifically, an admin of the documentation platform can add users or roles to the permission of a particular page that embeds a particular screen capture, but by doing so, the admin does not effect where else the screen capture can be viewed. In another phrasing, the admin does not have permissions to effect other user groups associated within the screen capture platform to the screen capture. Likewise, an admin of the screen capture system cannot add users or roles to view a particular page of a documentation system. This inherent permissions scope limitation provides predictable control while enabling information security policies to be enforced and followed.

Further to the foregoing, many embodiments described herein relate to systems and techniques described herein are directed to a content collaboration system that allows users to create and publish electronic content using a client application.

In particular, the systems and techniques described herein may be applicable to content collaboration platforms that use a web browser client application to generate content creation and editing interfaces for creating electronic content, and also content viewing interfaces for viewing the electronic content. For example, a user may create a document, and then edit, view, share, or perform other operations on the document in the content collaboration system, and may publish the document for other users to do the same. The documents created within the content collaboration system are managed and/or stored by the content collaboration system, and may be formatted in a platform-specific structured data format that facilitates the creation, modification, and display of the documents.

As an example, some embodiments described herein include a graphical user interface for generating a screen recording/screen capture video object within a content collaboration system. It may be appreciated that a screen recording/screen capture video object—and more broadly a screen recording/screen capture video object as a content item—are merely one example. Many different objects and object types are contemplated herein. For simplicity of description, as noted above, many embodiments described herein reference an example in which a screen recording/screen capture video object such as a screen capture is embedded and/or otherwise rendered within a graphical user interface of another platform, such as a documentation system.

Continuing the preceding example, the graphical user interface can be provided by the frontend or client application may allow the user to create, edit, or otherwise modify user-generated content that is stored as an electronic document or page. The graphical user interface can have various partitions/sections displaying different content. For example, the graphical user interface can include a navigational panel, a toolbar, and a content panel.

The graphical user interface can be configured to receive one or more commands for adding a screen recording/screen capture video object to the content panel of the content collaboration system. The one or more commands may cause the content collaboration system to instantiate a video creation service that includes a video creation window for generating a screen recording/screen capture video object at the content collaboration system.

The video creation interface can include a content region, a control region, and user video region. The content region can be configured to include content that will be captured as part of a screen recording/screen capture video object. For example, the content region an include aspects of the graphical user interface such as a collaboration page displayed on a client device. The control region can include one or more options generating a screen recording/screen capture video object and may be a window that overlays the graphical user interface. The user video region can display a screen capture preview of a user of the client device that is captured by a selected video camera. The graphical user interface may include a real-time capture of user video (displayed in the user video region) and audio.

A screen recording/screen capture video object can be generated during a video during a recording session and added to the content panel of a collaboration document. In some cases, the content collaboration system can generate a new content object including the screen recording/screen capture video object. In some cases, the generation of the new content object also causes the content collaboration system to generate a selectable element corresponding to the new content object in the hierarchical element tree of the navigation panel.

In some embodiments the system can include a graphical user interface for generating a screen recording/screen capture video object that includes a selected content object from directly within a content page of a content collaboration system. For example, a user may be creating/editing a content page and an add a screen recording/screen capture video object that displays a different content object (e.g., collaboration page, issue tracking object and so on) and screen capture of a user directly to the current content page.

In some cases, the graphical user interface allows a screen recording/screen capture video object that has already been created to be added to the content panel. The graphical user interface can also be configured to add or create a video content object directly from a hierarchical content tree.

The graphical user interface can include tools for adding and displaying comments to a screen recording/screen capture video object embedded in a collaboration page. The graphical user interface may allow the user to create, edit, or otherwise modify user-generated comments that are associated with a screen recording/screen capture video object.

The native user-generated documents or pages of a content collaboration system may be organized in accordance with a hierarchical organizational structure. A graphical user interface of the content collaboration system may include a navigational panel in which a hierarchical element tree is displayed. The hierarchical element tree reflects the hierarchical organizational structure and facilitates visualization of the hierarchical organizational structure of the documents.

The hierarchical element tree may include a plurality of hierarchically arranged selectable elements. Each element may include a short summary, which may correspond to a document title or other metadata associated with the document, and may be selectable in order to cause content of the respective document to be displayed in an adjacent content panel. Each element of the hierarchical element tree or page tree may have a parent-child relationship to other elements of the tree, and the specific relationship or structure of the tree may be defined by a user.

While the content collaboration system facilitates the creation and presentation of documents that are managed by the content collaboration system, described herein are systems and techniques that allow users to create documents using content from external platforms (which may not otherwise be compatible with the content collaboration system) while also allowing users to manipulate, store, and view those documents within the content collaboration system. For example, a user can provide a link or address of a remote content item that is managed by an external platform.

The content collaboration system may include content processing engines that are configured to process the content (which may not be compatible with the content collaboration system) and generate a document or other data object that includes the remote content (or includes programmatic elements that cause the remote content to be retrieved and processed for display by the content collaboration system). The content collaboration system may allow the generated document or data object to be managed by a user in a manner similar to native documents (e.g., documents formatted in the platform-specific structured data format), such as allowing the generated document to be associated with a location in the hierarchical organizational structure of the documents, and to be moved within the hierarchical organizational structure. The content collaboration system may also allow users to modify certain aspects of the generated document (e.g., to add comments, change titles, etc.), while maintaining the remote content in the generated document. In some cases, modifications or changes made to the document in the content collaboration system may be pushed out to the external platform so that the remote content can be modified or updated accordingly.

To facilitate these operations, the content collaboration system may generate a document or other data object that includes references to the remote content and/or the external platform, but uses a platform-specific structured data format that allows the remote content (or a portion thereof) to be displayed and manipulated in the content collaboration system. These and other features of a content collaboration system are described herein. While certain example application environments are used to illustrate the features of the content collaboration system, these are provided for example purposes only.

These foregoing and other embodiments are discussed below with reference to FIGS. 1-19. The following examples are provided with respect to these figures for purposes of illustration and example and should not be construed as limiting the disclosure to the explicit examples depicted.

FIG. 1 depicts an example networked computer system 100 (or simply "system 100") in which the techniques described herein may be employed. The system 100 includes an application platform 102, remote or third party content sources 108 (108-1, . . . , 108-*n*), associated software applications 112 (e.g., 112-1, . . . , 112-*n*), and client devices 104 (104-1, . . . 104-*n*) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The application platform 102, also referred to herein as hosted services or host servers, may be or may include one or more servers, content stores (e.g., databases), communications systems, data structures, programs, or other components, systems, or subsystems that provide services described herein. The application platform 102 may also be referred to herein as hosted services, which may be provided by one or more host servers or other hardware elements of the system 100. The application platform 102 may include one or more software applications 112 (e.g., 112-1, . . . , 112-*n*), and a remote source page generation service 110. The one or more software applications 112 provide content and content services to users of the system 100, as described herein. For example, the content collaboration system 112-1 may allow users (e.g., via clients 104) to create, modify, view, and/or otherwise interact with system content, such as user-generated documents. The content collaboration system 112-1 may also allow users to create documents using content that is managed by external platforms. As described herein, in such cases, some portion or aspect of the remote content items remains managed by the external platforms, while a locally-managed document (formatted in accordance with a structured data format that is recognized by the content collaboration system 112-2) is managed by the content collaboration system 112-1.

The software applications 112 may include application services 114 (e.g., 114-1, . . . 114-*n*) and data stores 116 (e.g., 116-1, . . . , 116-*n*). Application services 114 may facilitate the creation, deletion, management, editing, serving, and/or other services related to the content and/or content items (e.g., documents) associated with that software application and stored in the data store 116. Data stores 116 may be databases or other data storage resources that store documents, content items, and/or other data related to a software application 112.

As described herein, the first software application 112-1 may be a content collaboration system or platform. The content collaboration system may allow users (e.g., via clients 104) to create, modify, view, and/or otherwise interact with system content. User-generated content (e.g., content created by or designated by system users) is generally organized in what is referred to herein as a document space (or simply a space). Generally, a document space includes a set of documents (or other content items) having a hierarchical relationship to each other as designated by (or reflected by) a hierarchical document or element tree. Document spaces may include other content including a calendar, a space home page or overview, a space calendar, and other space-specific content.

Document spaces may also include in-line comments, comment sections for each document or page, and other content that is adapted to receive and collect user feedback. Further, each document space designates at least one space administrator, which identifies a user account on the system having administrator authority and permissions. Specifically, a user account designated as a space administrator is granted the permission to set permissions for space-specific content including the set of documents (or pages), the set of blog entries, calendar entries, space overview, and other space content with respect to other system users. While there may be more than one space administrator, the authority to set permissions for a given space is generally not exceeded by another system user other than a tenant-level administrator or other special user account. In many cases, the space administrator is the creator or author of the document space.

The space content including electronic documents, electronic pages, blog posts, calendar entries and other content may be stored in the data store 116-1. User-generated content may include content such as text, images, graphics, tables, or the like. Documents may be linked or otherwise related to one another in a document hierarchy as designated by a hierarchical element tree (e.g., a document tree or a page tree). Documents (e.g., user-generated documents) may be stored in the data store 116-1 as discrete files, data structures, or other digital objects. The data store 116-1 may be a centralized or single physical data storage medium or, alternatively, may be distributed across physical memory managed by multiple devices.

The application services 114-1 of the content collaboration system 112-1 may facilitate content services related to the documents, including causing user interfaces of the content collaboration system 112-1 to be displayed to a user on a client 104, receiving user inputs relating to the creation and/or modification of documents, and the like. The application services 114-1 may also send to the remote source page generation service 110 information about page generation requests that are received, from a user, at the content collaboration system 112-1 and that reference content managed by external platforms.

The application services 114-1 may receive information from the remote source page generation service 110, such as renderable content and/or documents that are formatted in accordance with a platform-specific structured data format and that include content or references to content from the external platform. As used herein, the term "renderable" or "renderable content" may be used to refer to content having a format that the content collaboration system 112-1 can process to cause the content to be displayed in a graphical user interface of a frontend application for the content collaboration system 112-1.

The content collaboration system 112-1 may include a document display service 115. The document display service 115 of the content collaboration system 112-1 may receive or access content items, including user-generated documents, blog posts, calendar entries, or other renderable content, and render the content items in a content panel of a graphical user interface of the content collaboration system 112-1. As described herein, the remote source page generation service 110 may produce renderable content that can be rendered (or otherwise processed for rendering) by the document display service 115.

The document display service 115 may be configured to process content that is formatted in a platform-specific structured data format. For example, the document display service 115 may receive or retrieve a document or other content item that is formatted in the platform-specific structured data format, and generate, using the platform-specific structured data format, an output that can be rendered in the content panel of a GUI of the content collaboration system 112-1. The document display service 115 may ultimately provide the output to a browser or other application of a client 104 (via the application services 114-1 or other service of the content collaboration system 112-1) to cause the content of the document to be displayed to a user.

A second software application 112-2 may be an issue tracking system that tracks issues via issue tickets, which may be stored in the data store 116-2. Issue tickets may include content, such as a user-generated description of an issue, issue status (e.g., closed, open, awaiting review), user assignments, issue ticket urgency, issue ticket age, and the like. In some cases, issue tickets may include user-generated specifications of issues in computer code of software products.

Issue tickets (also referred to as "issues" or "tickets," separately) may be stored in the data store 116-2 as files, data structures, or the like. The application services 114-2 of the issue tracking system may facilitate content services related to the issue tickets, including causing user interfaces of the issue tracking system to be displayed to a user on a client 104, receiving user inputs relating to the creation and/or modification of issue tickets (e.g., changing status, receiving content related to the issue and/or issue resolution, etc.), changes to issue status, changes to user assignments, and the like.

A third software application 112-3 may be a codebase system that provides services related to creating, developing, maintaining, and/or deploying software code. The third software application may include, for example, a source code management system (SCM system), deployment management system, or other system configured to manage the storage, revision, and/or deployment of software products. Software code and other data associated with the third software application 112-3 may be stored in codebases 116-3. In some cases, code for distinct software programs, environments, platforms, or the like, may be stored in or as distinct codebases 116-3. Distinct codebases may be stored in different databases or data stores, or they may share one or more databases or data stores.

The application platform 102 may include one or more authorization services or authorization servers that are used to authenticate system users (accessing the system through client devices 104. Once authenticated, the users may be granted access to one or more of the respective software applications, platforms, and system content in accordance with a permissions scheme or profile stored with respect to each registered user account, which may be stored by or managed by a user profile database of the application platform 102.

Each application may have a discrete or separate authorization service or system or applications may share or leverage a common authorization service or server. In one example, the application platform 102 provides a unified authentication service by verifying access from a permitted user and pairing the verified user with a corresponding user account in one or more of the software platforms. As one non-limiting example, the authorization service or server may use a shared cookie/scheme to authenticate each user account on each software application or platform. As another non-limiting example, the authorization service or server may authenticate users with a single sign-on service (SSO) and/or a two-factor authentication (2FA) service.

One or more remote (e.g., third party) content sources 108 may manage and/or store remote content items. Remote content sources 108 are or include external platforms that are separate from the application platform 102. For example, remote content sources 108 may include websites, other application platforms, remote data sources, SAAS entities, or the like. The remote content sources 108 may manage, store, or otherwise provide content items that are not in the platform-specific structured data format.

The remote source page generation service 110 may receive, from the content collaboration system 112-1, page generation requests that are received, from a user via a graphical user interface of the content collaboration system 112-1. The page generation requests may be or may include a reference to an external platform, such as remote content sources 108. In some cases, the reference is or includes a uniform resource locator of the remote content source or of a content item managed by the remote content source. The remote source page generation service 110 includes content processing engines 113, which are configured to process content from remote content items associated with external platforms and generate renderable content that is formatted in accordance with the platform-specific structured data format. Multiple content processing engines 113 may be provided, with each engine configured to process particular types of content.

In some cases, a processing engine may be configured to process content of a particular type, or content from a particular external platform. For example, one processing engine may be configured to process content of a particular file type (e.g., a spreadsheet, a database, a video file, etc.), while another processing engine may be configured to process content from a particular external platform (e.g., a media-hosting website, a codebase service, a particular data storage service, etc.).

Processing engines may be provided for various different external platforms and non-native content items (e.g., content items that are not formatted in the platform-specific structured data format or otherwise renderable by the content collaboration system 112-1). For example, a first processing engine may be configured to process content from a remote media hosting service, and a second processing engine may be configured to process content from a remote news or article hosting service.

Each processing engine may be configured to process the content to identify content elements of the remote content items. Content elements may include, without limitation, text, videos, images, advertisements, user comments, data fields, and the like. The processing engines may determine or select content elements to be included in a native document for presentation in the content collaboration system 112-1. For example, if a website (e.g., a remote content item) of a video hosting website (e.g., an external platform) has a video, a title, an advertisement, and a set of user comments, the processing engine for that particular external platform may be configured to identify the multimedia, title, and set of user comments, and incorporate those content elements into a document or other renderable content of the content collaboration system 112-1 (while omitting the advertisement and/or other content elements that are not to be imported). Analyzing the content may include operations such as parsing, textual analysis, keyword searching, natural language processing, etc. In some cases, analyzing the content may include performing such operations on one or more data structures, files, websites, or the like. In the case of a website, analyzing the content may include accessing and analyzing an HTML file.

As noted above, the content of the external platform may not be in a format that is renderable by the content collaboration system 112-1. Accordingly, the processing engines may convert the processed content to renderable content that is formatted in accordance with the platform-specific structured data format. In some cases, the renderable content may include addresses (e.g., uniform resource locators (URLs)) of content elements (e.g., files, media sources, etc.) that were identified in the remote content item. Such addresses may be included in the platform-specific structured data format to allow such content elements to be rendered and generally managed by the content collaboration system 112-1 as native documents.

The processing engines may map certain types of content or content elements to particular positions or fields of a locally managed document. For example, if a page generation request includes an address of a website that includes video content, the processing engine may identify a title of the multimedia and the multimedia itself, and may generate renderable content (in the platform-specific structured data format) that results in the multimedia being displayed in the center of the document, with the title centered over the multimedia.

The particular manner in which remote content is ultimately formatted and presented in the local document may be fixed by the processing engines (e.g., such that all content items of a certain type from a certain external platform are presented uniformly). As another example, the processing engines may be configured to determine a manner in which the content appears on the external platform, and format the renderable content to reflect the source appearance (e.g., fonts, content alignment, content size, position on a document or page, etc., may be partially or fully retained).

In some cases, the remote source page generation service 110 may also receive and process requests to create documents or other renderable content from content managed by other software applications 112 within the application platform 102. For example, a document creation request may request creation of a document (that is renderable in the content collaboration system 112-1) based on an issue in the issue tracking system 112-2. In response to receiving such a request, the remote source page generation service 110 may determine an appropriate content processing engine for the target content (e.g., an issue record), and the selected engine may process the target content to produce renderable content. Similarly, a document creation request may request creation of a document (that is renderable in the content collaboration system 112-1) based on a codebase in the codebase system 112-3.

In response to receiving such a request, the remote source page generation service 110 may determine an appropriate content processing engine for the target content (e.g., a codebase), and the selected engine may process the target content to produce renderable content. For other applications 112 within the application platform, the content items may include content that is already in the platform-specific structured data format. In such cases, the renderable content may incorporated directly into a document for display in the GUI of the content collaboration system 112-1. In some cases, content from the content items of the other applications 112 are incorporated into a template or otherwise formatted differently when they are displayed in the GUI of the content collaboration system 112-1 as compared to when they are displayed in a GUI of their native application 112.

The remote source page generation service 110 may select a content processing engine from the set of content processing engines 113 based on information contained in a document creation request received from the content collaboration system 112-1. For example, the document creation request may include an address (e.g., a URL) of the remote content item. The remote source page generation service 110 may determine, based on the address (e.g., a domain or other information in the address), an identity of the external platform that manages the content item, and may select a content processing engine based on the external platform. For example, if the address indicates that the remote content item to be analyzed is associated with a video hosting web service, the remote source page generation service 110 may select an engine that is configured to process web pages that are hosted by that video hosting web service. As another example, if the address indicates that the content item is associated with a blog, the remote source page generation service 110 may select an engine that is configured to process web pages that are hosted by that blog.

In some cases, the remote source page generation service 110 may determine the external platform by other techniques. For example, the document creation request may include an identifier of the external platform separate from the address. The identifier may have been supplied by a user who initiated the document creation request (e.g., via direct entry, selecting from a list of candidate platforms, etc.).

Each engine may be uniquely configured to process content of a certain type in a certain way. Continuing the examples above, if the remote content item that is the subject of a document creation request is a website that includes streaming video content, the engine for analyzing that content/external platform may be configured to identify and retrieve a video source address from the website. If the remote content item is a blog, the engine for that content/external platform may be configured to identify and retrieve a blog post. If the remote content item is a news website, the engine for that content/external platform may be configured to identify and retrieve textual news content, associated images, a publication date, a news outlet identifier, and an author.

In some cases, if a content processing engine is not available for a particular type of content item, the remote source page generation service 110 selects a generic content processing engine. The generic content processing engine may attempt to identify relevant content elements of the remote content item using content classification and/or identification techniques. For example, the generic content processing engine may analyze the content to identify media elements (e.g., video, images, audio), titles, headers, authors, or other salient information. If any such information is found in the content, the remote source page generation service 110 may incorporate any of those components into the renderable content for display by the content collaboration system 112-1.

In one example implementation, a content processing engine may analyze or process remote content items by parsing the content, analyzing the structure, formatting, and content types of the content to define a series of content nodes. The content nodes may correspond to blocks of text, formatted region, comments or user feedback content, images, embedded videos, or other content elements identifiable in the remote content item. The content processing engine may process each of the content nodes using a respective node processor or node conversion tool. For example, a text block node may be analyzed to extract the text content, font parameters, formatting, and other attributes of the extracted content and corresponding font parameters, and formatting attributes in the native or platform-specific format may be identified and used to construct a platform-specific node. Each node may use a different or respective node processor or conversion tool that is selected in accordance with the type of node that is being processed. The renderable content may be generated using the newly created nodes that have been generated using a compatible or native format with respect to the content collaboration system.

Once the remote source page generation service 110 processes content from an external platform (including producing renderable content formatted in the platform-specific structured data format), it may generate and store a document or other data object in the data store 116-1. The document may contain the renderable content formatted in the platform-specific structured data format, and a representation of the document (e.g., a title of the document) may be displayed as an element in the hierarchical element tree of the GUI of the content collaboration system 112-1. As described herein, a user may manipulate the element in the hierarchical element tree in order to change the position of the document in the hierarchy.

In some cases, instead of generating and storing a document formatted in the platform-specific structured data format in response to a document creation request, a data object that will initiate the processing of a remote content item may be generated. A selectable element that corresponds to the data object may be displayed in the hierarchical element tree and manipulated in the same manner as other elements in the hierarchical element tree. Upon selection of the selectable element, the remote source page generation service 110 may perform the operations described herein to process a remote content item and produce renderable content formatted in the platform-specific structured data format. Thus, selection of the selectable element may initiate or cause a document generation request (which may be issued to the remote source page generation service 110 to initiate the operations of producing renderable content from or using the remote content item).

In some cases, a hybrid technique is used, in which the remote source page generation service 110 generates (and causes to be stored) a document that includes renderable content in the platform-specific structured data format, as well as instructions that will cause the remote source page generation service 110 to produce renderable content upon receiving a selection to display the document. Thus, upon receiving a selection of a selectable element that corresponds to such a document, the content collaboration system 112-1 may cause the previously-generated renderable content to be displayed in a GUI, and may cause the remote source page generation service 110 to produce additional renderable content (e.g., in real time) using the processing operations described herein, which may then be displayed in conjunction with the previously-generated renderable content.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
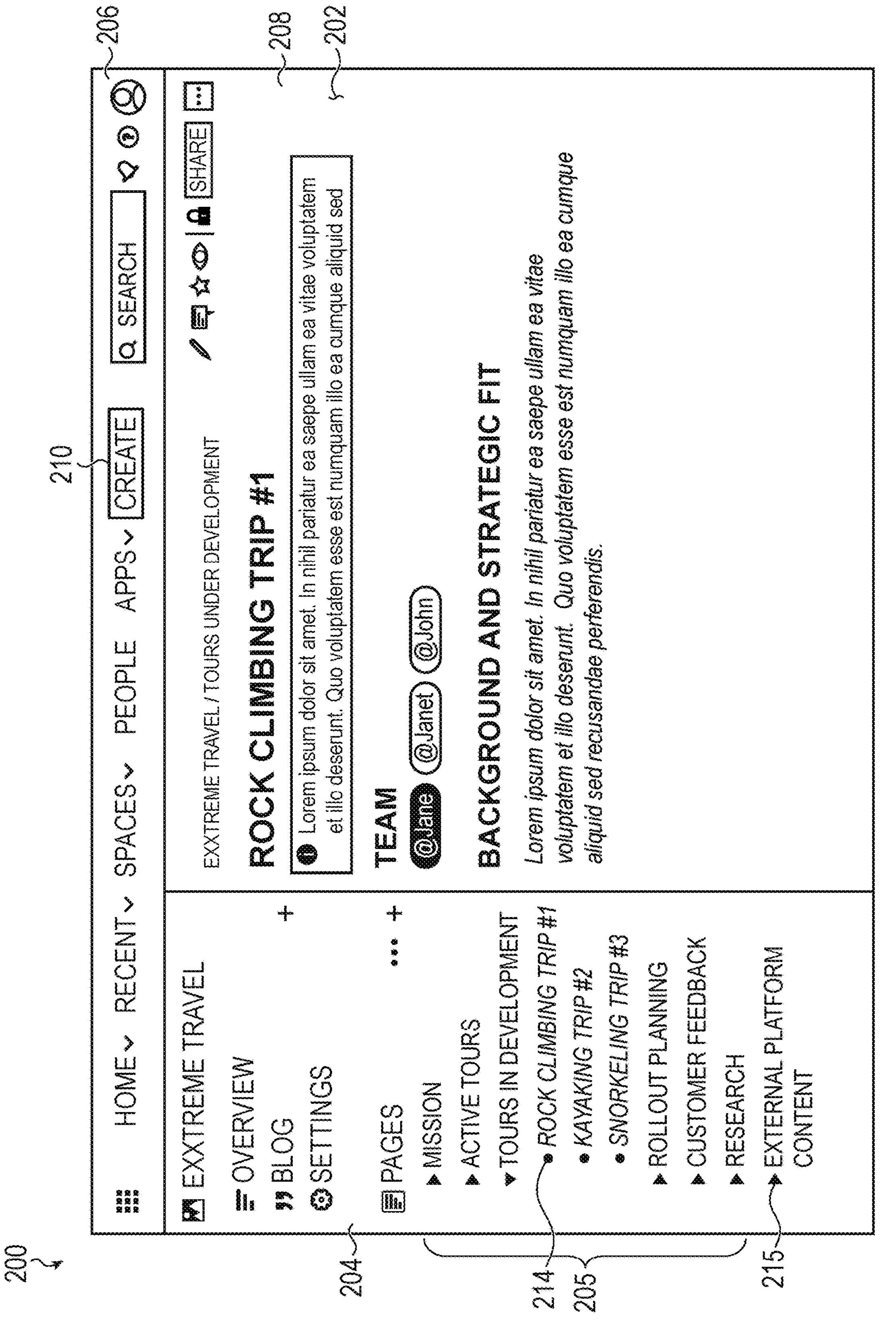
FIG. 2A depicts an example graphical user interface of a software application.
Figure 2B:
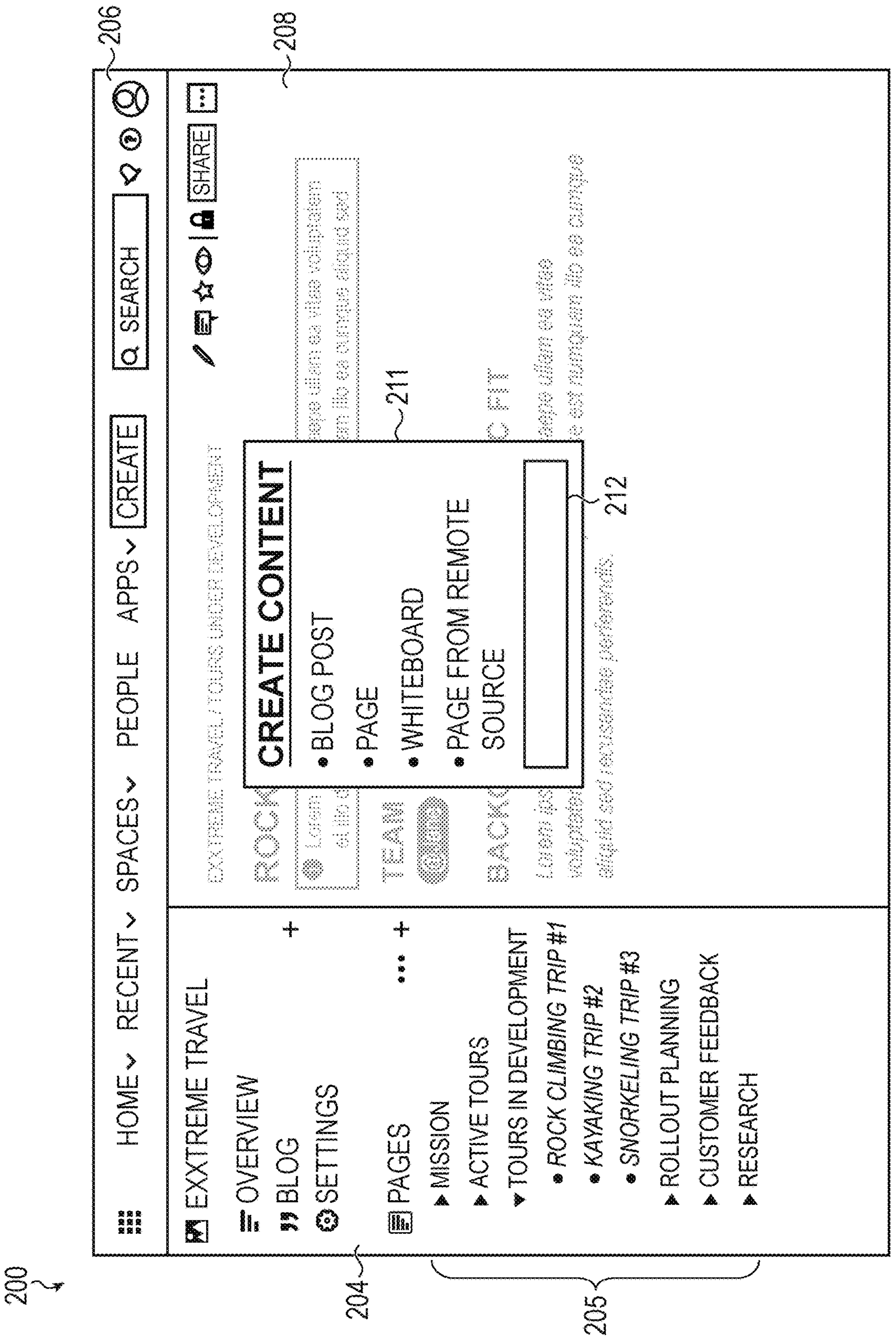
FIGS. 2B-2C depict document creation request operations in an example graphical user interface of a software application.
Figure 2C:
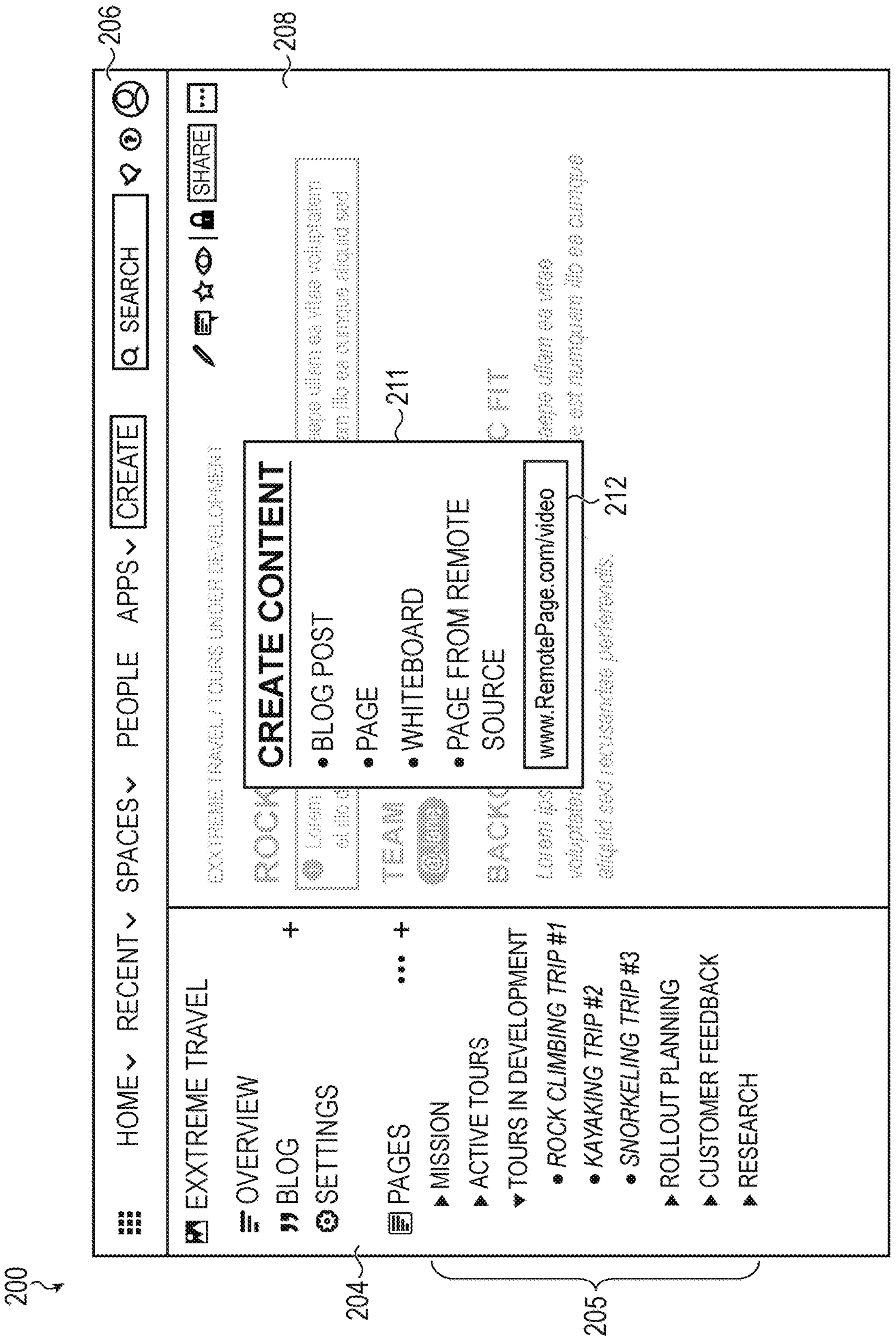

FIGS. 2A-2C depict example views of a graphical user interface or a frontend application executing on a client device of a user. The graphical user interface 200 provided by the frontend or client application may operate in one of a number of different modes. In a first mode, a user may create, edit or modify an electronic document, page, or electronic content.

This mode or state of the graphical user interface may be referred to as an editor user interface, content-edit user interface, a page-edit user interface, or document-edit user interface. In a second or other mode, the user may view, search, comment on, or share the electronic document, page, or electronic content. This mode or state of the graphical user interface may be referred to as an viewer user interface, content-view user interface, a page-view user interface, or document-view user interface. The graphical user interface may be implemented in a web browser client application using HTML, JavaScript, or other web-enabled protocol.

The graphical user interface may allow the user to create, edit, or otherwise modify user-generated content that is stored as an electronic document or page (e.g., in the data store 116-1 of the content collaboration system 112-1). The examples in FIGS. 2A-2C depict a graphical user interface in a viewer mode. For example, a graphical user interface 200 shown in FIG. 2A is a rendering of an electronic document, page, or electronic content in a graphical user interface 200. The electronic document, page, or electronic content may be rendered on a client device by the content collaboration system 112-1. In one example, the graphical user interface 200 may have various partitions/sections displaying different content. For example, the graphical user interface 200 may include a navigational panel 204, a toolbar 206, and a content panel 208.

The content panel 208 may display the contents of a selected document or other content item, and may allow a user to edit the selected document or content item (e.g., to add, change, or remove content). In general, when an authenticated user has edit permissions with respect to the displayed content and the graphical user interface is in an edit mode (rather than a view mode), the content panel 208 may operate as a content editor and allow the user to directly add, edit, modify, or otherwise interact with the content of the document or content item. When a user does not have edit permissions, or when the content panel 208 is otherwise in a view mode, rather than an edit mode, the document or content item may be displayed in a view-only mode, or with only limited ability to add, edit, or otherwise modify the content.

The navigational panel 204 may include a hierarchical element tree 205 (also referred to herein as a page tree), which may be associated with a particular document space or content space. The hierarchical element tree 205 includes tree elements, which may be selectable to cause display of a corresponding page or document. Tree elements may also be referred to herein as selectable elements. Each tree element shown in the navigational panel 204 may be displayed according to its respective hierarchical relationship to the current electronic document, page, or electronic content being displayed. Further, each tree element for the hierarchical element tree 205 may be selectable. In response to a user selection of a respective element of the hierarchical element tree 205, content of the respective page or document may be displayed in the content panel 208. As described above, a selectable element in the hierarchical element tree 205 may correspond to a user-generated document (e.g., element 214), a document that is generated by the remote source page generation service 110 (and includes renderable content produced by a content processing engine), or a data structure that will cause the remote source page generation service 110 to produce renderable content from a content item of an external platform. Tree element 215, for example, corresponds to external platform content (e.g., a document or data structure that will cause display of renderable content that originated at an external platform). In some cases, the selectable elements themselves do not indicate which type of document or data structure it corresponds to, while in other cases, the selectable elements include a graphical, textual, or other indicator to indicate the type and/or source of a document (e.g., an icon may indicate whether the document is a native document, or generated from an external platform). As described above, selectable elements in the hierarchical element tree may be manipulatable in the hierarchical element tree in the same manner, regardless of the source of the document. Thus, a selectable element that corresponds to a document produced by the remote source page generation service 110 may be manipulatable within the tree in the same manner as a native document.

The navigational panel 204 also includes items that may be selected in order to cause display of other user-generated content that is outside of the hierarchical element tree 205. Specifically, the navigational panel 204 includes an overview element that is selectable to cause display of space-overview content in the content panel 208, a blog element that is selectable to cause display of one or more respective blog entries in the content panel 208, and a settings element that can be used to access setting associated with the current page being viewed and/or the document space. In some cases, display of the navigational panel 204 may suppressed or hidden using a control provided in the graphical user interface 200. Additionally or alternatively, the navigational panel 204 may be resized or slid all the way to the side of the graphical user interface in order to hide or suppress display of the navigational panel 204.

The page toolbar 206 may provide, to a user, various control options, including but not limited to, set or configure various restrictions for the electronic document, page, or electronic content that the user is creating/editing, to view or review recently accessed electronic documents. The page toolbar 206 may also include a search or query space for the user to enter one or more keywords to perform search for electronic documents, pages, or electronic content that may be related to the one or more keywords entered by the user. The page toolbar 206 may also include options for selecting a different document space, view recently viewed documents or pages, view people associated with the system or respective content, navigate or launch other applications, or view other aspects of the system. The page toolbar 206 may include a content create element 210 for initiating the creation of content items in the content collaboration system 112-1.

FIG. 2B illustrates the graphical user interface 200 after a user selection (e.g., a mouse click) of the content create element 210. For example, in response to detecting the selection of the element 210, a content create menu 211 is displayed. The content create menu 211 may include a list of content item types that may be created (e.g., Blog Post, Page, Whiteboard, and Page From Remote Source). Upon receiving a selection of a content item type, the content collaboration system 112-1 may initiate a content creation operation for that content type. While the content create menu 211 lists some example options, these are merely for example purposes, and are not limiting. Other types of content item types may be included, such as computer code files, issues (e.g., of an issue tracking system), emails, messages, etc.

The “Page From Remote Source” option is configured such that, upon selection of the element and provision of a link, address, or other identifier of a remote content item, the content collaboration system 112-1 initiates one or more operations for generating renderable content (and optionally a document or other data structure) from a remote content item managed by an external platform, as described herein. In some cases, a selection of the “Page From Remote Source” option and the provision of an address to a remote content item corresponds to (or otherwise causes the content collaboration system 112-1 to receive) a document creation request. Thus, the document creation request received or detected by the content collaboration system 112-1 includes an address to a remote content item.

The “Page From Remote Source” option may include or be displayed in conjunction with an input field 212. The input field 212 may be configured to receive an address or other identifier of the remote content item. The address may be input manually, by pasting the text of the address into the field 212, by dragging a browser window or tab directly into the field 212 (or anywhere in the content create menu 211), or by any other suitable technique. Upon receipt of the selection and/or provision of the address, the content collaboration system 112-1 may proceed with the operations to generate renderable content from the external platform.

FIG. 2C illustrates the content create menu 211 with an address having been input into the field 212. The address may be a URL or other identifier of a content item that is managed by an external platform and that does not include content in the platform-specific structured data format of the content collaboration system 112-1. In this example, the URL (“www.remotepage.com/video”) is an address of a web page that is managed by an external platform (e.g., other than the content collaboration system 112-1), and that includes video content. In other examples, other types of pages, content items, data sources, etc., may be referenced by the address.

Figure 2D:
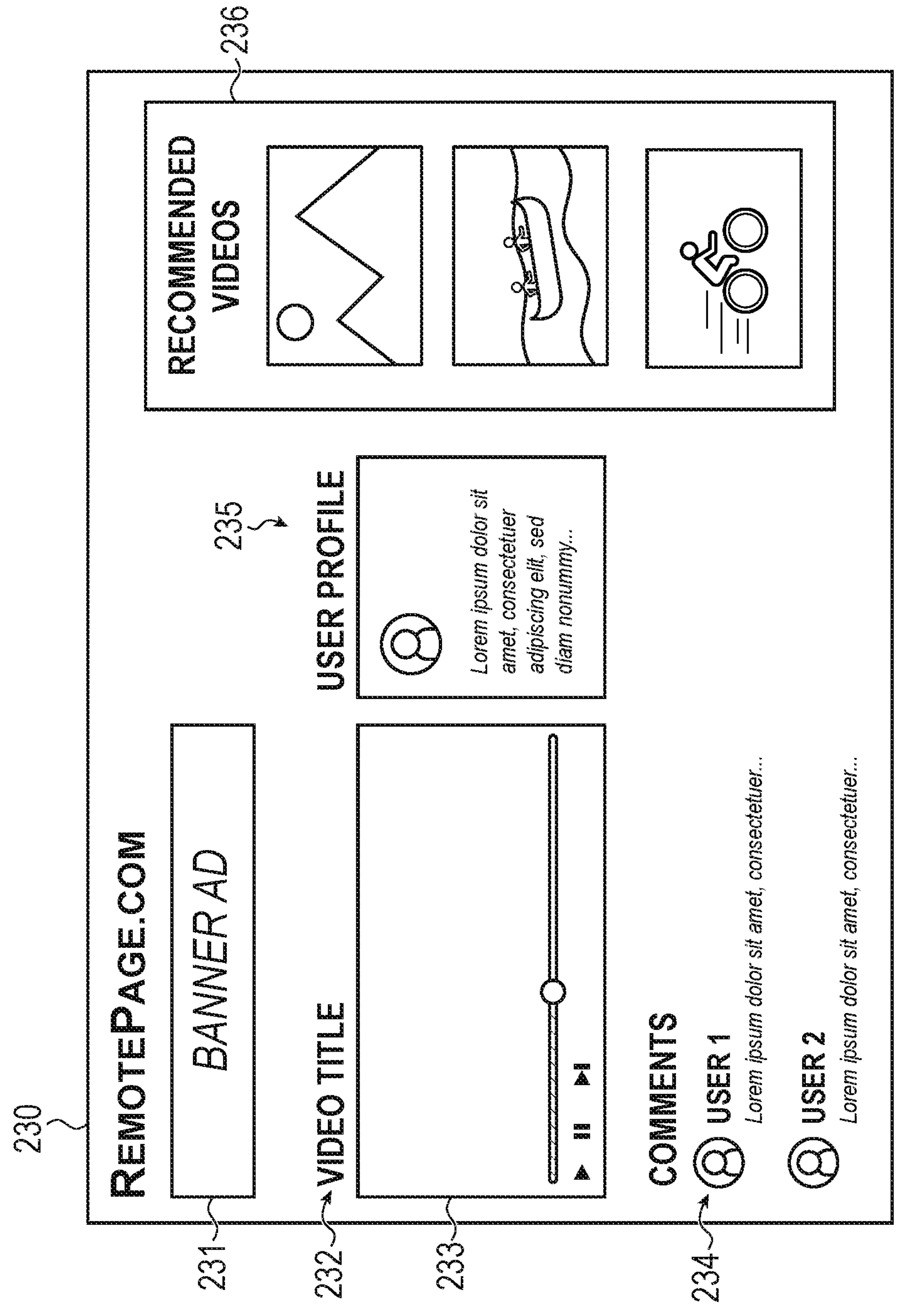
FIG. 2D depicts an example remote content item.

FIG. 2D illustrates an example representation of the content item referenced by the URL. For example, the content item may be a webpage 230. The webpage 230 may various content elements and may have a particular format, arrangement, appearance, and/or other attributes. Moreover, the webpage 230 may be defined by data structures (e.g., files, code, etc.) not formatted in the platform-specific structured data format. Thus, the GUI 200 may not be configured to display the webpage 230 in the content panel. In the example shown in FIG. 2D, the example content of the webpage 230 includes a banner advertisement 231, a content element 233 (e.g., a video), a content title 232 (e.g., a title of the video), a comment list 234, a user profile summary 235 (e.g., of the author/poster of the video), and a recommendation pane 236 (e.g., recommending other videos to the viewer). The example webpage and webpage content shown in FIG. 2D is an example of a video hosting website, but many other types of content items and content are also contemplated, such as news sources, blogs, wikis, issues (e.g., of an issue tracking system), codebases, media hosting sources (e.g., audio, video, image, etc.), and the like.

As described herein, the remote source page generation service 110 may be configured to retrieve and analyze content from the remote content item (e.g., the webpage 230), and create renderable content therefrom. In some cases, the remote source page generation service 110 is configured to produce renderable content for the GUI 200 for only a subset of the content that exists in the remote content item. For example, in the case of a video hosting webpage, the remote source page generation service 110 may include, in the renderable document, the video content element 233, the content title 232, and the comment list 234, while excluding other content (e.g., the banner advertisement 231, user profile summary 235, and recommendation pane 236). As described herein, the remote source page generation service 110 and the content processing engines 113 may be configured to identify and produce renderable content from certain types of content elements of a remote content item, while ignoring other types of content. The types of content that are identified and processed may be predetermined for a particular external platform or for a type of external platform. Thus, for example, in the case of the video hosting webpage, the remote source page generation service 110 and the processing engine 113 that is selected for the webpage 230 may be configured to identify a content element, a title, and any user-generated comments, and produce renderable content only for those items (should they exist). The processing engines 113 may use various techniques for identifying the target content, including text searching the content and/or underlying content code (e.g., HTML code) for salient words or comments, performing image or video analysis, searching underlying content code for headers or comments, or the like.

Figure 2E:
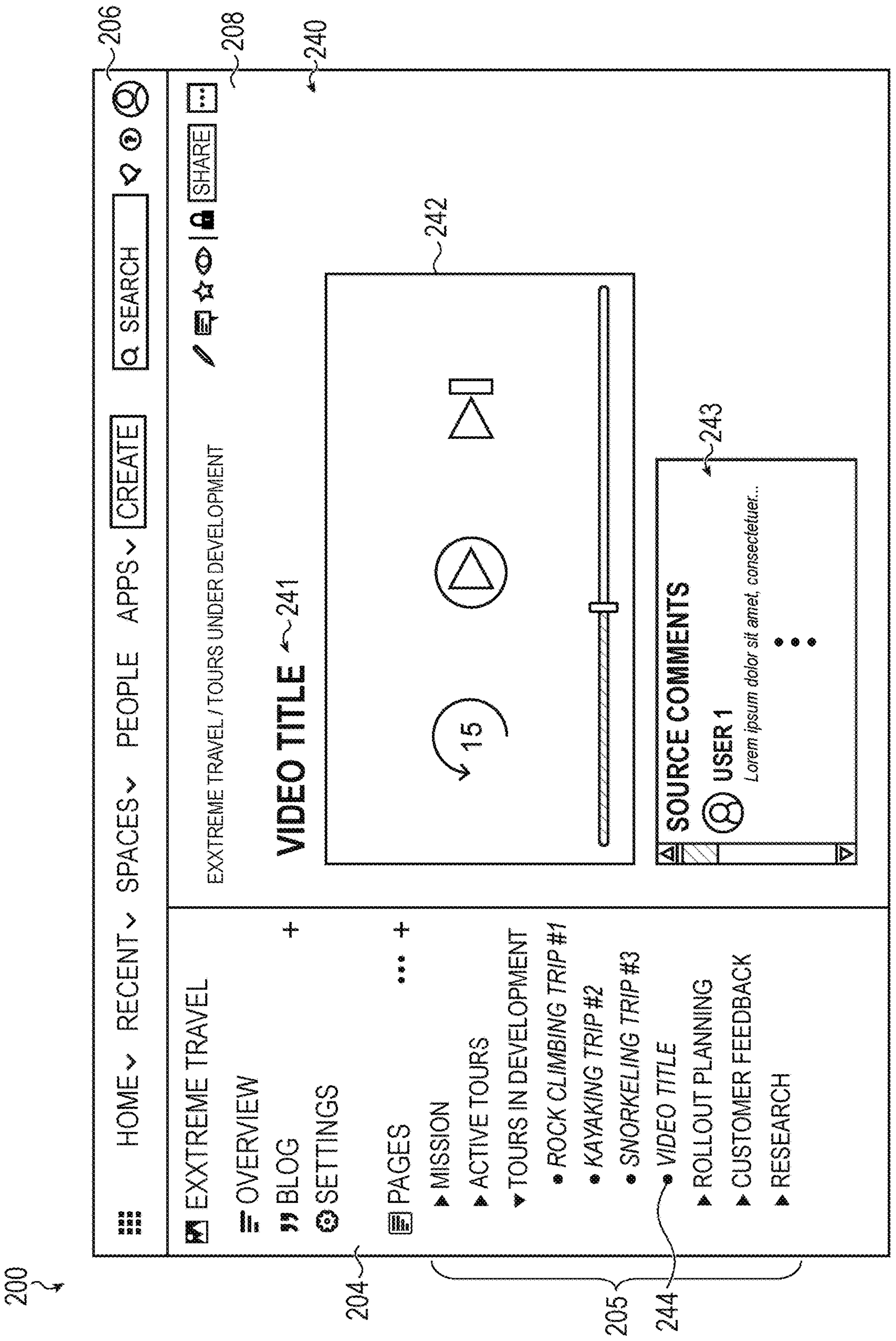
FIGS. 2E-2F depict renderable content generated from a remote content item being displayed in an example graphical user interface of a software application.

After processing the content from the remote content item using the selected processing engine and producing renderable content formatted in accordance with the platform-specific structured data format, the content collaboration system 112-1 may cause the renderable content to be displayed in the content panel. FIG. 2E illustrates the GUI 200 while the renderable content generated by the content processing engine is displayed in the content panel 208. The renderable content may appear as a document 240 in the content panel 208, and may include a document title 241, a content element 242 (e.g., a video), and user comments 243. These are merely examples of the content that may be incorporated from an external platform into a renderable document. In some cases, portions of the example content maybe omitted (e.g., the title, the comments), and others may be included (e.g., name of external platform, advertisements, additional media, etc.).

It will be understood that the document 240 shown in the figures corresponds to the rendered or displayed content of an underlying data object. The data object may be a data structure that is formatted in the platform-specific structured data format, that includes content formatted in the platform-specific data structure, and/or includes instructions and/or programmatic elements (and any other associated data) that causes renderable content formatted in the platform-specific structured data format to be produced.

In some cases, certain content of the remote content item may be converted to or otherwise processed to produce renderable content (in the platform-specific structured data format) that is stored by the content collaboration system 112-1 and managed in a manner similar to other documents in the content collaboration system 112-1. Thus, for example, the content processing engines may extract a title from the remote content item, and assign the title from the remote content item as the document title 241 of the data object (e.g., the document title 241 may be the same as the title in the remote content item).

The generated document title 241 may be stored in conjunction with the data object, and thus may be manipulated by users in the same manner as other document titles. For example, while the default title for a generated data object may be the same as the title in the remote content item, a user of the content collaboration system 112-1 may modify, update, delete, or otherwise change the title that appears when the document 240 is displayed.

As described above, the processing engines may be configured to preserve at least some formatting of the original remote content item. For example, the placement, size, and/or position of content elements, fonts, text sizes, alignment, overall page arrangements, colors, background images, and the like, may be represented in the document 240 in the same or similar manner as the remote content item. In some cases, only a portion of the formatting of a remote content item is preserved in the document 240. In some cases, the appearance of the document 240 (e.g., the renderable content produced from the remote content item, shown in FIG. 2E) has a different appearance than the remote content item itself (e.g., the remote content item 230 in FIG. 2D).

In response to receiving a document creation request (and optionally in response to the processing of a remote content item to produce renderable content), a selectable element 244 corresponding to the renderable content (e.g., the data object or document that includes the renderable content) may be displayed in the hierarchical element tree 205 in the navigational panel 204. The selectable element 244 may have a hierarchical relationship to other selectable elements in the hierarchical element tree, as described herein, and may reflect or define the hierarchical relationship between the generated data object and other documents managed by the content collaboration system 112-1. The selectable element 244 may include an indication that it was generated from or otherwise reflects the content of a remote content item, or it may be indistinguishable from local or native documents. In the former case, the selectable element 244 may be presented in a different font, size, or color, or displayed with a graphical object indicating the source, or otherwise visually distinguished from native documents.

The selectable element for a generated data object may have a same title as the title of the data object (which may be extracted from the remote content item itself). In some cases, the title of the selectable element may be linked to the title of the generated data object, such that if a user of the content collaboration system 112-1 changes either title, the other title will be updated to reflect the change. In some cases, one or both of the titles are not modifiable by a user of the content collaboration system 112-1, and are instead fixed to be whatever was (or is currently) contained in the remote content item.

In some cases, when a selectable element is created in response to a document creation request, the selectable element for that document is displayed in the same hierarchical position as a local document that was being displayed when the document creation request was received. For example, a document 202 corresponding to the element 214 labeled "Rock Climbing Trip #1" is displayed in the content panel 208 (FIG. 2A) when the document creation request is received (FIG. 2C). The element 214 and underlying document is associated with a particular position in the hierarchical element tree (e.g., under a "Tours In Development" position). Accordingly, the selectable element 244 that corresponds to renderable content produced from the remote content item (e.g., the document 240) is associated with the same position in the hierarchical element tree (e.g., under the "Tours in Development" position), as shown in FIG. 2E.

Selectable elements in the hierarchical element tree 205 may be manipulated by a user to change the hierarchical relationship of the selectable elements (and the underlying documents). For example, a user may drag (e.g., via a mouse input or other input) selectable elements to new locations within the hierarchical element tree 205. Upon moving a selectable element, the selectable element will be shown in a new position, and the underlying document or other content may also be associated with the new hierarchical position. For example, dragging and dropping a selectable element to a different location in the hierarchical element tree 205 causes a reassignment or modification of the hierarchical (e.g., parent, child, sibling) relationship between the corresponding document and other documents that are represented by selectable elements in the hierarchical element tree 205.

Figure 2F:
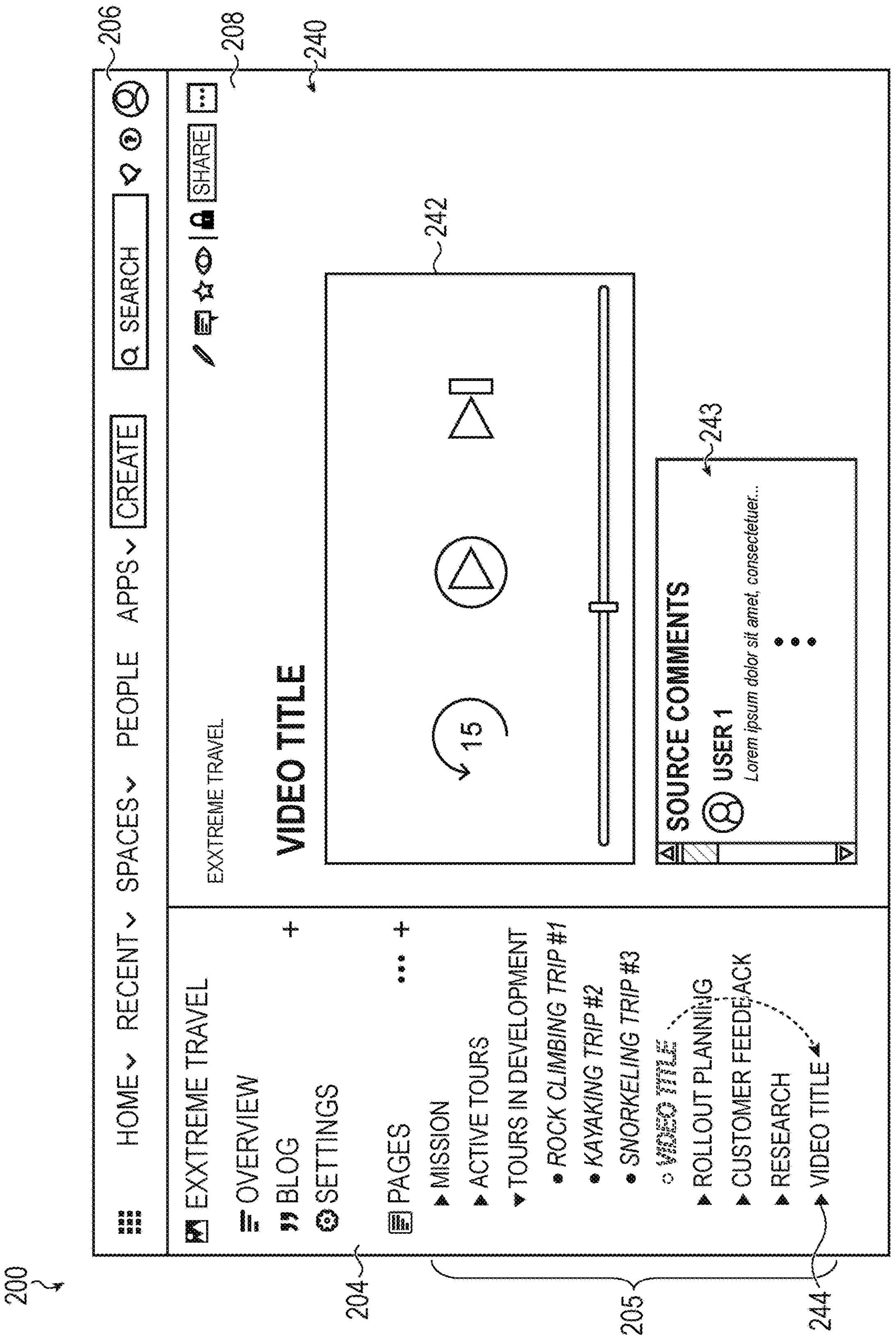

This functionality may apply to both documents that are managed by the content collaboration system 112-1, and data objects that are generated from remote content items at external platforms. Thus, while the generated content items may not be created in the same way as native documents (e.g., they are populated with content from an external platform, rather than user-generated content from users of the content collaboration system 112-1), the generated content may be manipulated in the hierarchical element tree in the same manner as native documents. FIG. 2F illustrates an example GUI 200 after a user has moved the selectable element 244 from its initial position, shown in FIG. 2E) to a new position in the hierarchical element tree 205 (e.g., below "Research" in the example hierarchical element tree 205). This operation may be initiated by a drag-and-drop input or any other suitable input.

As noted above, a document may be placed in the hierarchical element tree in the same level of the hierarchy as a document that is displayed when the document creation request is received. In some cases, if no document is displayed in the content panel when the document creation request is received, the selectable element and underlying data object may be associated with a default position or level in the hierarchical element tree. The default position may be a first element in the first level of the hierarchy, a last element in the first level of the hierarchy, or any other suitable position. For example, FIG. 2F illustrates the appearance of the GUI 200 in response to a document creation request being received when no document was being displayed in the content panel 208. Accordingly, the selectable element 244 that corresponds to the renderable content produced from the remote content item (e.g., the document 240) is associated with the last element of the first level in the hierarchy (e.g., below "Research" in the example shown).

As noted above, a document creation request may result in the generation of a document (e.g., a data structure formatted in the platform-specific structured data format that is stored and/or managed by the content collaboration system 112-1), or a data object that that will, when executed or otherwise processed, initiate the processing of a remote content item to produce renderable content (e.g., via the remote source page generation service). The selectable element 244 represents either type of output. Thus, for example, the selectable element 244 need not relate to or be associated with a pre-generated data object that is formatted in the platform-specific structured data format, but may instead relate to or be associated with an instruction or other programmatic element that will cause renderable content (and optionally a document that is managed by the content collaboration system 112-1) to be generated when the corresponding selectable element is selected.

As noted above, the content collaboration system 112-1 facilitates the creation and modification of user-generated documents. For example, users can generally modify the content of a document that is managed by the content collaboration system 112-1 (if they have suitable permissions for modifying that document). Example modifications include adding or removing content elements (e.g., text, video, audio, images, computer code), modifying titles, adding comments, and the like.

While documents that are generated from remote content items on external platforms may not be initially created in the same manner as other user-generated documents (e.g., they are generated by the remote source page generation service rather than by a user entering content), it may still be advantageous to allow users to provide user-generated content that is included in and/or displayed with the generated data object. Such user-generated content may be strictly local to the content collaboration system 112-1, while some user-generated content may be sent to the external platform and may be reflected in the remote content item. In order for user-generated content to be accepted by the external platform, the external platform may provide one or more application programming interfaces (APIs) that can be accessed by the content collaboration system 112-1 to propose the modifications to the external platform.

Figure 2G:
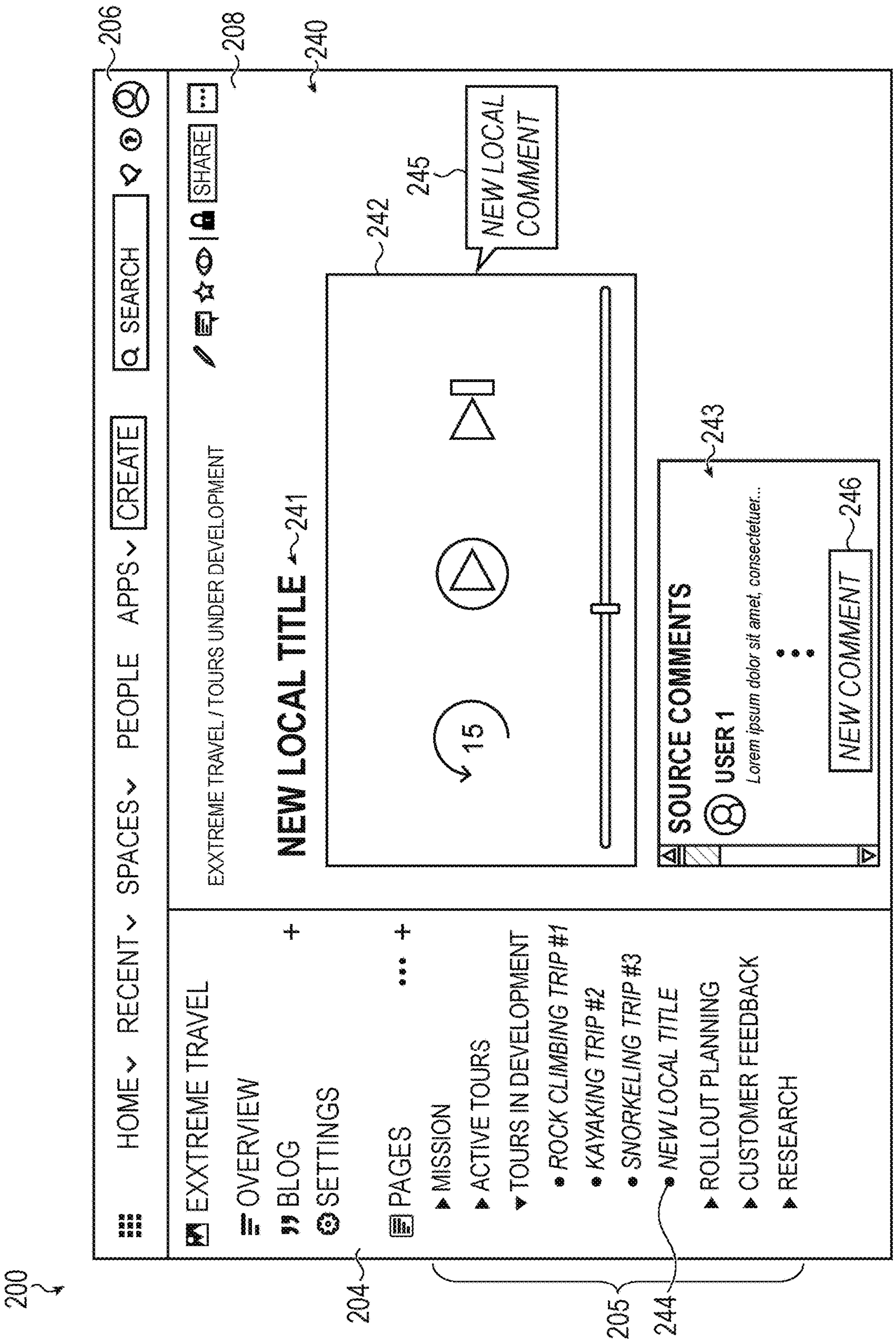
FIG. 2G depicts user-generated content incorporated into renderable content generated from a remote content item.

FIG. 2G illustrates the GUI 200 showing examples of the displayed document 240 having both local edits (e.g., user-generated content that is local to the content collaboration system 112-1 and are not reflected in the remote content item at the external platform), and bi-directional edits (e.g., user-generated content that is sent to the external platform for inclusion in the remote content item). For example, the GUI 200 in FIG. 2G shows the document title 241 having been updated to a new local title. The new local title may be reflected in both the document display in the content panel 208, as well as in the selectable element 244 in the hierarchical element tree 205. The new local title may replace the title that was assigned to the document or data object during the initial processing of the remote content item. The local title may be associated with the generated data object by the content collaboration system 112-1, but may not be provided to the external platform. For example, the remote content item may be a webpage hosted by a service that is separate from the application platform 102, and as such it may not be desirable to allow users of the application platform 102 to change the title of the webpage.

FIG. 2G also illustrates the document 240 with a local comment 245 (e.g., a user-generated comment) included in the content panel 208. The local comment 245 may be generated by a user of the content collaboration system 112-1 while working in a client of the content collaboration system 112-1, and may be stored in conjunction with the document 240. For example, it may be incorporated, as renderable content formatted in the platform-specific structured data format, in the data structure that defines the document 240. Thus, when the document 240 is viewed in the content collaboration system 112-1 (e.g., in the content panel 208) by a user of the content collaboration system, the local comment 245 (and/or other local comments) may be displayed. The local comment 245 may not be supplied to the external platform, but may only exist as content within the content collaboration system 112-1.

FIG. 2G also illustrates examples of user-generated content that may be created with in the GUI of the content collaboration system 112-1, but which may be provided to the external platform to be included (or proposed for inclusion) in the remote content item. For example, a new comment 246 may be included in the comment section of a media item. This comment may be provided to the external platform (e.g., via an API call), and may be included in the comment list in the remote content item.

In some cases, all user-generated content that is produced for a document generated from a remote content item may be provided to the external platform (e.g., via API calls). The external platform may determine what, if any, of the user-generated content to include in the remote content item.

User-generated content that received for a particular generated data object may be stored in association with the renderable content that was produced from the remote content item. Thus, for example, when a document (or other data object) is generated with respect to a remote content item, user-generated content may be stored in the document or data object in association with the renderable content that was produced (or in association with instructions or other programmatic elements that are configured to cause renderable content to be produced using the remote content item).

In some cases, certain content elements in a document that is generated from a remote content item may be updated to reflect any changes to the remote content item. For example, each time a document generated from a remote content item is selected for display, the content collaboration system 112-1 and/or the remote source page generation service 110 may access the remote content item to determine if any of the content elements that were incorporated into the document in the content collaboration system 112-1 have been changed, and if so, the remote source page generation service 110 may generate new renderable content to reflect the changed content elements in the remote content item. Thus, for example, if new comments have been added to the remote content item since the initial document creation request, the new comments may be reflected in later viewings of the document. In some cases, only a subset of available content elements are updated (e.g., comments), while others are not (e.g., titles, media items).

These foregoing embodiments depicted in FIGS. 2A-2G and the various alternatives thereof and variations thereto are presented, generally, for purposes of explanation, and to facilitate an understanding of various configurations and constructions of a user interface that may be rendered by a frontend of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
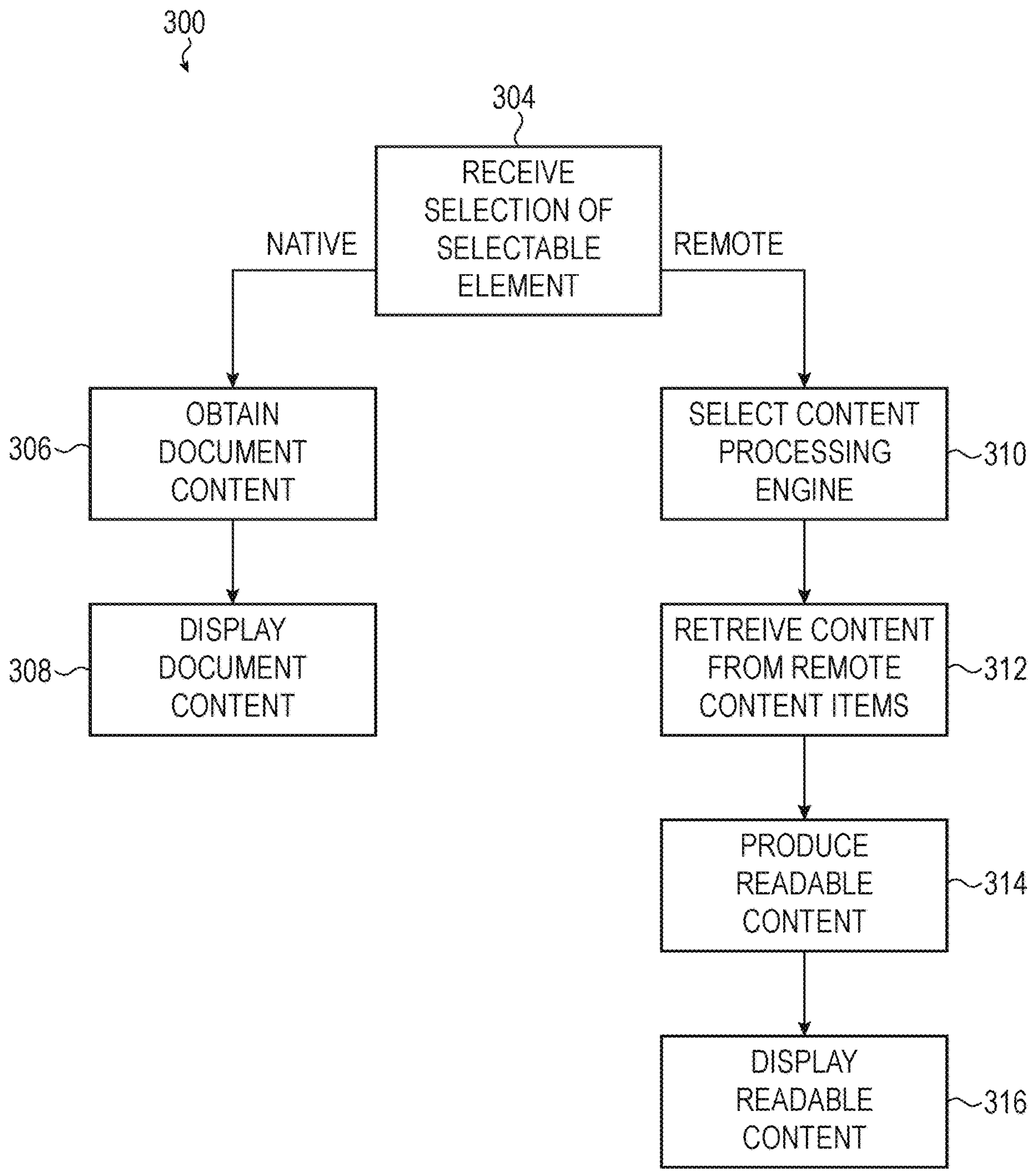
FIG. 3 depicts an example process for displaying documents in a software application.

For example, FIG. 3 illustrates a process 300 by which the content collaboration system 112-1 may facilitate the generation of renderable content within the content collaboration system from remote content items, while providing a seamless integration of the remote content in the user interface experience of the content collaboration system. The process 300 may be performed while the content collaboration system is causing a client computer to display a graphical user interface that includes a content panel (e.g., the content panel 208) that configured to display content of a selected content item, and a navigational panel (e.g., the navigational panel 204) that includes including a hierarchical element tree (e.g., the hierarchical element tree 205). At operation 304, a selection of a selectable element is received. For example, a user may click on or otherwise select an element from the hierarchical element tree 205. As described herein, the content collaboration system 112-1 may perform different operations depending on whether the selected element refers to a native user-generated document (e.g., a document managed by the content collaboration system 112), or a remote content item.

For example, in response to the selected selectable element being associated with a document that is managed by the content collaboration system (e.g., a native document), the content collaboration system 112-1 may obtain (operation 306) document content of the document (e.g., from the data store 116-1). The document content may be formatted in accordance with a platform-specific structured data format. At operation 308, the document content may be displayed in the content panel of the GUI of the content collaboration system 112-1. For example, FIG. 2A illustrates document content of the document 202 displayed in the content panel 208.

In some cases, the selected selectable element may be associated with a remote content item that is managed by an external platform. For example, the selected selectable element may correspond to a data object that includes an address or other identifier of the remote content item. The data object may be created by a user supplying the address or other identifier of the remote content item to the content collaboration system, which may result in the creation of a data object (or optionally a document with renderable content, as described herein), and the display of the selectable element that corresponds to the data object in the hierarchical element tree.

Upon selection of the selectable element, the data object may be accessed and operations may be performed to produce renderable content from the remote content item and display the renderable content, as described herein. In cases where the document with renderable content formatted in the platform-specific structured data format has already been produced for a selectable element, selection of the selectable element may cause the document to be accessed and its content displayed.

Returning to FIG. 3, in response to the selected selectable element (operation 304) being associated with a remote content item that is managed by an external platform separate from the content collaboration system (e.g., a remote content item), the content collaboration system 112-1 may perform a different set of operations. For example, the content collaboration system 112-1 may request renderable content from the remote source page generation service 110. At operation 310, the remote source page generation service 110 may select a content processing engine from a set of candidate content processing engines associated with the content collaboration system 112-1 and/or the application platform 102 (e.g., content processing engines 113).

The selected content processing engine may be configured to process content from remote content items associated with the particular external platform of the remote content item referenced by the selectable element. For example, the selected selectable element may include an identifier (e.g., a URL) of a remote content item that is associated with a particular external platform. The particular external platform may be indicated by the URL or otherwise stored in a data object or document associated with the selected selectable element, and the remote source page generation service 110 may select the content processing engine based on the particular external platform.

At operation 312, the remote source page generation service 110 may retrieve content from the remote content item at an address associated with the remote content item (e.g., a URL stored in a data object or document associated with the selected selectable element). At operation 314, the remote source page generation service 110 may process the content from the remote content item using the selected processing engine to produce renderable content. As described herein, the renderable content may be formatted in accordance with the platform-specific structured data format, such that it can be displayed or rendered in the content panel of the GUI of the content collaboration system.

The processing of the content by the content processing engine may include identifying a content element (e.g., a video, a title, a comment list, text, computer code, an image, an audio source, etc.) from a plurality of content elements in the remote content item, extracting an address (e.g., a URL) of the identified content element, and including the address of the identified content element in the renderable content to cause display of the identified content element in the content panel. Thus, for example, the processing engine may identify a video source in the remote content item, and include an address of the video source in the renderable content, such that the video is displayed in the content panel of a GUI when the renderable content is displayed by the content collaboration system 112-1.

At operation 316, the renderable content is displayed in the content panel. For example, FIG. 2E illustrates the renderable content being displayed in the content panel 208 of the GUI 200 of the content collaboration system 112-1.

In some cases, operations 310-316 are performed in response to receiving a document creation request. Thus, for example, when a document creation request that includes an address to a remote content item is received (e.g., as shown and described in FIG. 2C), operations 310-316 may be performed, and a document (which includes the renderable content produced at operation 314) may be generated. Additionally, as described herein, a selectable element corresponding to the document may be displayed in the hierarchical element tree.

In some cases, upon receiving a document creation request that includes an address to a remote content item, a data object is created. The data object may not include renderable content, but may instead be configured to initiate the generation and display of renderable content, such as with the operations 310-316. For example, the data object may include the address to the remote content item and any other instructions or identifiers that will cause the content collaboration system to, upon receiving an instruction to access the data object, perform the operations 310-316.

In some cases, the data object (which may be or may resemble an at least partially complete document) may include some renderable content, and some content that will cause the content collaboration system to perform operations 310-316 to produce additional renderable content for display. For example, after the content collaboration system performs the operations 310-316 for a given remote content item, it may generate a data object or document that includes certain content elements from the remote content item as renderable content, and also includes data or instructions that will initiate additional processing of the remote content item. Thus, some of the renderable content from the initial processing of a remote content item may be stored in the document (e.g., locally by the content collaboration system) and simply rendered by the content collaboration system when the document is displayed, while other content is retrieved from the remote content item and processed for rendering each time the document is displayed.

As a particular example, the initial processing of a remote content item may include identifying a title of the remote content item (from the remote content item itself), and identifying text content in the remote content item. The title may be converted into renderable content in the platform-specific structured data format and stored in the generated data object, such that rendering the document causes the previously-generated title to be displayed. By contrast, the text content may not be converted into renderable content, but rather the document may include an instruction or other programmatic element that causes the remote content item to be processed (e.g., by a content processing engine) to produce renderable content from the text content.

In this way, some portions of the document may be retrieved from the remote content item and rendered in real-time (e.g., in response to each request to display the document), while other portions may be contained in the document in a pre-processed, renderable format. Content that is contained in the document in a pre-processed, renderable format (e.g., titles) may be modifiable by users of the content collaboration system, as described herein.

FIGS. 4A-4E depict an example graphical user interface, the graphical user interface 400 for generating a screen recording/screen capture video object within a content collaboration system. The graphical user interface 400 provided by the frontend or client application may operate in one of a number of different modes, as described herein. The graphical user interface 400 may allow the user to create, edit, or otherwise modify user-generated content that is stored as an electronic document or page (e.g., in the data store 116-1 of the content collaboration system 112-1).

Figure 4A:
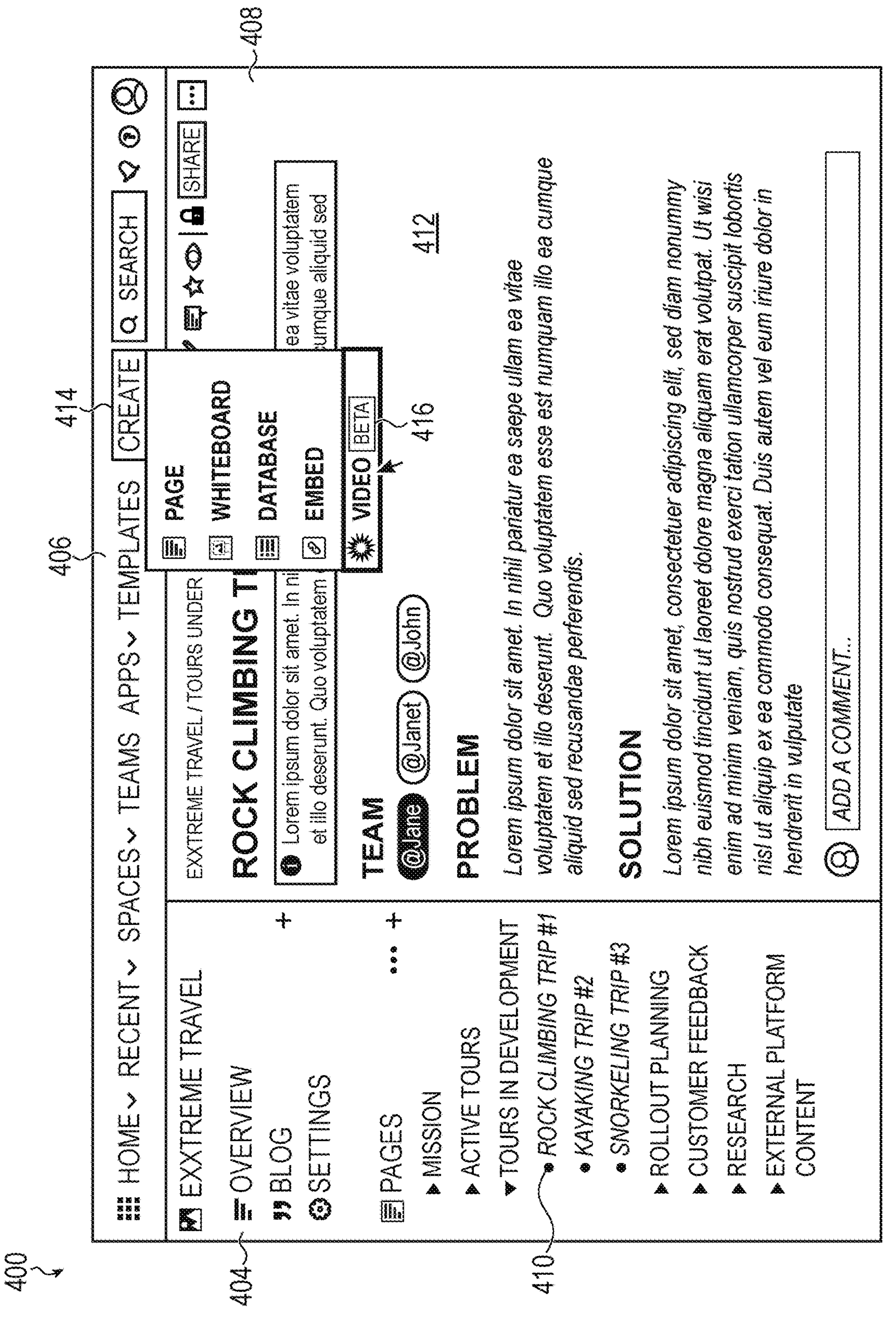
FIGS. 4A-4E depict an example graphical user interface, the graphical user interface for generating a screen recording/screen capture video object within a content collaboration interface.

The graphical user interface 400 shown in FIG. 4A is a rendering of an electronic document, page, or electronic content. The electronic document, page, or electronic content may be rendered on a client device by the content collaboration system 112-1. In one example, the graphical user interface 400 may have various partitions/sections displaying different content. For example, the graphical user interface 400 may include a navigational panel 404, a toolbar 406, and a content panel 408, which may be examples of similar components described herein.

The graphical user interface 400 may be configured to receive one or more commands for adding a screen recording/screen capture video object to the content panel 408 of the content collaboration system. The one or more commands may cause the content collaboration system to instantiate a video creation service that includes a video creation window for generating a screen recording/screen capture video object at the content collaboration system. In some cases, that command may be initiated using the toolbar 406, which may include a content creation control 414 and a user input to the content creation control 414 can cause display of a menu having various options for adding different types of content to the content panel 408. In some cases, the different types of content may include remote content that is managed by an external platform as described herein.

The content creation control 414 can include a content creation option 416 that generates a command to initiate creation of a screen recording/screen capture video object that will be added to the content panel 408 and/or used to generate a new content item stored at the hierarchical document tree 404. In other cases, the command may initiated through a variety of other ways including text entered into a command line or other text input entered into the content panel 408.

The command line may include a command character ("/"), which may be used to designate the first portion of the textual input as a link-insertion command. The command line may also include a main command portion, which can be used to designate the service/external platform to be invoked. In response, to a command entered into the content panel 408, the system may display a service selection window, which may include one or more selectable options for creating and/or opening video creation service from the graphical user interface 400.

Figure 4B:
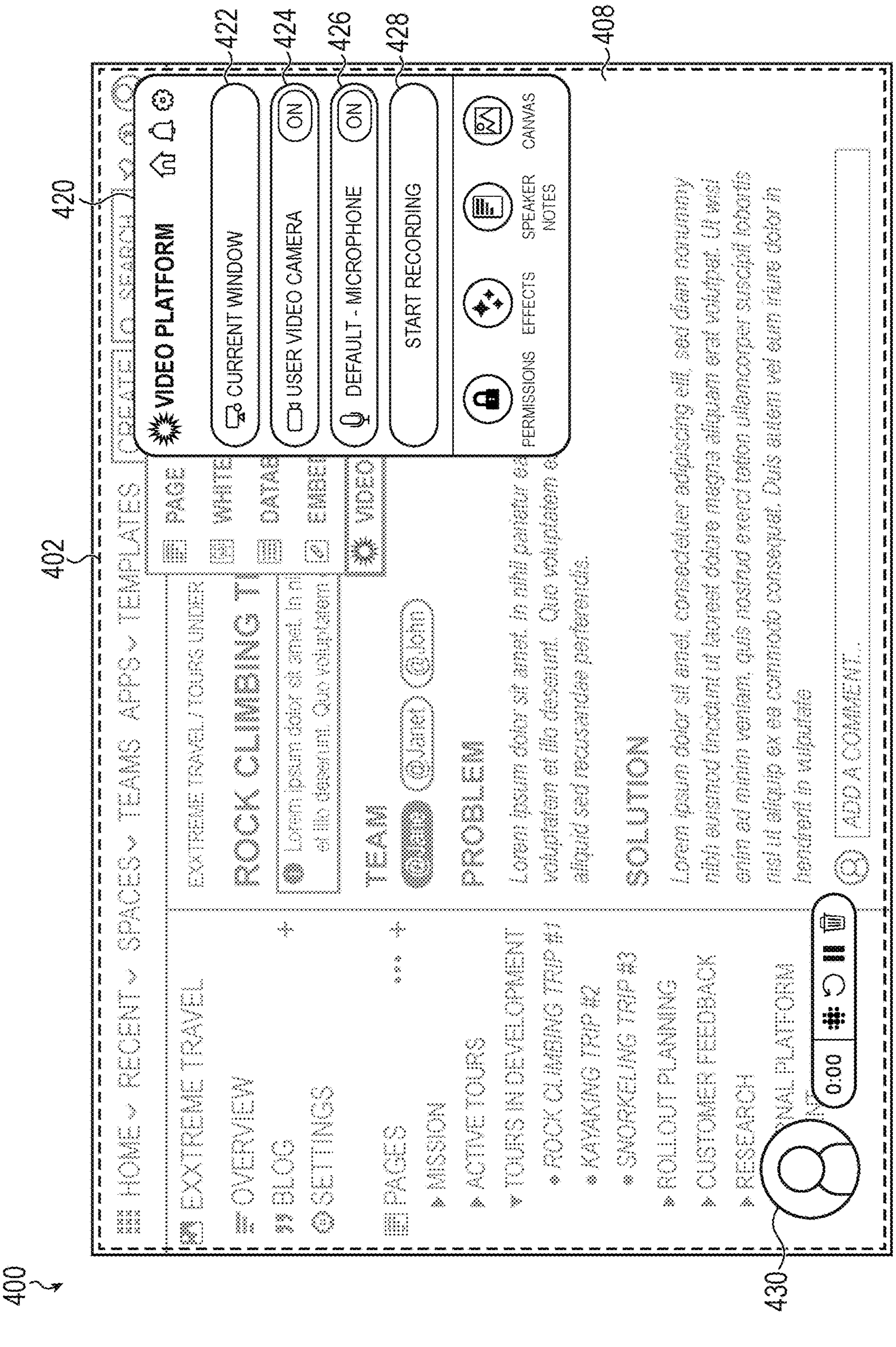

FIG. 4B illustrates the graphical user interface 400 after a user selection (e.g., a mouse click) of the content creation option 416. For example, in response to detecting the selection of the content creation option 416, a video creation interface is displayed. The video creation interface includes a content region 402, a control region 420 and user video region 430. The video creation interface may be supported or otherwise hosted by an external service and the content collaboration system may interface with the external service to cause the editing video creation interface to be displayed within the graphical user interface 400 of the content collaboration platform. For example, the content collaboration system may iFrame protocols, one or more API calls or other suitable processes to cause display of the video creation interface and video creation tools within the graphical user interface of the content collaboration system.

The content region 402 can be configured to include content that will be captured as part of a screen recording/screen capture video object. For example, the content region 402 can include aspects of the graphical user interface 400 such as the navigation panel 404, the toolbar and/or the content panel 408. In some cases, the content region 402 may correspond to a portion of the graphical interface 400. For example, the content region 402 may include the content panel 408 and exclude other portions of the user interface such as the navigation panel 404 and/or the toolbar 406. In other cases, the content region 402 may include content that is imported from other content pages and/or remote content managed by an external platform.

The control region 420 can include one or more options generating a screen recording/screen capture video object. The control region 420 may be a window that overlays the graphical user interface 400. The control region 420 can include a first input option 422 for selecting content that will be displayed in the content region. In some cases, the first input element 422 may provide an option to set all or a portion of the graphical user interface 400 as the content region 402. For example, the first input element 422 may include an option to select the content region 402 to correspond to the content panel 408. In other cases, the first input element 422, may allow a user to select content from other content objects within the content collaboration system for display in the content region 402 or select external content (e.g., managed by an external platform) for display in the content region 402.

The control region 420 may include a second input element 424 that is configured to select a camera for capturing video that will be part of the screen recording/screen capture video object. For example, the second input element 424 may display an indication of available cameras, such as a camera(s) integrated with or operably connected to a client device and display options for selecting one or more of those cameras for capturing video. The control region may include a third input element 426 that is configured to select an audio source that will be used capture audio that will be part of the screen recording/screen capture video object. The third input element 426 may display an indication of available audio devices, such as microphone(s) integrated with or operably connected to the client device and display options for selection one or more or those audio capture device. In some cases, hardware components used to capture video, audio and/or other inputs may be controlled by the external-platform and inputs from these sources may be displayed/captured within the context of the graphical user interface 400 while being accessed/controlled by the third-part system.

The control region 420 may also include a selectable option 428 that initiates a screen capture session for the screen recording/screen capture video object. In response to a user input to the selectable option 428, the content collaboration system may be configured to initiate a recording session for the screen recording/screen capture video object. The screen capture session can include a screen capture of the user video region 430 overlayed with the content region 402.

The user video region 430 can display a screen capture preview of a user of the client device that is captured by a selected video camera. The user video region 430 may be overlayed with the content region 402 and/or other portions of the graphical user interface 400. For example, if the content region 402 corresponds to the content panel 408, the user video region 430 may be overlayed over a portion of the content panel 408. The user video region 430 is illustrated as a circular region, however the user video region 430 may be configured in any suitable configuration including different shapes, sizes and locations within the content region. In some cases, various aspects of the user video region 430 may configured by the user in the video creation interface. For example, a user may resize, move and/or change a shape of the user video region 430.

Figure 4C:
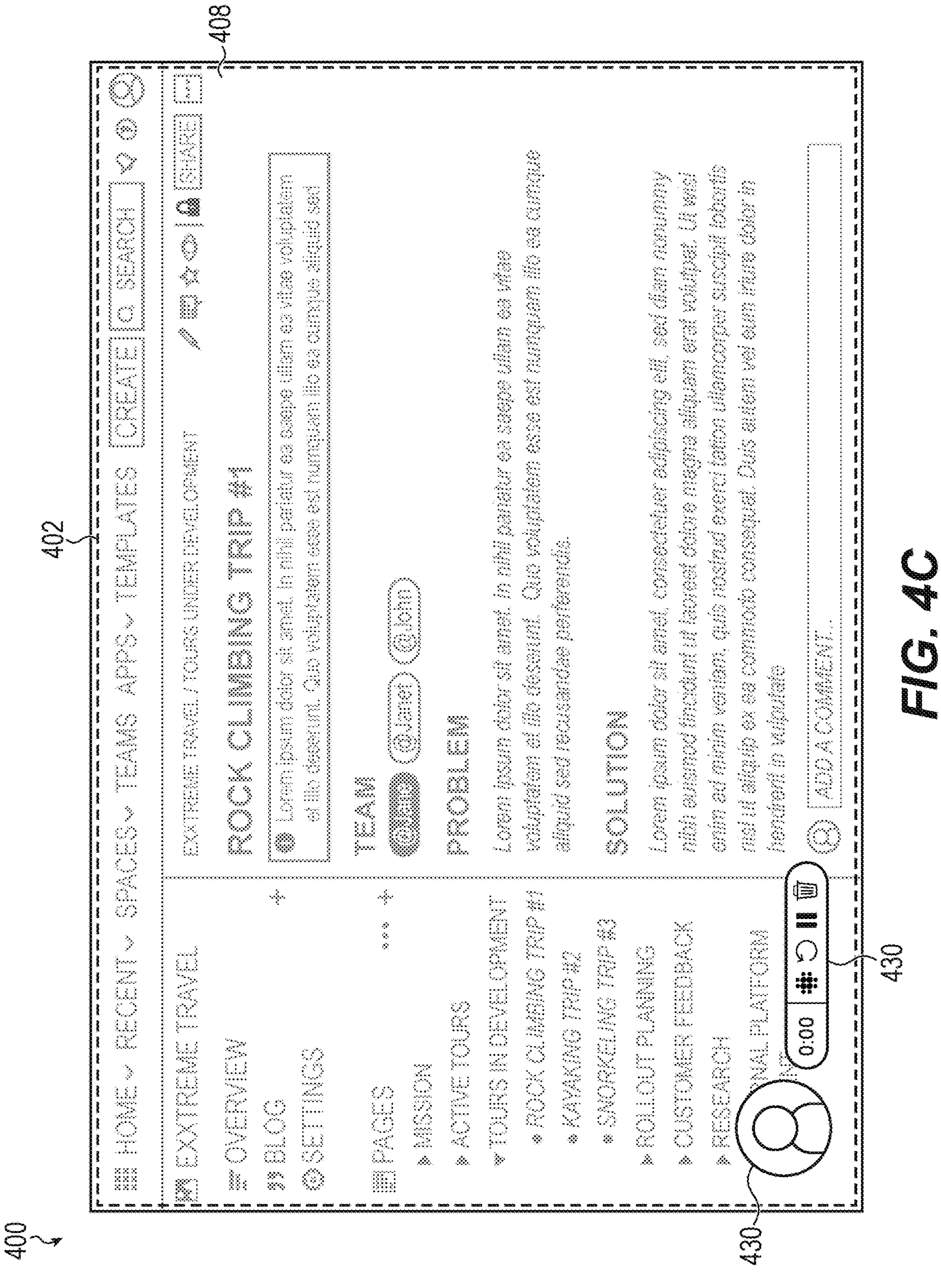

FIG. 4C illustrates the graphical user interface 400 after a user selection (e.g., a mouse click) of the selectable option 428 to initiate a screen capture session. The graphical user interface 400 may include a real-time capture of user video (displayed in the user video region, a video stream of the user him or herself) and audio which is displayed in conjunction with the content region 402. In the example shown in FIG. 4C, the content region 402 corresponds to the entire graphical user interface 400 and the video region 430 is overlayed over a portion of the content region 402. The graphical user interface 400 may also include one or more media controls 432, which may be displayed on a user's client device and include options for controlling the screen capture session. For example, the media controls 432 may include a first region showing a current length of the recorded screen capture and options to pause, delete, end or otherwise modify the screen capture session. The system may display the media controls on a client device of the user capturing the video, but may not include capture these controls as part of the screen recording/screen capture video object. The video capture operations may be supported or otherwise hosted by an external service and the content collaboration system may interface with the external service to cause the video capture tools to be displayed within the graphical user interface 400 of the content collaboration platform.

In some cases, the screen recording/screen capture may be performed by a screen recording/screen capture platform that is integrated with the content collaboration system or an external platform that is accessed by the content collaboration platform as part of the screen recording/screen capture process.

As noted with respect to other embodiments described herein, once the screen recording/screen capture process is complete, the editing interface 400 can be configured to cause to be transmitted to the screen recording/screen capture platform a permissions change request that modifies default permissions of the newly created video. In some cases, screen recording/screen capture platforms default to a public sharing setting, which can be automatically disabled by operation and/or instruction of the editing interface 400. The permissions change request can include a page identifier and/or another content identifier associated with the page so that the screen recording/screen capture system can generate (and/or use) a user group identifier associated with the page in which the video is embedded.

Figure 4D:
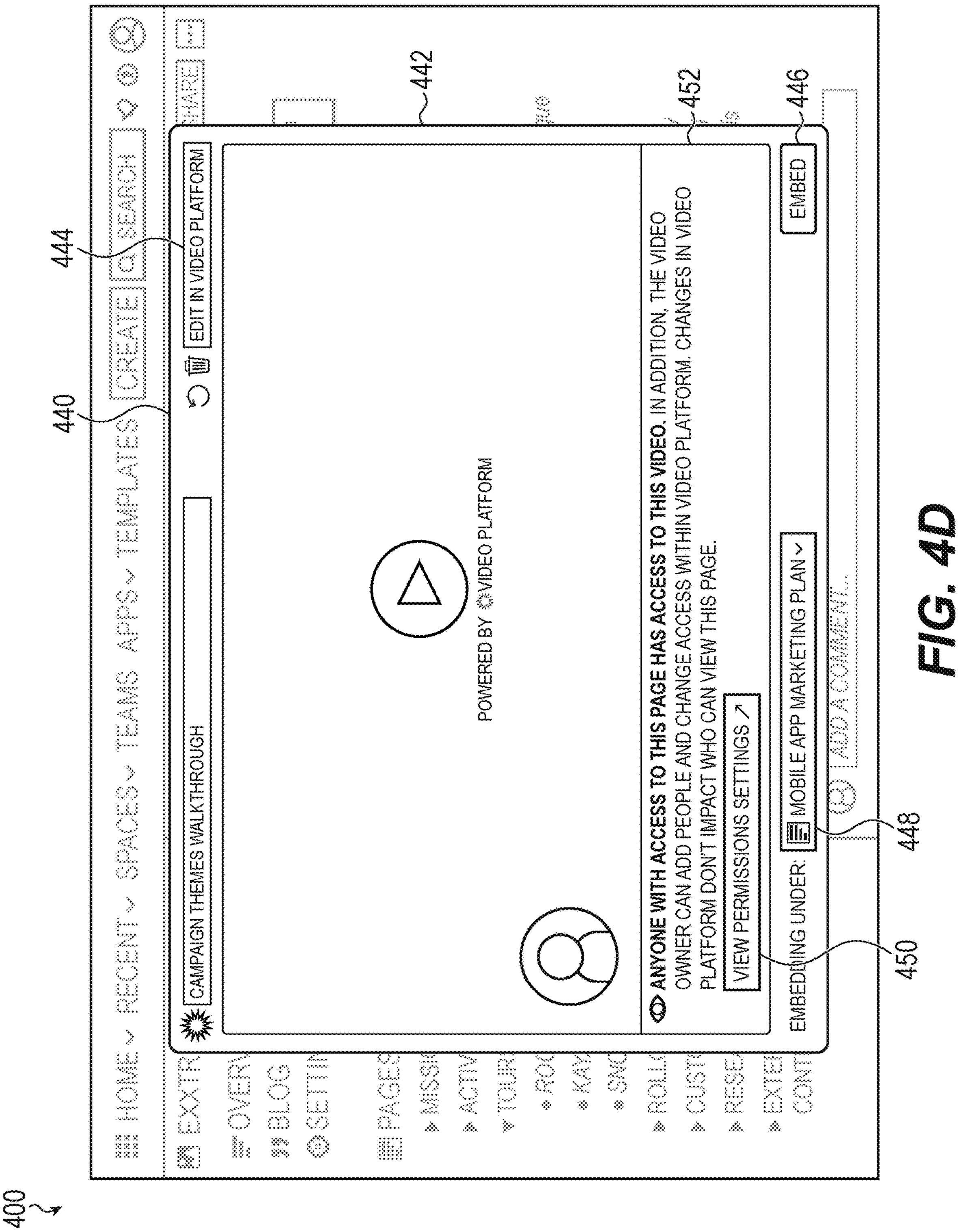

FIG. 4D illustrates the graphical user interface 400 after a user selection of a control to end a screen capture session. The graphical user interface 400 includes an editing interface window 440 that is configured to allow a user to preview the recorded screen capture, edit the video and/or edit other aspects of the video such as a title and save location. The editing interface window 440 may be displayed as part of an operation to add the screen recording/screen capture video object to the content collaboration platform as part of a current content collaboration page or a new content collaboration page. The editing interface 440 may be supported or otherwise hosted by an external service and the content collaboration system may interface with the external service to cause the editing interface window 440 to be displayed within the graphical user interface 400 of the content collaboration platform.

The editing interface window 440 can include a recorded screen capture object 442 which is generated from the screen capture session. The editing interface 400 may allow a user to play the video within the editing interface 400, which may allow a user to view the video before posting the video to a content collaboration page. The editing interface window 440 also includes a first option 444 to edit the video in a screen recording/screen capture/editing program. For example, the screen capture session may be captured in the content collaboration system using an external platform that interfaces with the content collaboration system.

Accordingly, the screen recording/screen capture video object (a "screen capture") may be stored within the external platform (a "screen capture platform"). In response to detecting a user selection of the first option 444 to edit the video, the content collaboration system may cause the external platform to launch an editing interface which may include controls for editing and/or otherwise modifying the screen recording/screen capture video object. In some cases, the external platform may be launched in a new window (e.g., as a webpage or other web-based interface). In other cases, the external platform may launch an editing interface as part of the graphical user interface 400.

The editing interface window 440 can also include a second option 446 to add the screen recording/screen capture video object 442 to a content page of the content collaboration system. The editing interface window 440 can also include a third option 448 that specifies a location to add the video to the content collaboration system. For example, the third option 448 may include an option to generate a new collaboration page and add the screen recording/screen capture video object to the newly generated collaboration page. In response to a user selecting an add location and the second option 446 the system may cause the video to be embedded in the specified location (e.g., the newly generated content collaboration page). The editing interface window 440 can also include a permissions summary user interface element 450 that summarizes permission associated with the video, noting in the illustrated embodiment that the video is only visible to persons who are permitted to access the page. In many cases, the editing interface 400 likewise includes an editing affordance 452

Figure 4E:
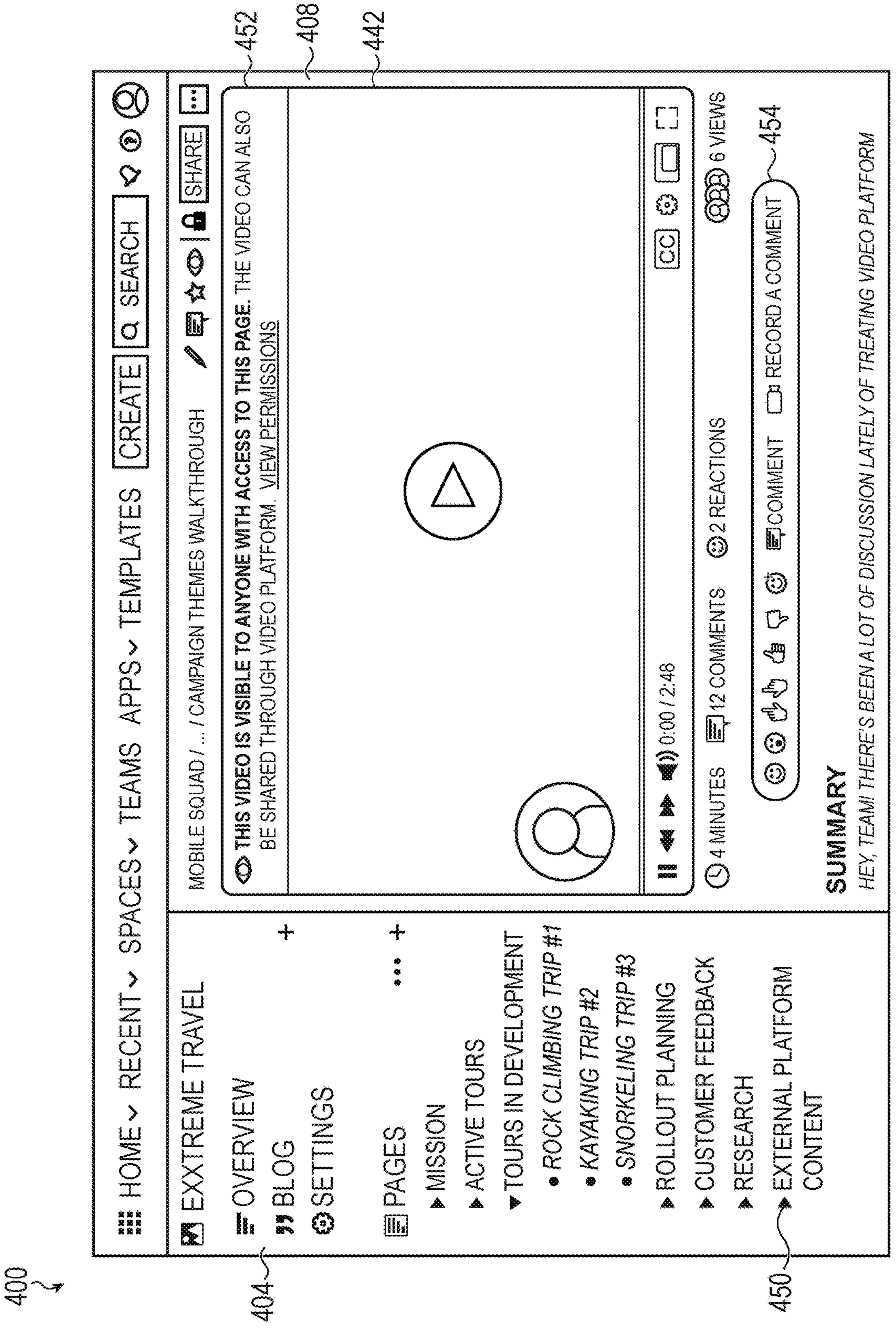

FIG. 4E illustrates the graphical user interface 400 after a user selection of the second option 446 to add the screen recording/screen capture video object to a content page of the content collaboration system. In this view, the permissions summary user interface element 450 is prominently displayed to indicate to the user the current permissions status/scope of the video.

The graphical user interface 400 can include the screen recording/screen capture video object 442 added (e.g., embedded) within a content panel 408 of a collaboration document. In the illustrated embodiment, the content collaboration system generated a new content object including the screen recording/screen capture video object 442. In some cases, the generation of the new content object also causes the content collaboration system to generate a selectable element 450, corresponding to the new content object, in the hierarchical element tree of the navigation panel 404, as described herein.

In an edit mode, one or more users may edit the content panel 408 to add, delete and/or modify content that is displayed in addition to the video (e.g., add a summary section 456 to the content panel), as described herein. In some cases, a user (having appropriate permissions) may edit or otherwise modify the screen recording/screen capture video object using an integrated or external platform as described here. In a second presentation mode, in which the system may cause the screen recording/screen capture video object 442 to be displayed on other client devices, and users may view, comment on (e.g., using comment bar 454) or provide other reactions to the screen recording/screen capture video object 442.

These foregoing embodiments depicted in FIGS. 4A-4E and the various alternatives thereof and variations thereto are presented, generally, for purposes of explanation, and to facilitate an understanding of various configurations of a graphical user interface that can facilitate creation of content in one platform from the user interface of another platform, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIGS. 5A-5E depict an example graphical user interface, the graphical user interface 500 for generating a screen recording/screen capture video object within a content page 502 of a content collaboration system. For example, a user may be creating/editing the content page 502 and an add a screen recording/screen capture video object to the content page 502 from within the content page 502.

The graphical user interface 500 may be an example of the graphical user interfaces described herein and the frontend or client application may operate in one of a number of different modes, as described herein. The graphical user interface 500 may allow the user to create, edit, or otherwise modify user-generated content that is stored as an electronic document or page (e.g., in the data store 116-1 of the content collaboration system 112-1), as described herein.

Figure 5A:
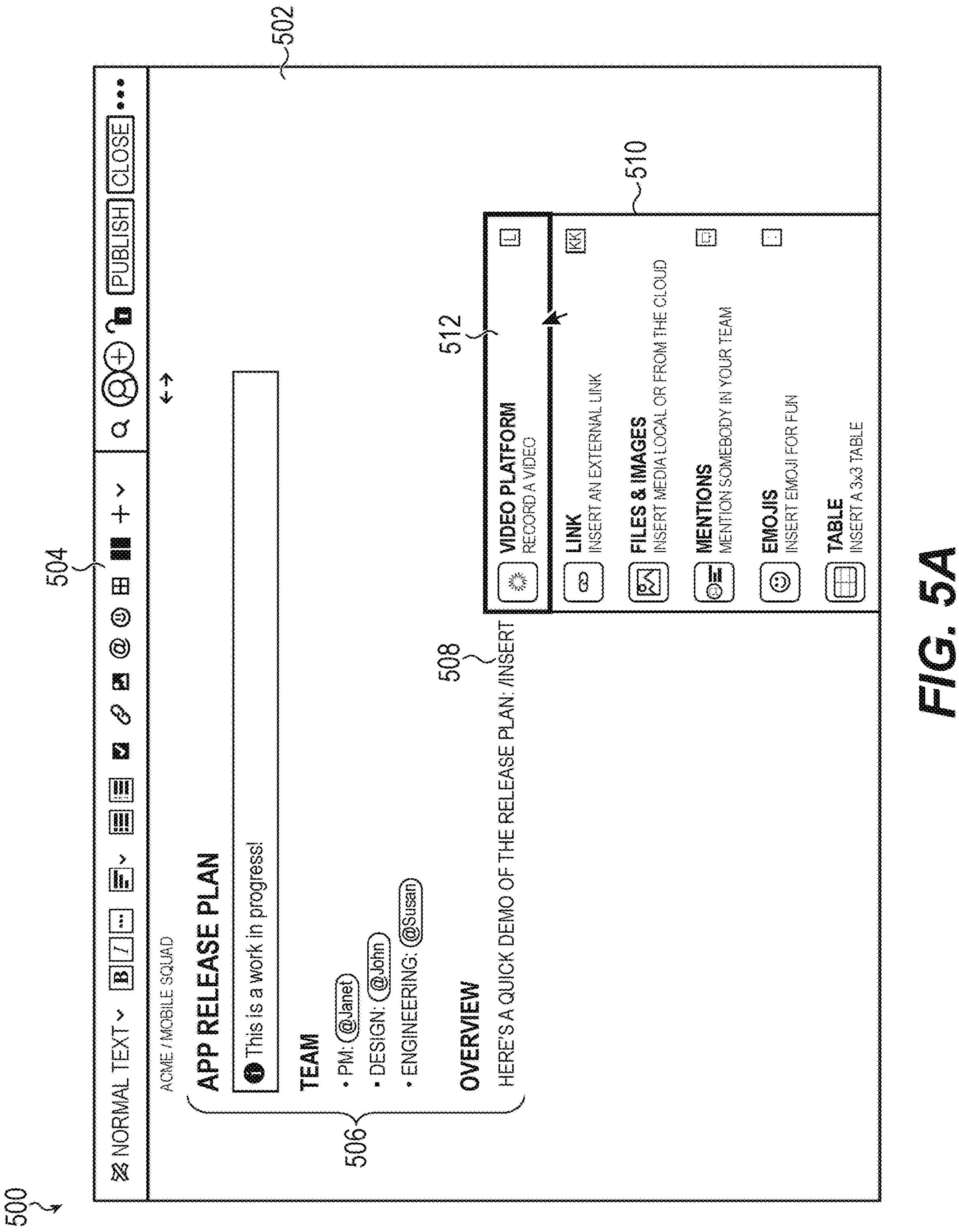
FIGS. 5A-5E depict an example graphical user interface, the graphical user interface for generating a screen recording/screen capture video object within a content collaboration interface.

The graphical user interface 500 shown in FIG. 5A is a rendering of an electronic document, page, or electronic content. The electronic document, page, or electronic content may be rendered on a client device by the content collaboration system 112-1. In one example, the graphical user interface 500 may be in a mode that displays a collaboration page 502 (which also may be referred to herein as a content panel) and have various partitions/sections displaying different content. For example, the graphical user interface 500 may include a toolbar 504, which may be examples of similar components described herein. The collaboration page 502 includes user generated content 506, as described herein.

The graphical user interface 500 may be configured to receive one or more commands for adding a screen recording/screen capture video object to the content panel collaboration page 502 of the content collaboration system. The one or more commands may cause the content collaboration system to instantiate a video creation service that includes video creation window for generating a screen recording/screen capture video object at the content collaboration system, as described herein. In some cases, that command may be initiated using the toolbar 504, which may include a content creation control and a user input to the content creation control can cause display of a menu having various options for adding different types of content to the collaboration page 502.

In the example shown in FIG. 5A, the video creation service may be initiated by a command 508 entered in the content region of the collaboration page 502. The command 508 can include a command character ("/"), which may be used to designate the first portion of the textual input as a object-creation command. The command 508 may also include a main command portion, which can be used to designate the service/external platform to be invoked (e.g., the video creation service). In response, to the command 508 entered into the collaboration page 502, the system may display a service selection window 510, which includes one or more selectable options for creating and/or opening video creation service from the graphical user interface 500. The service selection window 510 may include a content creation option 512 that causes initiation of a video creation service, which is used to create a screen recording/screen capture video object, as described herein.

Figure 5B:
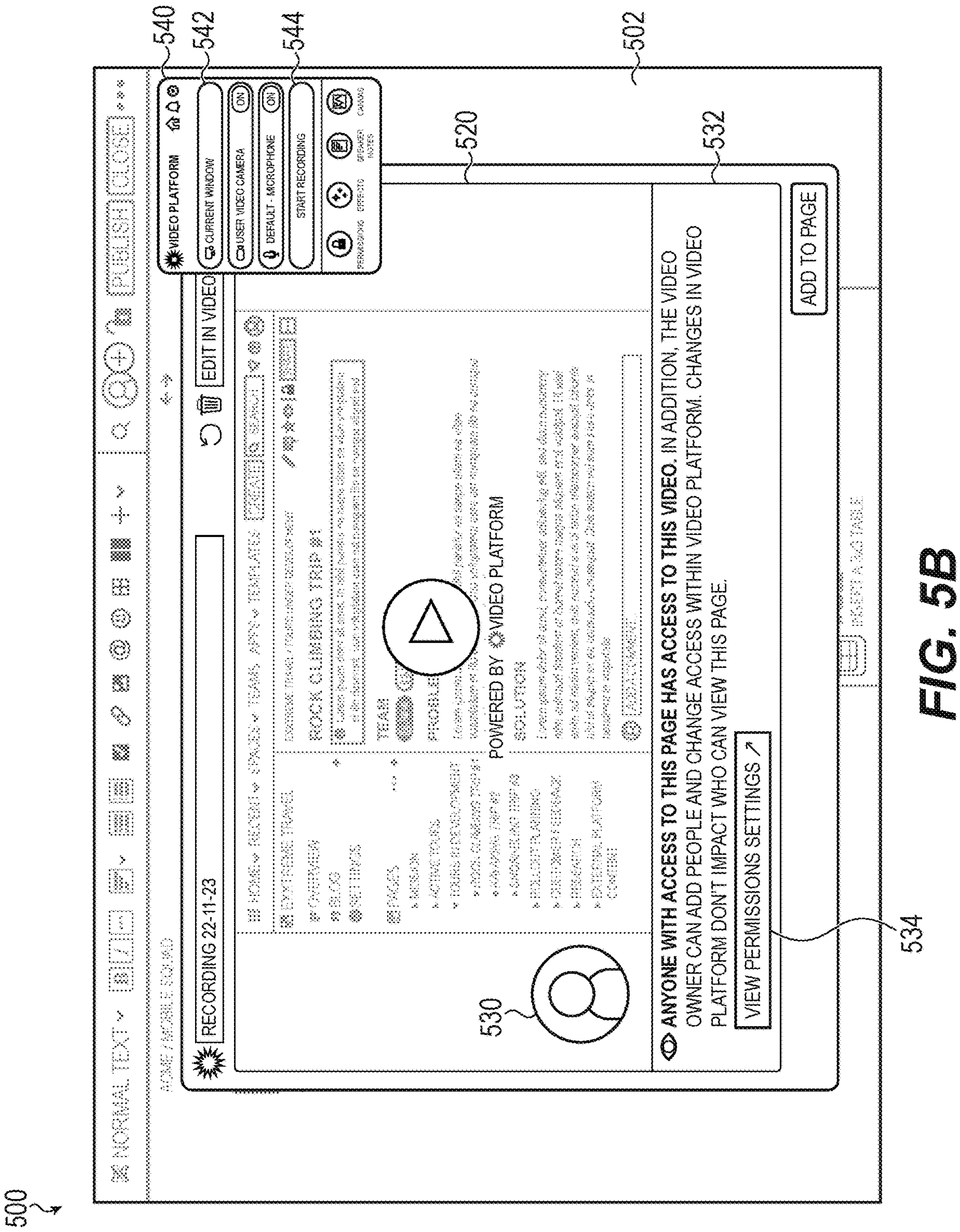

FIG. 5B illustrates the graphical user interface 500 after a user selection (e.g., a mouse click) of the content creation option 512. For example, in response to detecting the selection of the content creation option 512, a video creation interface is displayed. The video creation interface includes a content region 520, a video region 530 and a control region 540, which may be examples of similar components described herein.

The content region 520 can be configured to include content that will be captured as part of a screen recording/screen capture video object. In the example illustrated in FIG. 5B, the content region can include a content object that is selected using a first input option 542 in the control region 540. For example, the first input option 542 can be configured to receive user inputs that select a content object that will be displayed as part of the screen capture session. The content object displayed in the content region 520 may include another collaboration pages hosted by the content collaboration platform or content objects hosted by other platforms, such as an issue object managed by an issue tracking system. In some cases, video creation interface (e.g., the content region 520, the video region 530 and the control region 540) can be displayed as one or more overlay windows positioned over the current collaboration page 502.

The control region 540 may be a window that overlays the graphical user interface 500. The control region 540 can include the first input option 542 for selecting content that will be displayed in the content region. The control region 420 may include an input element that is configured to select a camera for capturing video that will be part of the screen recording/screen capture video object and an input element that is configured to select an audio source that will be used capture audio that will be part of the screen recording/screen capture video object, as described herein.

The control region 540 may also include a selectable option 544 that initiates a screen capture session for the screen recording/screen capture video object, as described herein. In response to a user input to the selectable option 544, the content collaboration system may be configured to initiate a recording session for the screen recording/screen capture video object. The screen capture session can include a screen capture of the user video region 530 overlayed with the content region 520.

The user video region 530 can display a screen capture preview of a user of the client device that is captured by a selected video camera. The user video region 530 may be overlayed with the content region 520 and/or other portions of the graphical user interface 500. The user video region 530 is illustrated a circular region, however the user video region 530 may be configured in any suitable configuration include different shapes, sizes and locations within the content region. In some cases, various aspects of the user video region 530 may configured by the user in the video creation interface.

For example, a user may resize, move and/or change a shape of the user video region 530. As with other embodiments described herein, the user video region 530 can be supplemented with a permissions notice 532 indicating permissions associated with the video. In some cases, the permissions notice 532 can be generated in response to a call from the example graphical user interface 500 (or a client application executing over a client device, as described herein) to the screen recording/screen capture platform to confirm permissions prior to rendering of the permissions notice 532. The permissions notice 532 can be accompanied by a deeplink to the screen recording/screen capture system to modify permissions of the recorded screen capture, such as with the editing affordance 534.

Figure 5C:
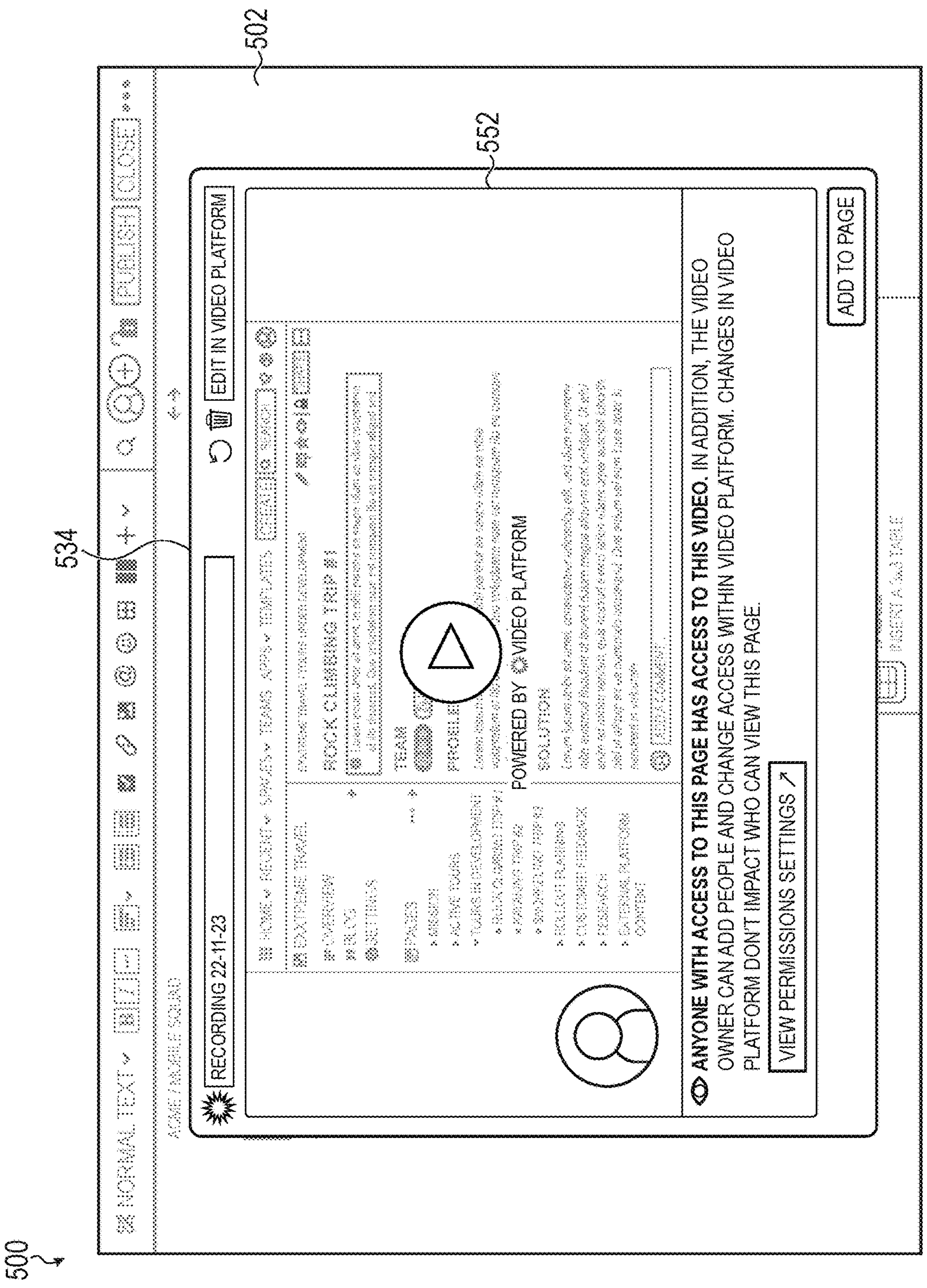

FIG. 5C illustrates the graphical user interface 500 after a user selection of a control to end a screen capture session. The graphical user interface 500 includes an editing interface window 550 that is configured to allow a user to preview the recorded screen capture, edit the video and/or edit other aspects of the video such as a title and save location, as described herein. The editing interface window 550 may be displayed as part of an operation to add the screen recording/screen capture video object to the content collaboration platform as part of a current collaboration page 502. The editing interface window 550 can include an option 554 to add the screen recording/screen capture video object 552 to the collaboration page 502 of the content collaboration system.

Figure 5D:
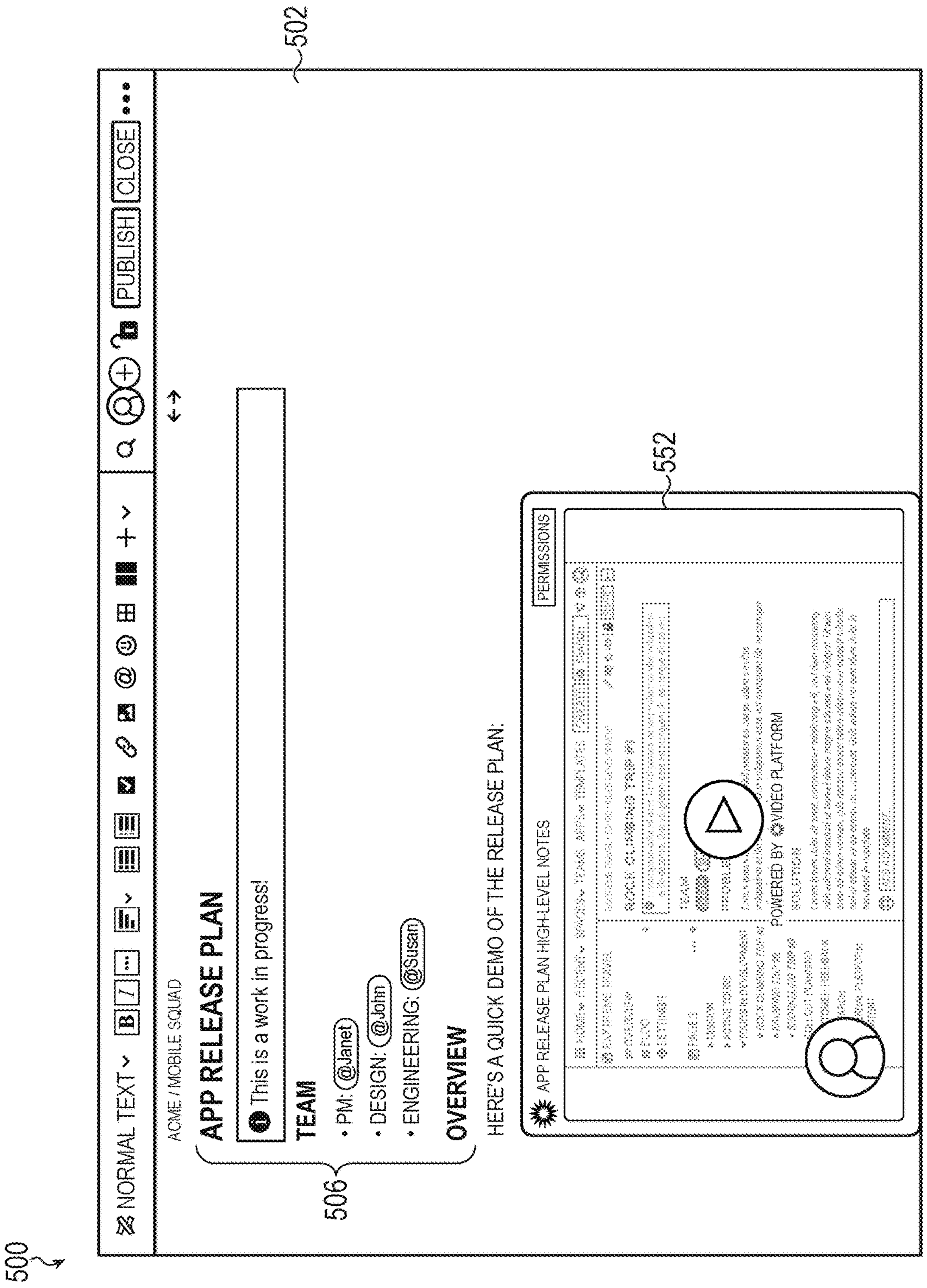

FIG. 5D illustrates the graphical user interface 500 after a user selection of the option 554 to add the screen recording/screen capture video object to the collaboration page 502. The collaboration page 502 can include the user generated content 506 and the screen recording/screen capture video object 542. The screen recording/screen capture video object 542 may be added to the collaboration page 502 based on a location of the command 508 entered in the content region. The screen recording/screen capture video object 542 may be formatted to have a defined alignment with respect to the content 506 (e.g., inline). The screen recording/screen capture video object 542 may include controls to play, pause or perform other function and the collaboration system can cause the video to be played within the user interface 500.

Figure 5E:
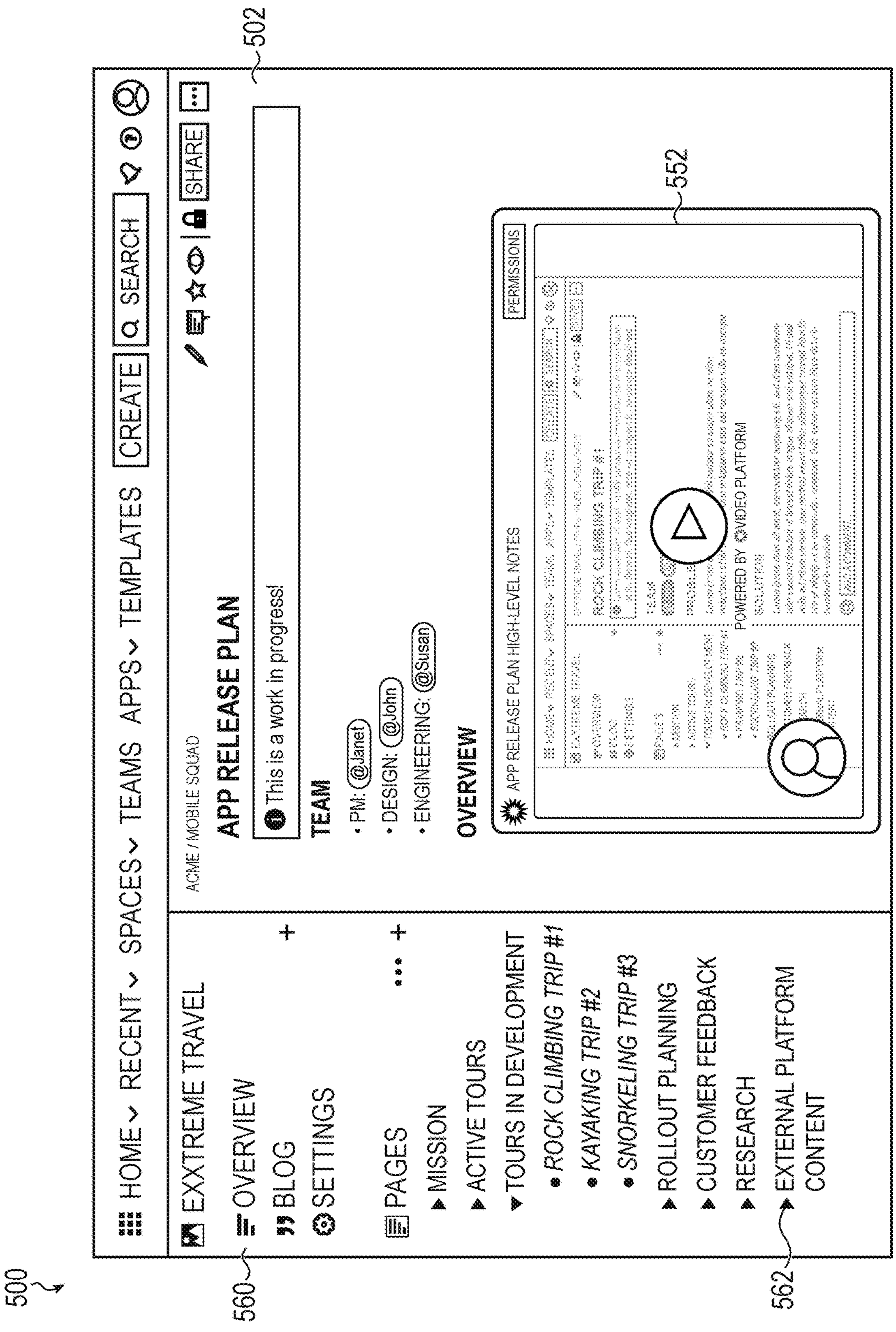

FIG. 5E illustrates an example of the graphical user interface 500 in a mode that displays a navigation panel 560 for the content collaboration system. The navigation panel 560 can be an example of the navigation panels described herein and include a selectable tree element 562 that is created for the collaboration page 502, which may be an example of the selectable tree elements described herein. The selectable tree element 562 can be configured to define a hierarchical relationship of the collaboration page with respect to other collaboration pages or content items described herein. Selection of the tree element 562 can cause the graphical interface 500 to display the collaboration page 502 including the screen recording/screen capture video object 552.

These foregoing embodiments depicted in FIGS. 5A-5E and the various alternatives thereof and variations thereto are presented, generally, for purposes of explanation, and to facilitate an understanding of various elements of a graphical user interface that can be leveraged by a user to capture and/or modify content stored by a first platform (video content) from a different platform (e.g., documentation platform) . . . , such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6A:
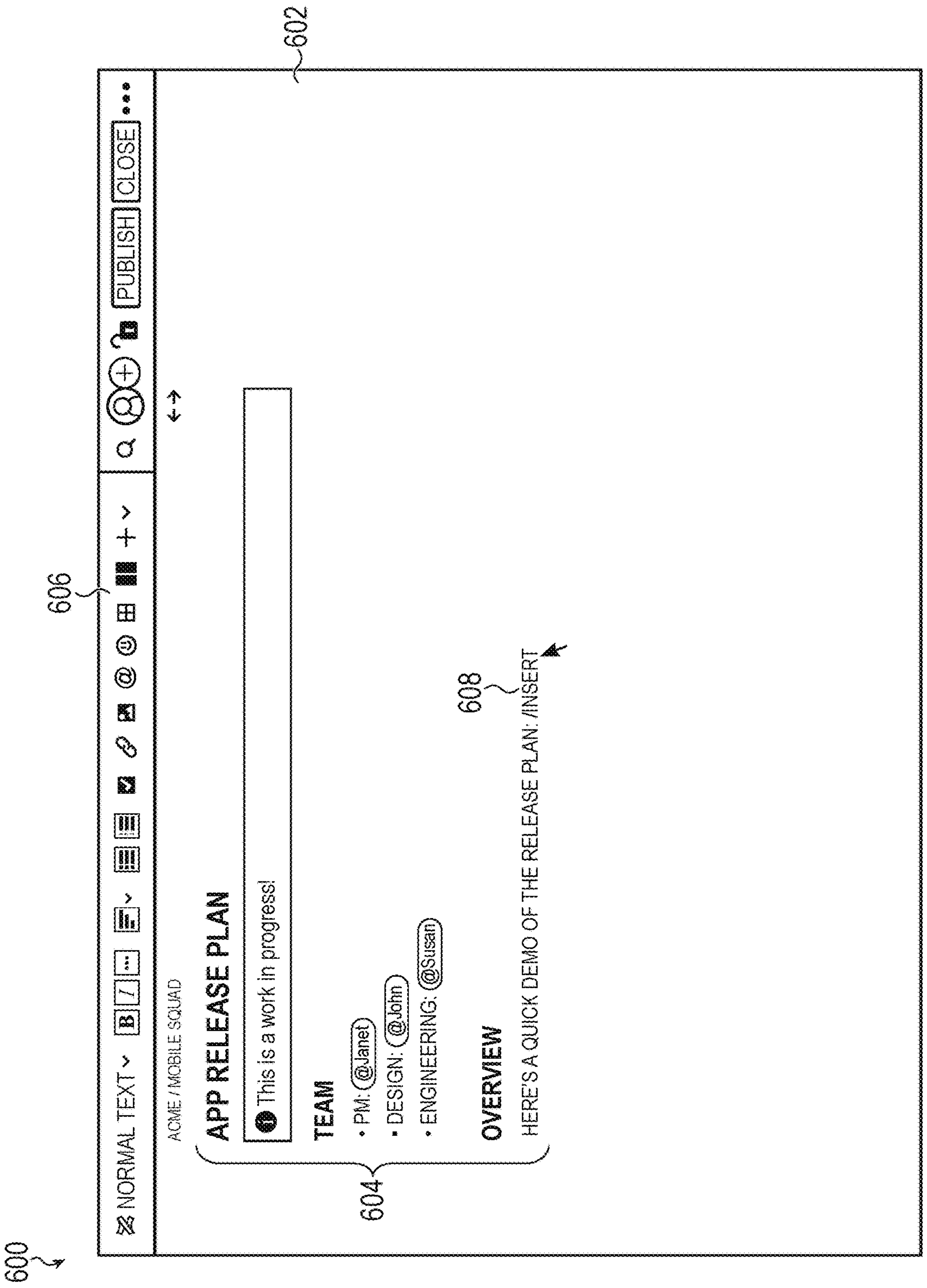
FIGS. 6A-6C depict an example graphical user interface, the graphical user interface for adding a screen recording/screen capture video object to a content panel region of a content collaboration interface.
Figure 6B:
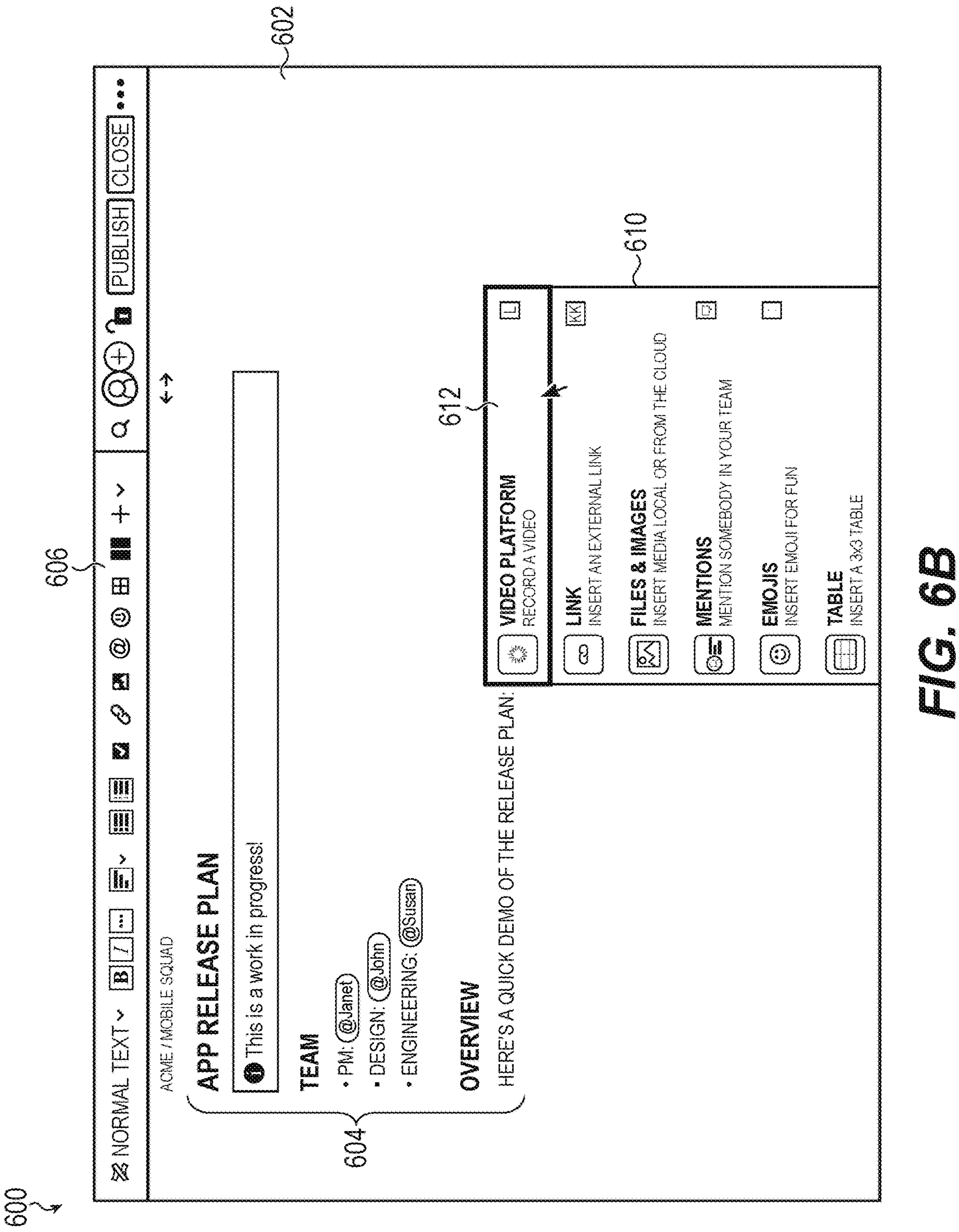
Figure 6C:
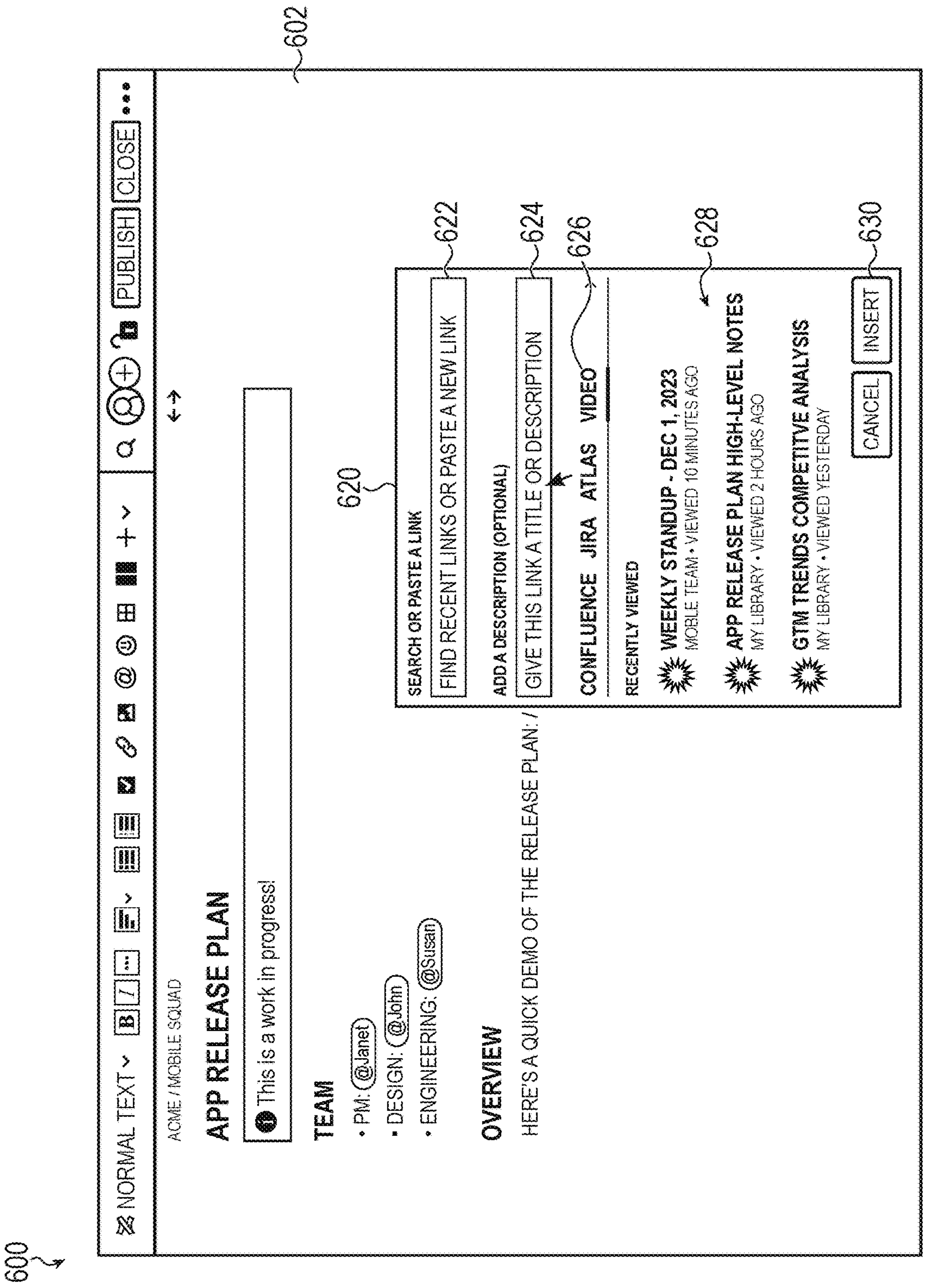

FIGS. 6A-6C depict an example graphical user interface, the graphical user interface 600 for adding a screen recording/screen capture video object to a content panel 602 of a content collaboration interface. The graphical user interface 600 illustrated in FIGS. 6A-6C depict operation of the content collaboration system that allows a screen recording/screen capture video object that has already been created to be added to the content panel 602.

The graphical user interface 600 may be an example of the graphical user interfaces described herein and the frontend or client application may operate in one of a number of different modes, as described herein. The graphical user interface 600 may allow the user to create, edit, or otherwise modify user-generated content 604 that is stored as an electronic document or page (e.g., in the data store 116-1 of the content collaboration system 112-1), as described herein.

The graphical user interface 600 shown in FIG. 6A is a rendering of an electronic document, page, or electronic content. The electronic document, page, or electronic content may be rendered on a client device by the content collaboration system 112-1. In one example, the graphical user interface 600 may be in a mode that displays a collaboration page 602 (which also may be referred to herein as a content panel) and have various partitions/sections displaying different tools. For example, the graphical user interface 600 may include a toolbar 606, which may be an example of similar components described herein.

The graphical user interface 600 may be configured to receive one or more commands for adding a screen recording/screen capture video object to the content panel collaboration page 602 of the content collaboration system. The one or more commands may cause the content collaboration system to instantiate a service that can be used to add a screen recording/screen capture video object to the collaboration page 602. In some cases, the command may be initiated using the toolbar 606, which may include a content creation control and a user input to the content creation control can cause display of a menu having various options for adding different types of content to the collaboration page 602.

In the example shown in FIG. 6A, the video creation service may be initiated by a command 608 entered in the content region of the collaboration page 602. The command 608 can include a command character ("/"), which may be used to designate the first portion of the textual input as an object-creation command. The command 608 may also include a main command portion, which can be used to designate the service/external platform to be invoked (e.g., the video creation service).

In response to the command 608 entered into the collaboration page 602, the system may display a service selection window 610 shown in FIG. 6B. The service selection window 612 can include one or more selectable options adding a screen recording/screen capture video object to the collaboration page 602. The service selection window 610 may include a content insert option 612.

FIG. 6C illustrates the graphical user interface 600 after a user selection (e.g., a mouse click) of the content insert option 612. In response to detecting the selection of the content insert option 612, an content selection menu 620 is displayed. The content selection menu 620 can include various input elements for searching for an selecting a content object (e.g., a screen recording/screen capture video object) that will be added to the collaboration page 602.

The content selection menu 620 can include a text input region 622 that is configured to receive text inputs from a client device and generate a search query for a content object. The content collaboration system may cause the search query to be performed in an external platform such as a platform the manages content video, or other suitable platform. Additionally or alternatively, the text input region 622 can be configured to receive a web-based link to a content object, which can be configured to cause the system to retrieve the corresponding content object from the linked location.

The content selection menu 620 can also include a second text input region 624 for generating a title, description or other data that is associated with the retrieved content object. For example, text inputs to the second text input region 624 may include a title that is saved as metadata and associated with the content object at the content collaboration platform and/or displayed in the collaboration page in relation to or as part of the content object.

The content selection menu 620 can include an external service selector 626 which can be configured to limit a search query generated from inputs to the text input region 622 to a particular service. For example, if the video platform service is selected, the content collaboration system may generate search queries specifically for the video platform service. The search query may be formatted according to a defined query scheme for the video platform service. Additionally or alternatively, if the video platform service is selected at the service selector 626, the content collaboration platform may initiate one or more API calls to the video platform service. In some cases, the service selector 626 may allow selection of multiple external platform services and the content collaboration service may generate platform specific queries for each platform and/or API calls for each selected platform.

The content selection menu 620 can include a results region 628, which displays content results that can be inserted as content object into the content collaboration page 602. In the example shown in FIG. 6C, the video platform service is selected at the service selector and the results region 628, include screen recording/screen capture video objects that can be inserted from a video platform service. The content collaboration can be configured to a allow selection of a particular screen recording/screen capture video object. Selection of the insert command 630 can cause the selected screen recording/screen capture video object to be added to the content collaboration page 602.

Figure 7A:
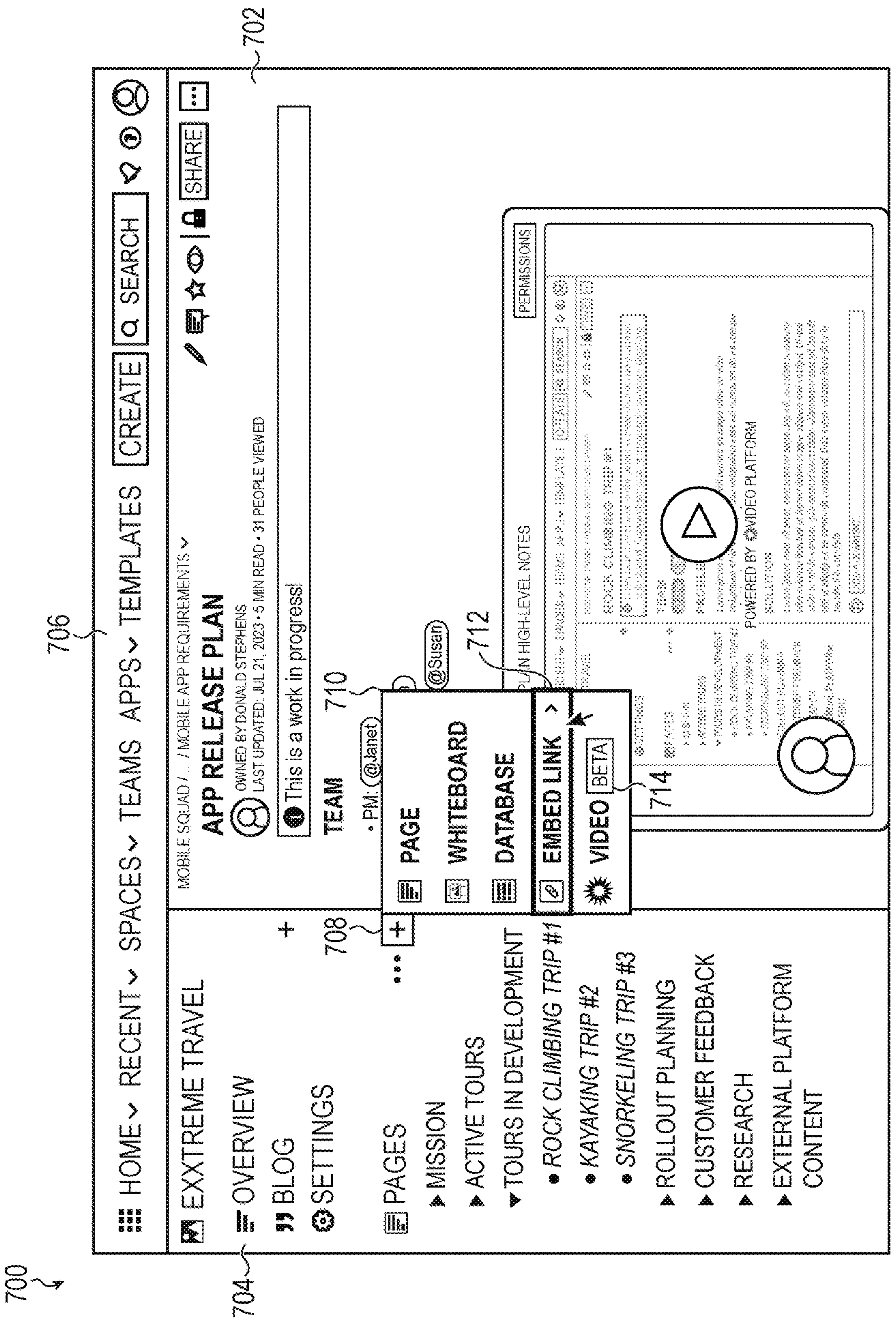
FIGS. 7A-7C depict an example graphical user interface, the graphical user interface for adding a video content object using a hierarchical content tree.
Figure 7B:
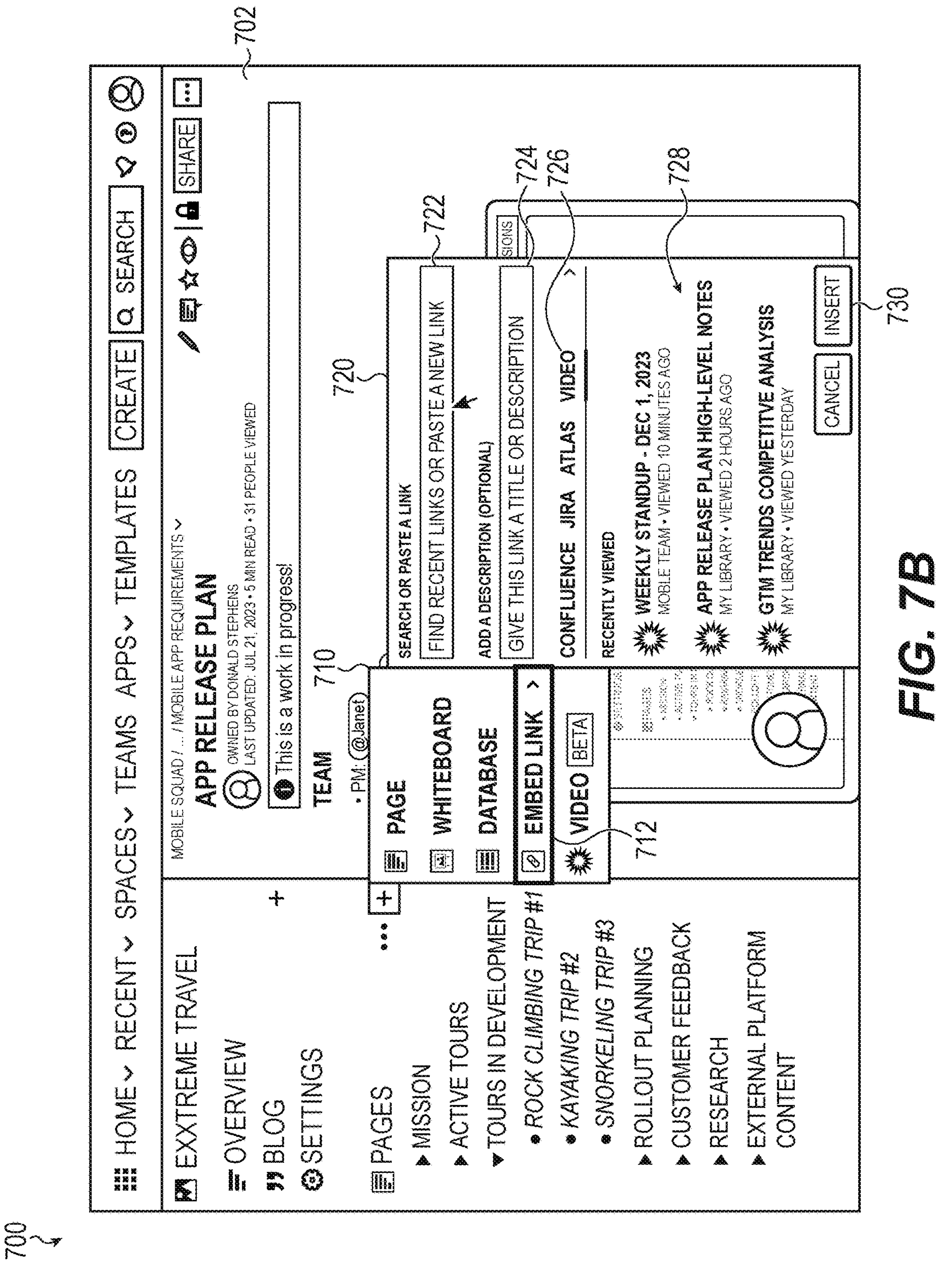
Figure 7C:
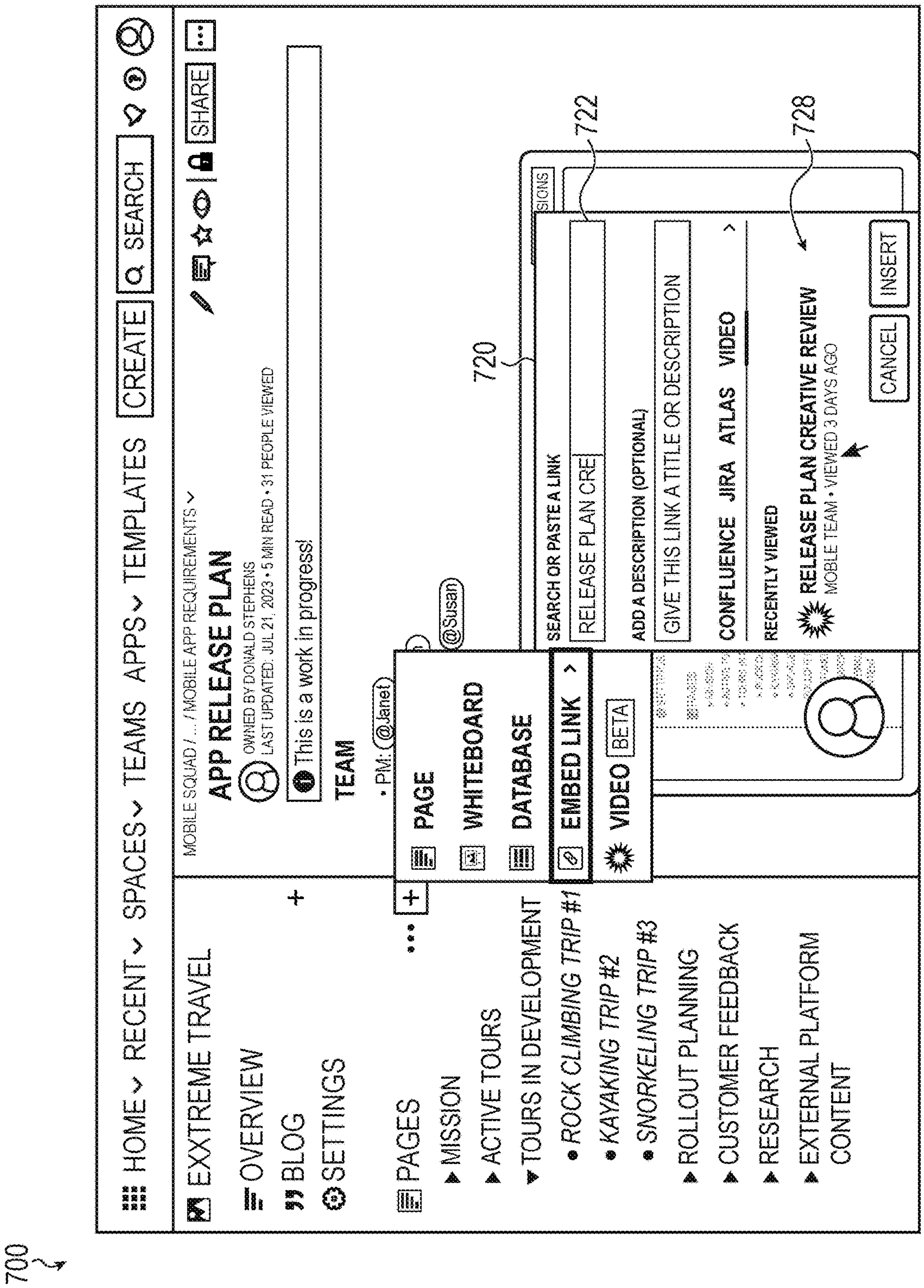

FIGS. 7A-7C depict an example graphical user interface, the graphical user interface 700 for adding a video content object using a hierarchical content tree. The graphical user interface 700 illustrated in FIGS. 7A-7C depicts operation of the content collaboration system that allows a screen recording/screen capture video object that has already been created to be added to a content panel 702.

The graphical user interface 700 may be an example of the graphical user interfaces described herein and the frontend or client application may operate in one of a number of different modes, as described herein. The graphical user interface 700 may allow the user to create, edit, or otherwise modify user-generated content that is stored as an electronic document or page (e.g., in the data store 116-1 of the content collaboration system 112-1), as described herein.

The graphical user interface 700 shown in FIG. 7A is a rendering of an electronic document, page, or electronic content. The electronic document, page, or electronic content may be rendered on a client device by the content collaboration system 112-1. In one example, the graphical user interface 700 may be in a mode that displays a collaboration page 702 (which also may be referred to herein as a content panel) and have various partitions/sections displaying different tools. For example, the graphical user interface 700 may include a navigation panel 704 and a toolbar 706, which may be an example of similar components described herein.

The graphical user interface 700 may be configured to receive one or more commands for adding a screen recording/screen capture video object to the content panel collaboration page 702 of the content collaboration system. The one or more commands may cause the content collaboration system to instantiate a service that can be used to add a screen recording/screen capture video object to the collaboration page 702.

In the example shown in FIG. 7A, the video creation service may be initiated using the navigation panel 704. The navigation panel 704 can include a selectable element 708 that causes a service selection window 710 to be displayed. The service selection window 710 can include one or more selectable options adding content objects include a screen recording/screen capture video object to the collaboration page 702. The service selection window 710 includes an insert link option 712, which may be used to add a saved screen recording/screen capture video object to the collaboration page. The service selection window 710 can also include a create video option 714, which can cause a video-generation service to be launched and used to create a new screen recording/screen capture video object as described herein.

FIG. 7B illustrates the graphical user interface 700 after a user selection (e.g., a mouse click) of the link insert option 712. In response to detecting the selection of the link insert option 712, a content selection menu 720 is displayed. The content selection menu 720 can include various input elements for searching for an selecting a content object (e.g., a screen recording/screen capture video object) to add to the collaboration page 702.

The content selection menu 720 can include a text input region 722 that is configured to receive text inputs from a client device and generate a search query for a content object. The content collaboration system may cause the search query to be performed at an external platform such as a platform the manages video content, or other suitable platform. Additionally or alternatively, the text input region 722 can be configured to receive a web-based link to a content object, which can be configured to cause the system to retrieve the corresponding content object from the linked location.

The content selection menu 720 can also include a second text input region 724 for generating a title, description or other data that is associated with the retrieved content object. For example, text inputs to the second text input region 724 may include a title that is saved as metadata associated with the content object at the content collaboration platform and/or displayed in the collaboration page in relation to or as part of the content object.

The content selection menu 720 can include an external service selector 726 which can be configured to limit a search query generated from inputs to the text input region 722 to a particular service. For example, if the video platform service is selected, the content collaboration system may generate search queries specifically for the video platform service. The search query may be formatted according to a defined query scheme for the video platform service. Additionally or alternatively, if the video platform service is selected at the service selector 726, the content collaboration platform may initiate one or more API calls to the video platform service. In some cases, the service selector 726 may allow selection of multiple external platform services and the content collaboration service may generate platform specific queries for each platform and/or API calls for each selected platform. The content selection menu 720 can include a results region 728, which displays content results that can be inserted as a content object into the content collaboration page 702.

In the example shown in FIG. 7C, the video platform service is selected at the service selector and the results region 728 includes screen recording/screen capture video objects that can be inserted from a video platform service. Additionally, the system has received text input to the text input region and updated the results region 728 based on a query generated from the received text input. For example, in response to performing a search query using the received text input, the collaboration system has received a single screen recording/screen capture video object result, which is displayed in the results region. The content collaboration can be configured to a allow selection of the particular screen recording/screen capture video object. Selection of the insert command 630 causes the selected screen recording/screen capture video object to be added to the content collaboration page 702.

These foregoing embodiments depicted in FIGS. 6A-7C and the various alternatives thereof and variations thereto are presented, generally, for purposes of explanation, and to facilitate an understanding of various configurations of a graphical user interface that can accompany a system such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 8:
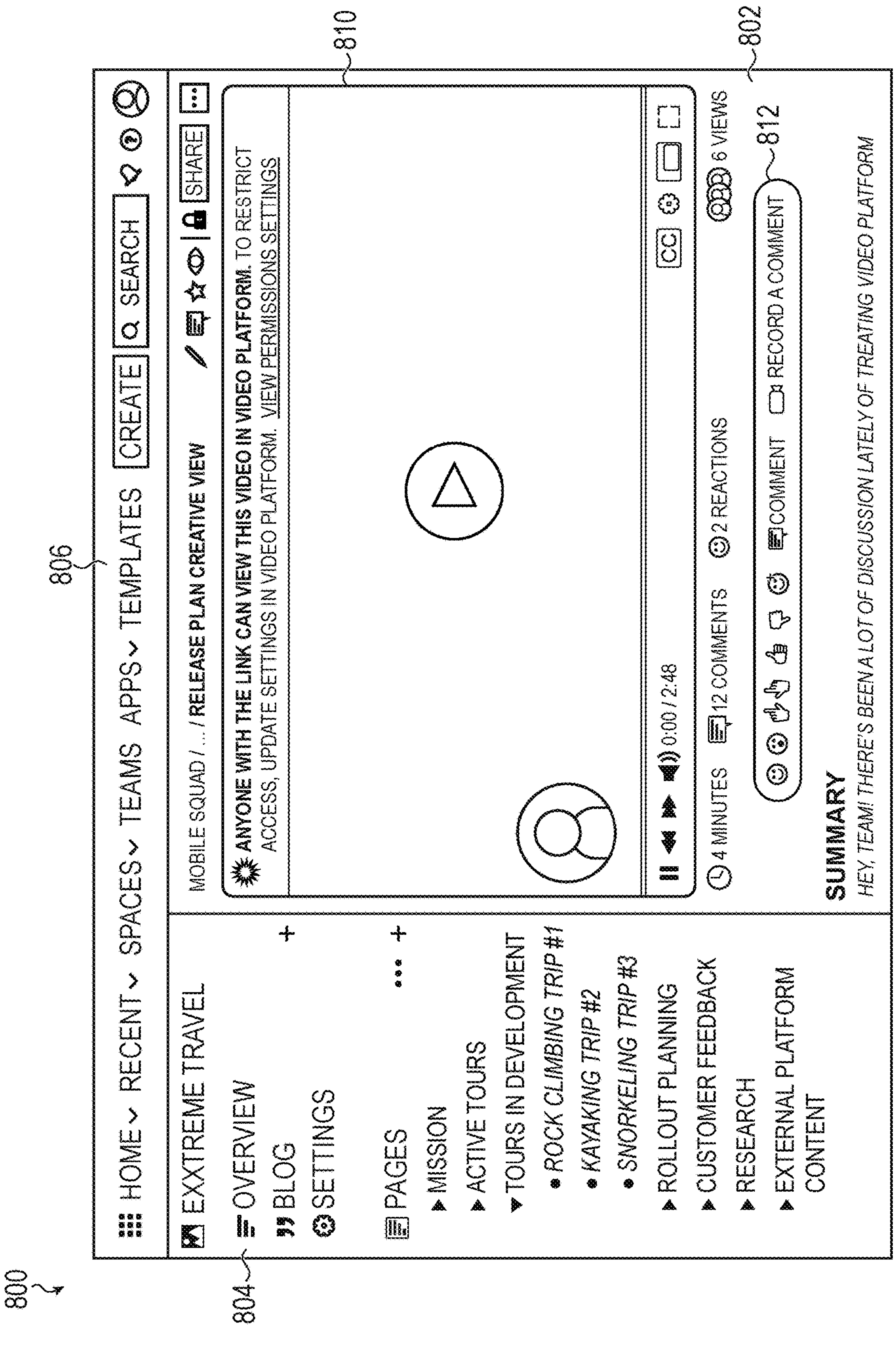
FIG. 8 depicts an example user interface for adding comments to a screen recording/screen capture video object embedded in a content-creation region.

For example, FIG. 8 depicts an example user interface 800 for adding comments to a screen recording/screen capture video object 810 embedded in a collaboration page 802. The graphical user interface 800 may be an example of the graphical user interfaces described herein and the frontend or client application may operate in one of a number of different modes, as described herein. The graphical user interface 800 may allow the user to create, edit, or otherwise modify user-generated content that is stored as an electronic document or page (e.g., in the data store 116-1 of the content collaboration system 112-1), as described herein.

The graphical user interface 800 shown in FIG. 8 is a rendering of an electronic document, page, or electronic content. The electronic document, page, or electronic content may be rendered on a client device by the content collaboration system 112-1. In one example, the graphical user interface 800 may be in a mode that displays a collaboration page 802 (which also may be referred to herein as a content panel) and have various partitions/sections displaying different tools. For example, the graphical user interface 800 may include a navigation panel 804 and a toolbar 806, which may be an example of similar components described herein.

In response to adding the screen recording/screen capture video object 810 to the collaboration page 802, the content collaboration system can be configured to add a comment element 812 to the collaboration page 802 or receiving and displaying comments or other reactions to the screen recording/screen capture video object 810. In some cases, the comment element 812 the collaboration system may automatically add the comment element 812 in response to a screen recording/screen capture video object being added to the collaboration page 802. In other cases, the comment element 812 may be added in response to a user input or command.

The comment element 812 can be configured to receive different types of inputs from client device. For example, the comment element 812, may be configured to receive and display text based inputs, emojis, voice inputs, video inputs, or other inputs from various users of the system. As with other embodiments, the screen recording/screen capture video object 810 can be decorated with a permissions banner 814 that clearly indicates to viewers of the page and/or administrators of the page who is permitted to view the screen recording/screen capture video object 810.

Figure 9:
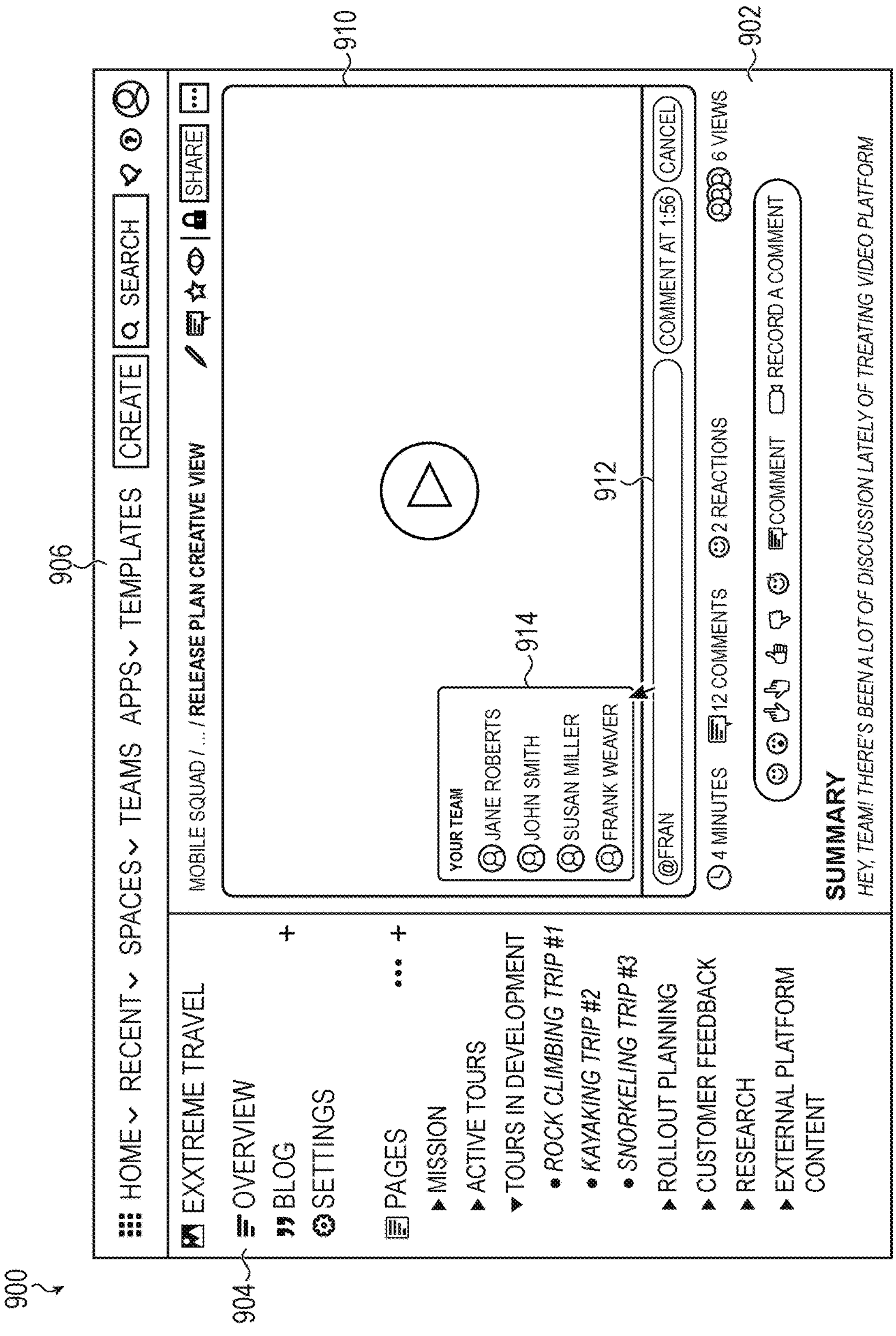
FIG. 9 depicts an example user interface for adding comments to a screen recording/screen capture video object displayed in a content collaboration interface.

FIG. 9 depicts an example user interface 900 for modifying a screen recording/screen capture video object 910 displayed in a content collaboration page 902. The graphical user interface 900 may be an example of the graphical user interfaces described herein and the frontend or client application may operate in one of a number of different modes, as described herein. The graphical user interface 900 may allow the user to create, edit, or otherwise modify user-generated content that is stored as an electronic document or page (e.g., in the data store 116-1 of the content collaboration system 112-1), as described herein.

The graphical user interface 900 shown in FIG. 9 is a rendering of an electronic document, page, or electronic content. The electronic document, page, or electronic content may be rendered on a client device by the content collaboration system 112-1. In one example, the graphical user interface 900 may be in a mode that displays a collaboration page 902 (which also may be referred to herein as a content panel) and have various partitions/sections displaying different tools. For example, the graphical user interface 900 may include a navigation panel 904 and a toolbar 906, which may be an example of similar components described herein.

In some cases, the screen recording/screen capture video object 910 may include a comment function 912. The comment function 912 may be part of the comment 812 and be used to comment on specific portions of a video. For example, the comment function 912 may be associated with a particular time point or time range of a video. Initiating a comment at a particular time of the video, can result in the comment being associated with that time point. In some cases, when a comment is received using the comment function 912, the screen recording/screen capture video object may display the correspond time point or portion of the video. For example, in response to a user viewing a particular comment associated with a particular time of the video, the collaboration system can cause the video to start playing at that time point.

In some cases, the screen recording/screen capture video object 910 may also be associated with a user team. For example, posting the screen recording/screen capture video object may cause an alert to be sent to members of a team. In some cases, in response to initiating a comment using the comment function 912, the collaboration system may display a window 914 showing user avatars for the team.

A commenting user, may select one or more avatars from the window, which may cause an alert to be sent to user associated with the selected avatar(s) when the comment is posted to the screen recording/screen capture video object. For example, the functionality may allow a commenting user to generate a comment about a particular portion of the screen recording/screen capture video object and also designate another user to be alerted to the comment (e.g., so that the designated user can respond, review or otherwise be alerted to the comment).

These foregoing embodiments depicted in FIGS. 1-9 and the various alternatives thereof and variations thereto are presented, generally, for purposes of explanation, and to facilitate an understanding of various configurations and constructions of a system for creating content (e.g., screen capture), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 10:
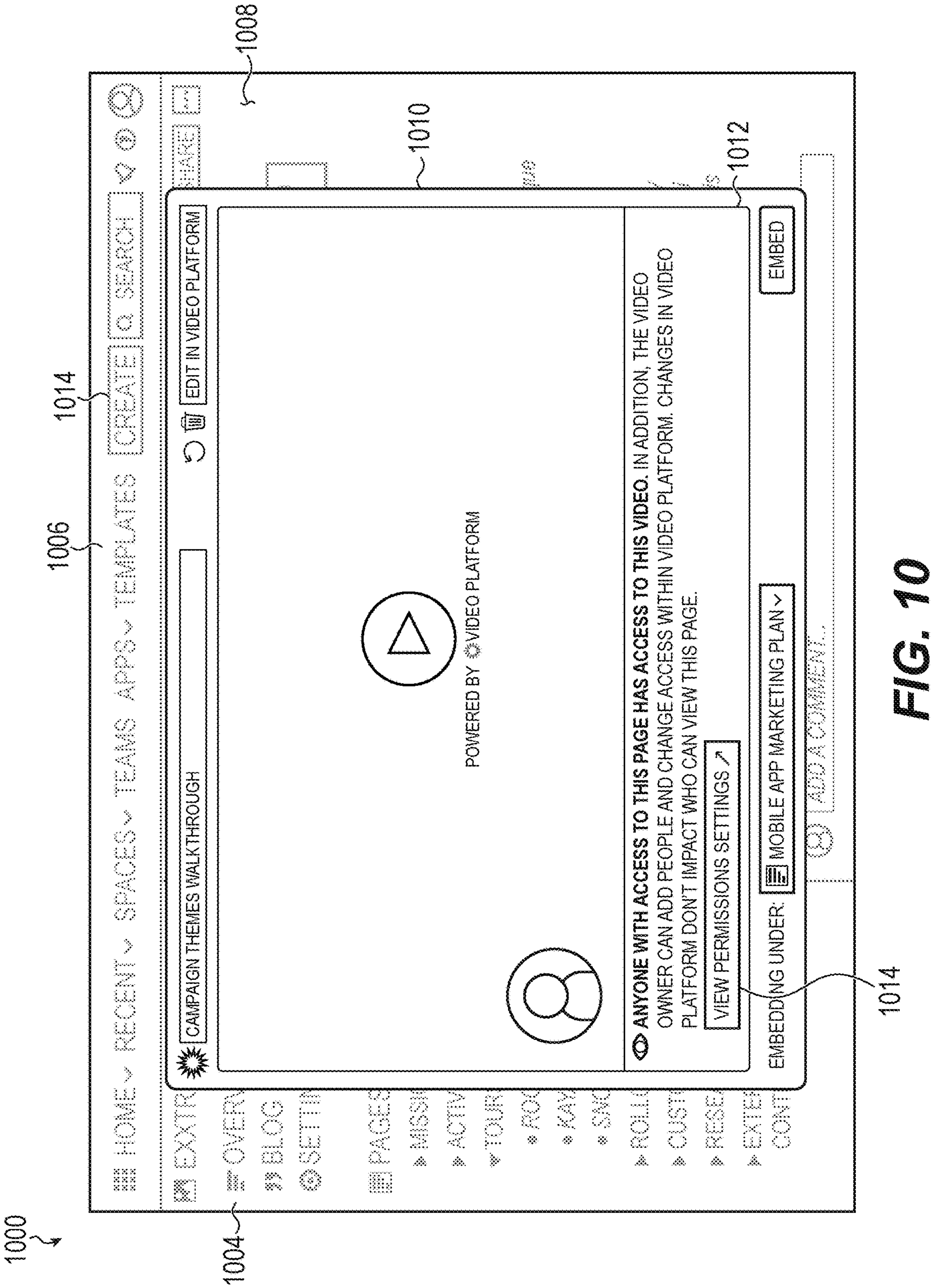
FIG. 10 depicts an example user interface for displaying permissions information in respect of a third-party embedded screen recording/screen capture video object displayed in a content collaboration interface.

As with other embodiments described herein, FIG. 10 depicts a graphical user interface that may facilitate operation of systems described herein by a user. The graphical user interface can be rendered over a physical display of a client device, such as a laptop computer, a cellular phone, or the like. The display can include an active display area leveraged by a browser application or native application executing by cooperation of a processor and memory of the same client device. For simplicity of description the embodiments described herein focus to browser application implementations, but it may be appreciated that this is not required and native applications are likewise suitable.

The frontend application (in this case, a web browser application) communicably coupled to a backend application instance (e.g., one or more servers associated with a collaboration platform as described herein). The frontend application receives a URL at an address bar, causing the web browser application to submit a page load request to the backend application instance. In response, the backend application instance can determine whether the frontend application instance is authenticated to the backend application instance. In many cases, this may take the form of an analysis of headers, cookies, or GET parameters transmitted with the page load request from the browser application. In many cases, if a user has authenticated to the backend application instance, a cookie or JWT may be stored in local storage, local to the web browser application. Thereafter, this user-specific information (which may include an email address, an account ID, an account name, a user name, or any of the like) may be transmitted with each and every request for new pages from the browser to the backend application instance. In response, the backend application instance compares the presented user data (more generally, the "data item") with currently-active and authenticated sessions to determine whether to serve content to the frontend application. Upon determining that the data item is associated with an active and authenticated session, the backend application will serve the requested content to the web browser.

Once the content is received, the web browser can leverage a rendering engine, an execution engine, and/or a styling engine to render a graphical user interface with one or more elements that can present information to a user or receive information from a user.

More generally, as with other embodiments described above, the graphical user interface 1000 shown in FIG. 10 depicts a rendering of an electronic document, page, or electronic content. The graphical user interface 1000 can be partitioned in a manner to display different content or content types. For example, the graphical user interface 1000 may include a navigational panel 1004, a toolbar 1006, and a content panel 1008, which may be examples of similar components described herein.

The graphical user interface 1000 may be configured to receive one or more commands for adding a screen recording/screen capture video object to the content panel 1008 of the content collaboration system. These commands can be received by the frontend application, which can in response generate one or more request to the backend application instance and/or to a backend application instance of a screen capture platform or service.

As with other embodiments described herein, the one or more commands may cause the content collaboration system to instantiate a video creation service that includes a video creation window for generating a screen recording/screen capture video object at the content collaboration system.

In some cases, the command may be initiated using the toolbar 1006, which may include a content creation control 1014 and a user input to the content creation control 1014 can cause display of a menu having various options for adding different types of content to the content panel 1008. In some cases, the different types of content may include remote content that is managed by an external platform as described herein.

As described above, the content creation control 1014 can include a content creation option that generates a command to initiate creation of a screen recording/screen capture video object that will be added to the content panel 1008 and/or used to generate a new content item stored at the hierarchical document tree 1004. In other cases, the command may initiated through a variety of other ways including text entered into a command line or other text input entered into the content panel 1008. For example, the command line may include a command character ("/"), which may be used to designate the first portion of the textual input as a link-insertion command. The command line may also include a main command portion, which can be used to designate the service/external platform to be invoked. In response, to a command entered into the content panel 1008, the system may display a service selection window, which may include one or more selectable options for creating and/or opening video creation service from the graphical user interface 1000.

After a user selection of the content creation option, a video creation interface is displayed, after which the user may create a screen capture or video. Once the user video is complete and the user marks the video recording/screen capture recording as finished, a new video object or multimedia file is stored/created/uploaded to the screen recording platform and a modal window 1010 may be rendered in the graphical user interface 1000 to display the video for the user. In response, the screen recording platform can return to the frontend or backend application instance an address to which the newly-created video media is anchored. In other words, the address can be used to access the video content just created at a later time.

However, as noted above, in many cases, permissions to access the video may be set by the third-party system in this case, the screen capture platform. In some cases, permissions to access videos may be set by default to the public access.

To mitigate risks associated with public access to the newly-created video, the frontend application instance and/or the backend application instance—and/or the user of the frontend application instance—can instruct the third-party video platform to modify default permissions. More particularly, the third-party platform can be instructed to modify permissions of the video to only a particular group, identified by a user group identifier. In some cases, the collaboration platform may create and/or assign the user group identifier. In other cases, the collaboration platform may instruct the third-party platform to create a new user group identifier. In many cases, the user group identifier may be based on (and in some cases, identical to) an identifier associated with the page or space into which the newly-created media is embedded. For example, if the screen recording is embedded into page 123, the group identifier defining permissions for the video as stored/hosted by the third-party platform may be the string of characters 123. In other cases, another user group identifier or other arbitrary string of characters can be selected by the backend application instance or the third-party platform to identify a group of users that have permission to access the screen recording.

In some cases, video permissions may be further limited to only requests that originate from within an iframe, but this is not required of all embodiments.

After permissions modifications are instructed and executed after a user has created video content, in order to access the video, a requesting user must be a member of the group identified by the user group identifier as stored by the permissions system of the third-party platform.

A conventional system or solution would require creation of new user accounts at the third-party platform in order to associate users of the two systems together, and to synchronize user group associations between both systems. However as noted above, this problem is readily solved by maintaining an association between the group-level permissions of both platforms in an association table. More specifically, a one-way association between permissions of the collaboration platform and permissions of the screen capture platform. In this manner, whichever user accounts are permitted to access the page into which the video is embedded, those user accounts are also permitted to access the video/screen capture that is embedded in that page.

As noted in respect of other embodiments described herein, the association table can be created and/or updated each time a page with an embedded third-party object is saved, published, or permissions modified. In response to these and other similar events, the collaboration platform and the third-party tool can mutually ensure that user group identifiers and/or page identifiers are appropriately synchronized.

With this architecture in place, a user who has access to a page can attempt to access the page by submitted a page request via a browser application, such as shown in FIG. 10. In response, the collaboration platform can authenticate the user by comparing headers, cookies, or other data items to active session lists maintained by an identity service, a session service, a gateway service, or any other suitable backend service of the backend application instance. In response to successful authentication, the page content can be sent in a response to the browser application, which will begin loading resources defining the requested page. Among such resources may be an iframe in which the embedded content hosted by the third-party platform is referenced. The browser application, in the ordinary course of page-loading, submit a request to the third-party system. Along with the request to the third-party system, the web browser transmits all or a portion of the user data used to authenticate the user to the collaboration system backend. As an example, the user data can include a name, a username, an email, a JWT, or similar.

The third-party system receives the page load request and determines whether the data item received corresponds to an active session having already been authenticated to the third-party system. However, as may be appreciated by a person of skill in the art, the third party system may not have an active session with precisely the presented data item; ordinarily the third-party system may reject the attempted access and return a 403 or similar server error.

For embodiments described herein, however, the third-party system may leverage the collaboration platform to determine whether the data item submitted to the third-party platform is associated with the user group identifier that was previously associated with the page-level permissions of the parent page that embeds the video object. More particularly, the third-party platform (the screen recording/capture tool/ platform) can submit an authenticate request to the collaboration platform which can, in response, return an authentication decision in respect of the association between the data item (identifying or associated to a particular user) and at least one user group identifier of the requested video object. If an association is found, the collaboration tool submits a message or authentication request response back to the third-party platform which can, in response, serve the video to the frontend application instance as requested.

The above-described authentication process introduces a number of control points that allow for more granular permissions control of both native content (e.g., page content of a rendered page of the documentation platform) and embedded content. For example, because the user group identifier represents a local association between a particular embedded content item and a particular parent page, either the parent page or the third-party content host can revoke permissions at any time. More specifically, by changing or deleting the user group identifier from within the third-party platform, the video will no longer be accessible from previous embed locations. Similarly, by changing or deleting an association between a particular page (or content identifier) and a user group identifier from the collaboration tool side, content will likewise not authenticate and the third-party video may be effectively blocked from view via any channel.

In view of the foregoing, it may be appreciated that third party content—whether video content or otherwise—can have permissions that are logically linked to the group of users able to access other content in which the third-party content is embedded. More simply, whomever can view a page that embeds content, can also view the embedded content without requiring a copy of the content to be made, without requiring permissions be reduced for the third-party content, and without removing control over the third-party content from the third-party content host.

Once the assignment of a user group identifier and an association between the user group identifier are created by saving, publishing, or modifying permissions of the page, a permissions information banner 1012 can be rendered within the graphical user interface 1000. The user interface can further include a permissions modification affordance 1014.

Figure 11:
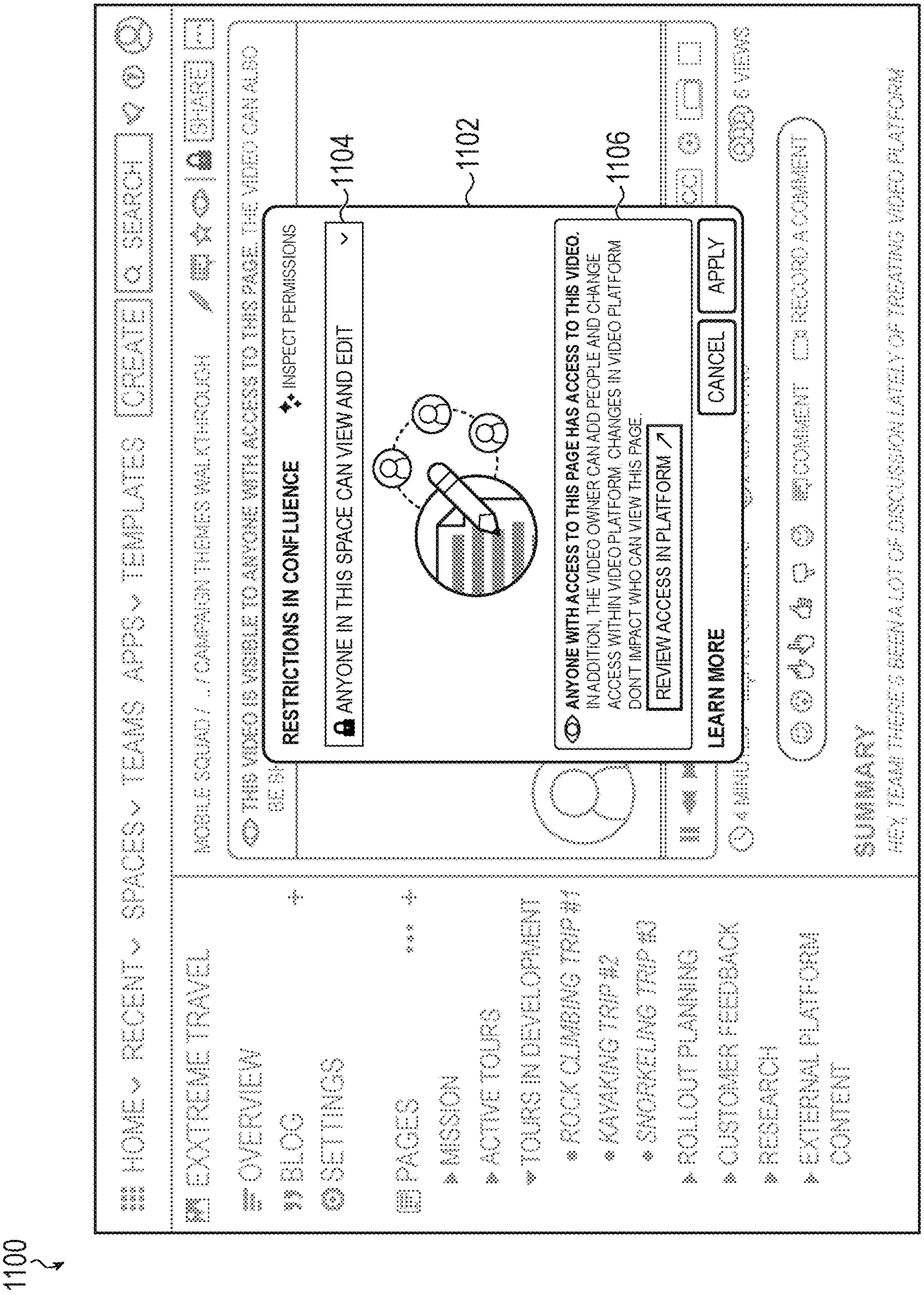
FIG. 11 depicts an example user interface for managing permissions in respect of a third-party embedded screen recording/screen capture video object displayed in a content collaboration interface.

FIG. 11 depicts a graphical user interface 1100 in which a modal permissions dialog modification window 1102 is rendered. The graphical user interface 1100 can be rendered in response to user engagement with the content creation control 1014 as shown in FIG. 10. The modal permissions dialog modification window 1102 can include a dropdown menu 1104 that can be used by a user to control permissions of the video content/screen capture from the user interface 1100 itself, without requiring the user to access the third party tool (in the illustrated example, the screen capture system). As an alternative option, the graphical user interface 1100 can also include an affordance 1106 describing current permissions while also offering an opportunity to manage permissions on the screen capture platform itself.

Figure 12:
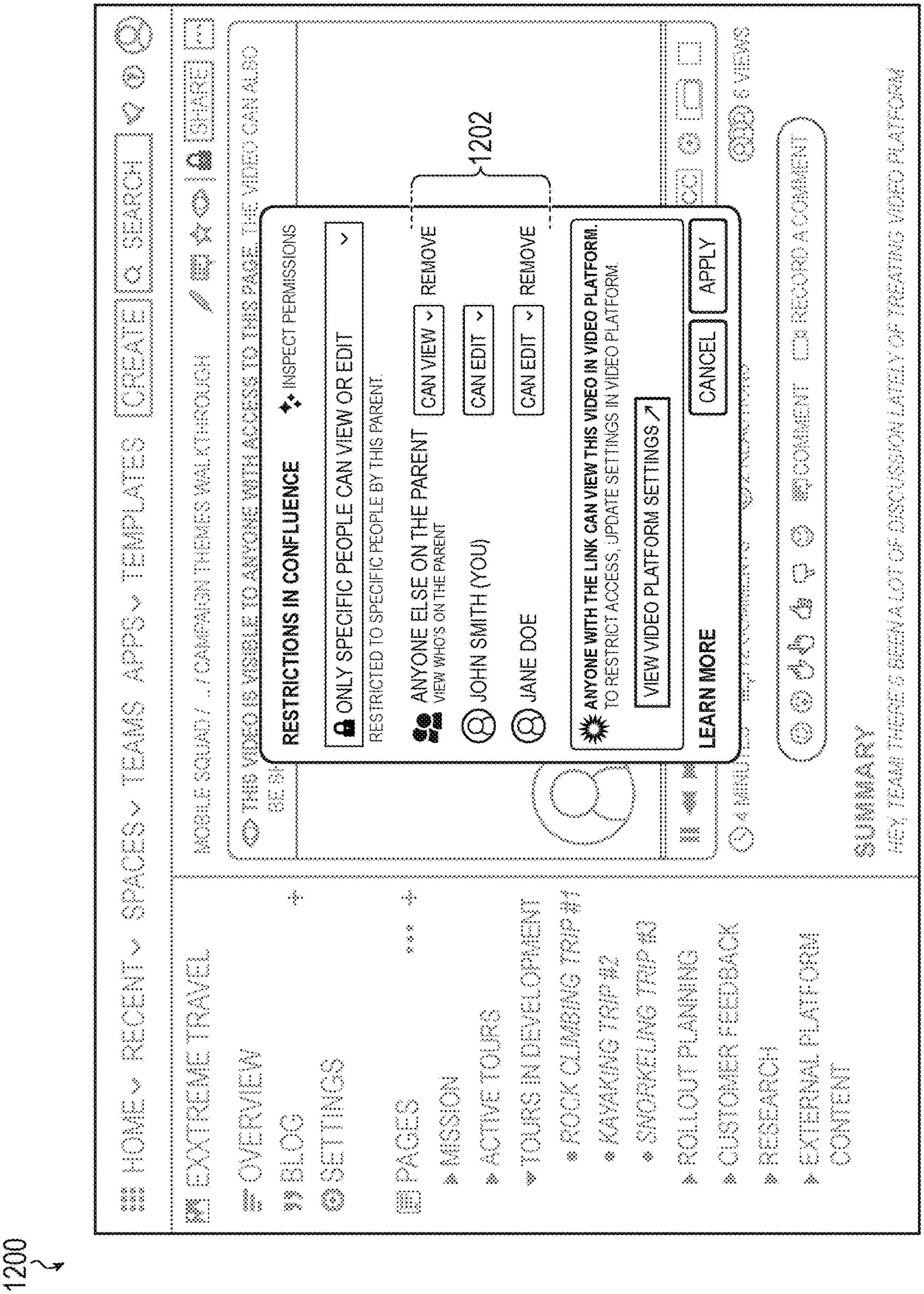
FIG. 12 depicts an example user interface for editing permissions in respect of a third-party embedded screen recording/screen capture video object displayed in a content collaboration interface.
Figure 13:
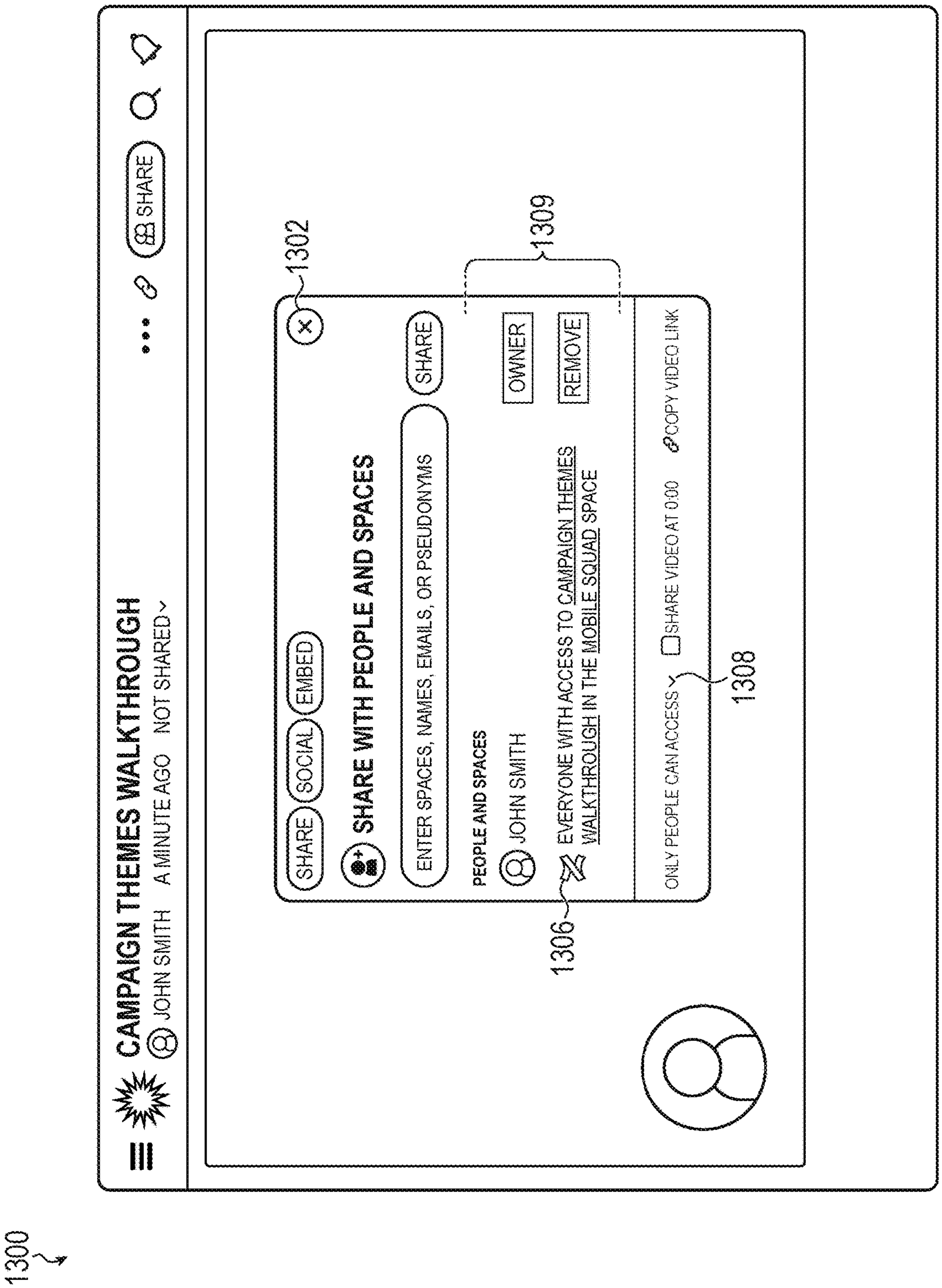
FIG. 13 depicts an example user interface of a third party content sharing platform.
Figure 14:
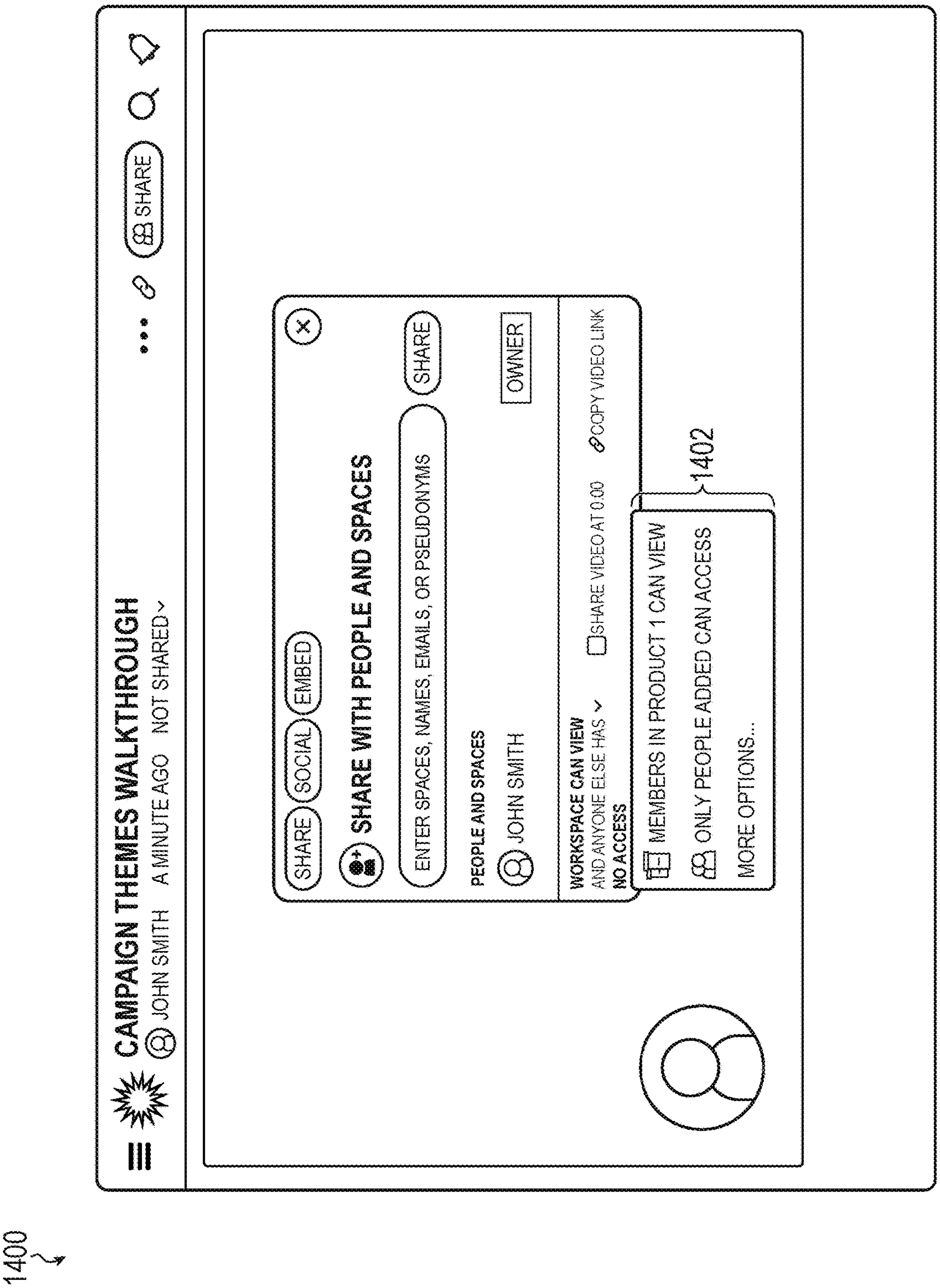
FIG. 14 depicts an example permissions management user interface of a third party content sharing platform.
Figure 15:
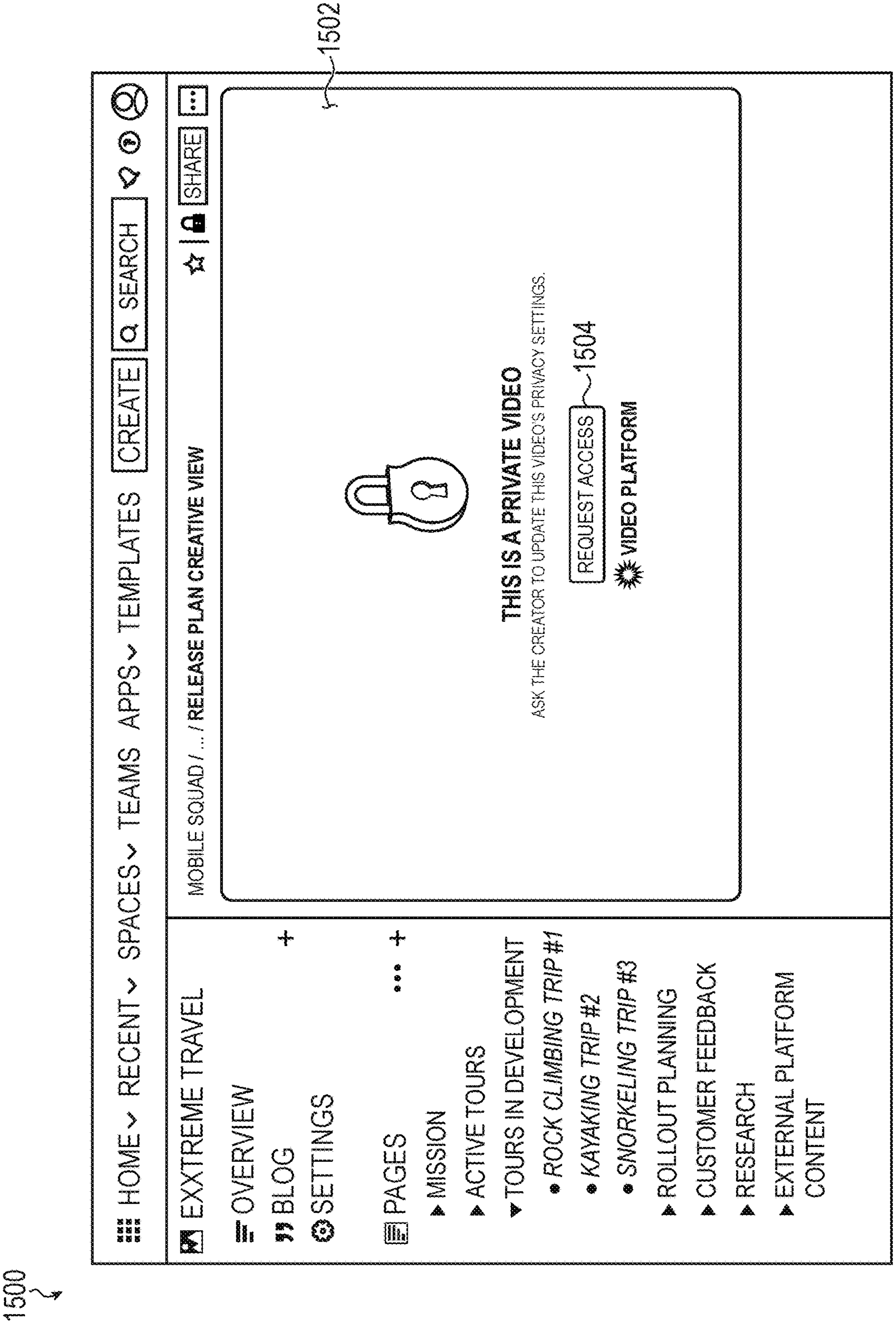
FIG. 15 depicts an example user interface for blocking access to content given a permissions mismatch between a content collaboration interface and a third party content sharing platform.

Upon selection of the dropdown menu 1104, the user may be presented with various options for modifying permissions of the current page and/or the embedded media. FIG. 12 depicts an example user interface/modal dialog showing affordances 1202 that can be used by a user for editing permissions in respect of the third-party embedded screen recording/screen capture video object displayed in a content collaboration interface. In other cases, such as noted above, a user may engage the option to manage permissions for embedded objects within the third party platform. FIG. 13 depicts an example user interface 1300 of a third party content sharing platform, depicting a modal dialog 1302 depicting options for modifying permissions in respect of one or more user group identifiers, such as the user group identifier affordance/user interface element 1306. With such an interface, a user or admin of the third-party system can manage permissions associated with the content separate from the collaboration tool page in which the content itself is embedded. For example, the user may be presented with a dropdown menu 1308 option to modify current permissions shown for the user in the user group identifier affordance/user interface element 1306. Upon selecting options of the dropdown menu 1308, the user may be presented with a dialog such as shown in FIG. 14, which depicts an example permissions management user interface 1400 of the third party content sharing platform, including a set of options 1402 for managing permissions in respect of content that is embedded in a collaboration platform as described herein.

As with other embodiments described herein, authentication between the third-party platform and the first part platform (the collaboration platform) can be performed in response to every request to load a page that includes embedded content. In an instance in which authentication fails (e.g., a mismatch between a data item associated with a requesting user and a user group identifier associated with the requested embedded content), an access denial message may be shown, such as depicted in the graphical user interface 1500 of FIG. 15. The access denial message 1502 indicates to the requesting user a permissions failure. The access denial message 1502 can, in some cases, be provided with a option 1504 to request permissions. Upon selection of the "request permissions" affordance, the frontend may submit a request to a permissions manager of either the page or the third-party service. A person of skill in the art may readily appreciate that many notification paradigms are possible for triggering an administrative review or modification of permissions.

These foregoing embodiments depicted in FIGS. 10-15 and the various alternatives thereof and variations thereto are presented, generally, for purposes of explanation, and to facilitate an understanding of various configurations and constructions of a user interface that may be rendered by a frontend of a system that integrates with a by-reference permissions architecture, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 16:
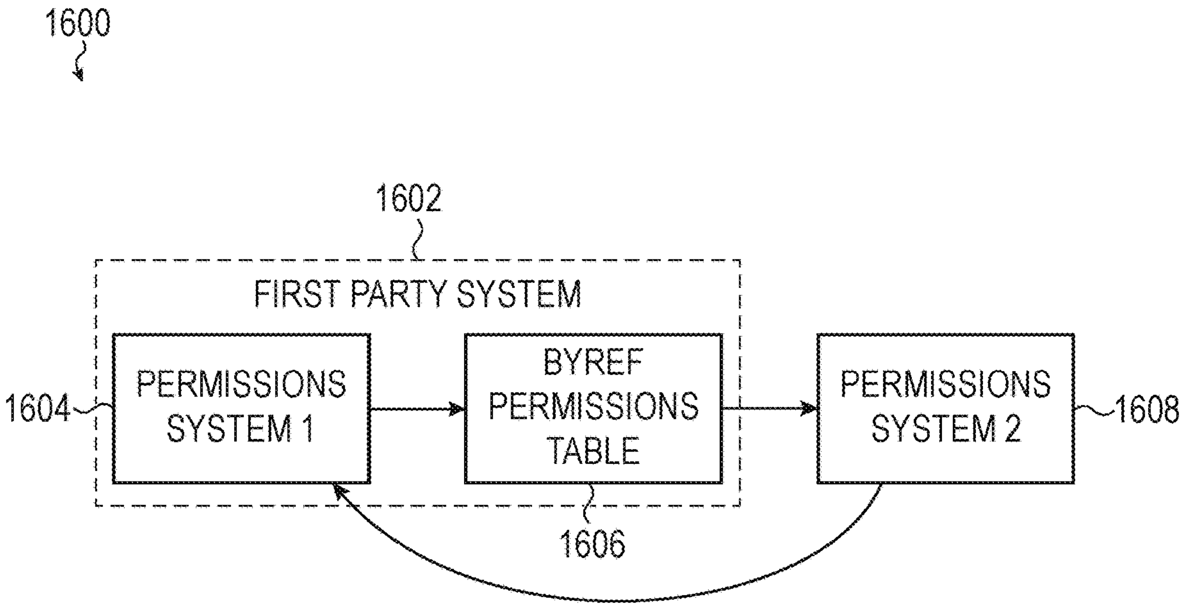
FIG. 16 depicts a system diagram of a permissions by reference architecture to manage permissions across multiple platforms.

For example, generally and broadly, that the architecture described herein relates to coupling a group-level permission of one system with a group-level permission of another system. FIG. 16 depicts a system diagram of a permissions by reference architecture to manage permissions across multiple platforms. In particular, the system 1600 includes a first system 1602 that is/can be communicably coupled to a second system. The first system 1602, in particular, includes a first permissions manager 1604 and a by-reference permissions table 1606. The second system likewise includes a second permissions manager 1608 that can be configured to communicably couple to and/or exchange information with the first permissions manager 1604. As noted above, the second permissions manager 1608 can be configured to receive a data item from an iframe-originating request (e.g., a request for content embedding in another page). The data item corresponds to a user of the first system 1602. In response, the second permissions manager 1608 can generate an authentication request of the first permissions manager 1604 to determine whether the requested content (e.g., a user group identifier, as described above, associated to the requested content) is associated with the provided data item. In response the first permissions manager 1604 can access the by-reference permissions table 1606 to determine if such an association exists. If the association exists, the first permissions manager 1604 can transmit an authentication response to the second permissions manager 1608 that includes a token or other data structure suitable to authorize the second permissions manager 1608 to service content to the original iframe requester. In some cases, the iframe requester may be triggered to reload via a websocket instruction whereas in other cases, an affordance asking the user to reload the page may be presented. In yet other cases, the request from the iframe may be deferred until an authentication decision is made such that only a single request is made for the content from the first system 1602.

Figure 17:
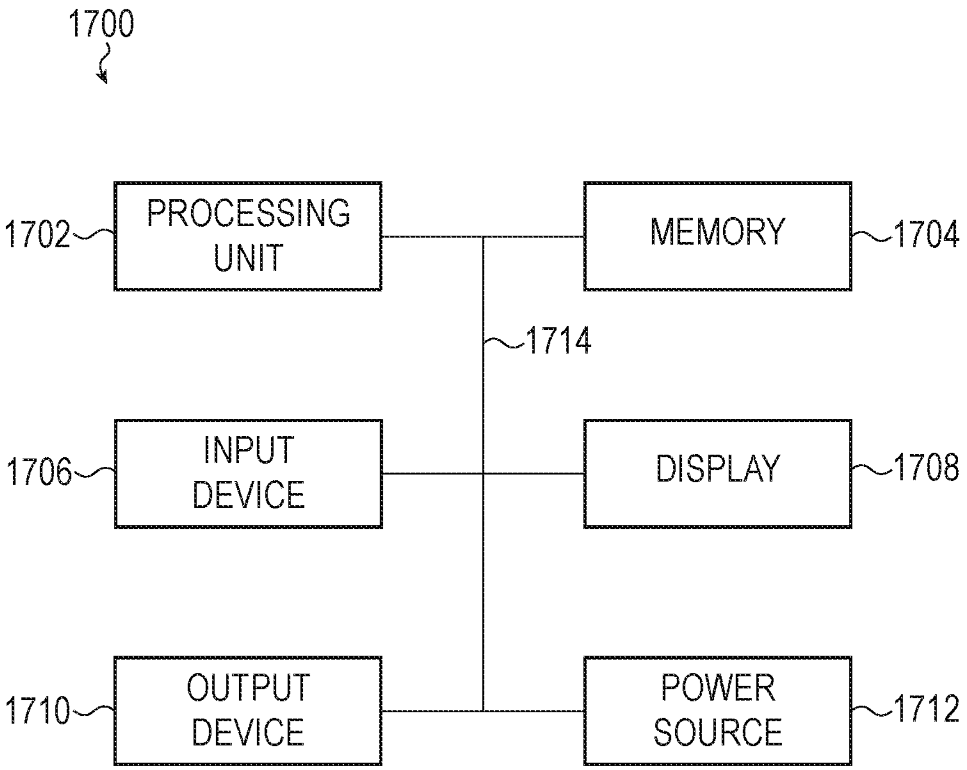
FIG. 17 illustrates a sample electrical block diagram of an electronic device 1700 that may perform the operations described herein.

FIG. 17 illustrates a sample electrical block diagram of an electronic device 1700 that may perform the operations described herein. The electronic device 1700 may in some cases take the form of any of the electronic devices described with reference to FIGS. 1-3, including client devices 104 and/or servers or other computing devices associated with the networked computer system 100 (e.g., the application platform 102, software applications 112, the remote source page generation service 110, remote content sources 108, etc.). The electronic device 1700 can include one or more of a display 1708, a processing unit 1702, a power source 1712, a memory 1704 or storage device, input devices 1706, and output devices 1710. In some cases, various implementations of the electronic device 1700 may lack some or all of these components and/or include additional or alternative components.

The processing unit 1702 can control some or all of the operations of the electronic device 1700. The processing unit 1702 can communicate, either directly or indirectly, with some or all of the components of the electronic device 1700. For example, a system bus or other communication mechanism 1714 can provide communication between the processing unit 1702, the power source 1712, the memory 1704, the input device(s) 1706, and the output device(s) 1710.

The processing unit 1702 can be implemented as any electronic device capable of processing, receiving, or transmitting data or instructions. For example, the processing unit 1702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1700 can be controlled by multiple processing units. For example, select components of the electronic device 1700 (e.g., an input device 1706) may be controlled by a first processing unit and other components of the electronic device 1700 (e.g., the display 1708) may be controlled by a second processing unit, where the first and second processing units may or may not be in communication with each other.

The power source 1712 can be implemented with any device capable of providing energy to the electronic device 1700. For example, the power source 1712 may be one or more batteries or rechargeable batteries. Additionally or alternatively, the power source 1712 can be a power connector or power cord that connects the electronic device 1700 to another power source, such as a wall outlet.

The memory 1704 can store electronic data that can be used by the electronic device 1700. For example, the memory 1704 can store electronic data or content such as, for example, audio and video files, documents and applications, device settings and user preferences, timing signals, control signals, and data structures or databases. The memory 1704 can be configured as any type of memory. By way of example only, the memory 1704 can be implemented as random access memory, read-only memory, Flash memory, removable memory, other types of storage elements, or combinations of such devices.

In various embodiments, the display 1708 provides a graphical output, for example associated with an operating system, user interface, and/or applications of the electronic device 1700 (e.g., a graphical user interface associated with a content collaboration system, which may include graphical elements related to displaying documents, receiving document creation requests, receiving and displaying user-generated modifications of documents, displaying a workspace and/or document hierarchy, etc.). In one embodiment, the display 1708 includes one or more sensors and is configured as a touch-sensitive (e.g., single-touch, multi-touch) and/or force-sensitive display to receive inputs from a user. For example, the display 1708 may be integrated with a touch sensor (e.g., a capacitive touch sensor) and/or a force sensor to provide a touch- and/or force-sensitive display. The display 1708 is operably coupled to the processing unit 1702 of the electronic device 1700.

The display 1708 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1708 is positioned beneath and viewable through a cover that forms at least a portion of an enclosure of the electronic device 1700.

In various embodiments, the input devices 1706 may include any suitable components for detecting inputs. Examples of input devices 1706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1706 may be configured to detect one or more particular types of input and provide a signal (e.g., an input signal) corresponding to the detected input. The signal may be provided, for example, to the processing unit 1702.

As discussed above, in some cases, the input device(s) 1706 include a touch sensor (e.g., a capacitive touch sensor) integrated with the display 1708 to provide a touch-sensitive display. Similarly, in some cases, the input device(s) 1706 include a force sensor (e.g., a capacitive force sensor) integrated with the display 1708 to provide a force-sensitive display.

The output devices 1710 may include any suitable components for providing outputs. Examples of output devices 1710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1710 may be configured to receive one or more signals (e.g., an output signal provided by the processing unit 1702) and provide an output corresponding to the signal.

In some cases, input devices 1706 and output devices 1710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1702 may be operably coupled to the input devices 1706 and the output devices 1710. The processing unit 1702 may be adapted to exchange signals with the input devices 1706 and the output devices 1710. For example, the processing unit 1702 may receive an input signal from an input device 1706 that corresponds to an input detected by the input device 1706. The processing unit 1702 may interpret the received input signal to determine whether to provide and/or change one or more outputs in response to the input signal. The processing unit 1702 may then send an output signal to one or more of the output devices 1710, to provide and/or change outputs as appropriate.

Figure 18:
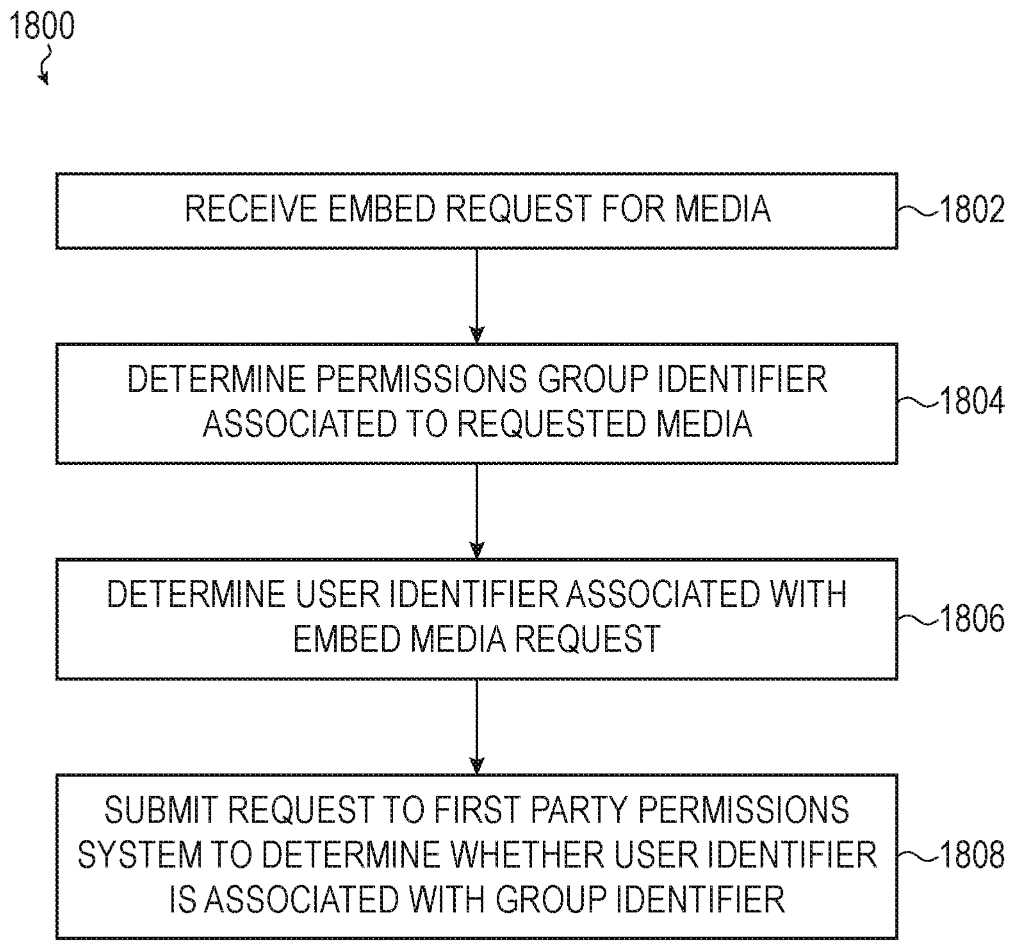
FIG. 18 is a flow chart corresponding to a method of managing permissions to access secure content across multiple software platforms.

FIG. 18 is a flow chart corresponding to a method of managing permissions to access secure content across multiple software platforms. A device such as described in respect of FIG. 17 may be tasked with executing the method of FIG. 18 in whole or part. In other cases, the method of FIG. 18 can be performed in whole or in part by a server or a backend application instance as described herein. The method 1800 includes operation 1802 at which a request for embedded media may be made by a frontend application instance. At operation 1804, a backend application instance may determine a group identifier, such as a user group identifier, that is associated with the requested content. Next, at operation 1806, user data may be determined and/or extracted from a data item associated with a prior authentication operation. The data item may include an email address, a user name, a user account, or the like. Finally, at operation 1808, a request may be made to a permissions system to determine whether the data item is associated with the determined user group identifier.

Figure 19:
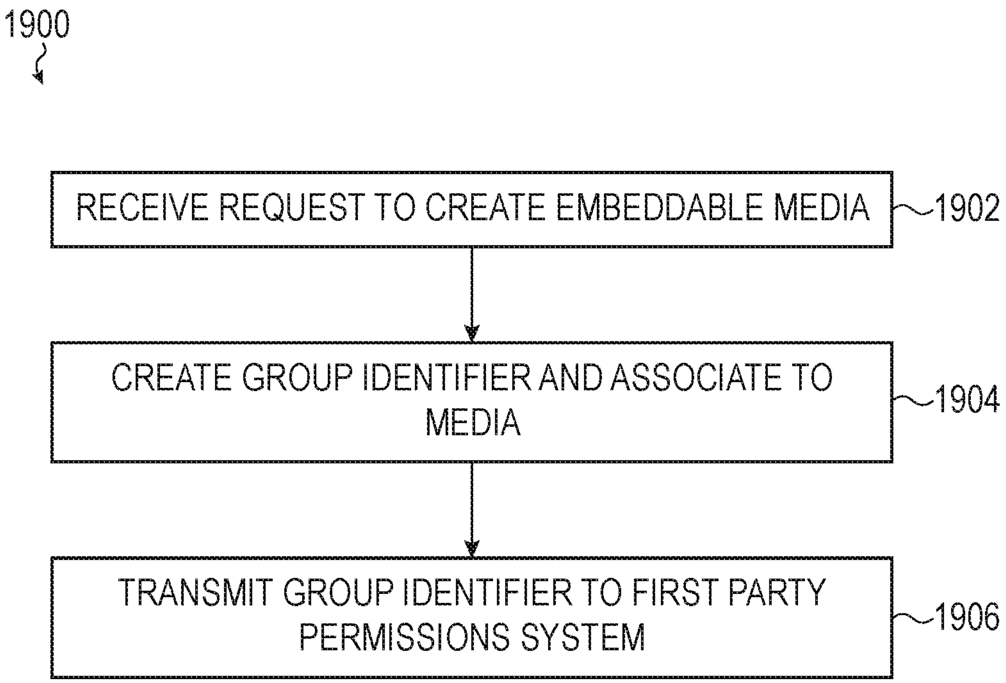
FIG. 19 is a flow chart corresponding to example operations of a method of creating a by reference permissions association between entities of a first platform and a second platform.

FIG. 19 is a flow chart corresponding to example operations of a method of creating a by reference permissions association between entities of a first platform and a second platform. In this instance, the method 1900 can be performed by a backend application instance of a first party system, such as a collaboration tool as described herein. Alternatively the method may be performed in whole or in part by a backend application instance of a third-party system as described herein (e.g., a screen capture platform). The method includes operation 1902 at which a request to create embeddable media is received. Next at operation 1904, a group identifier can be created and associated to the newly-created embeddable media. Finally at operation 1906, the newly-created group identifier can be transmitted to a first party system or more generally another backend application, to be associated with a user group or a permissions set of the page into which the newly-created content is embedded.

As used herein, the term "computing resource" or "resource allocation" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

In particular, the term "processor" and similar phrases refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Additionally, as described herein, the term "memory" refers to any software and/or hardware-implemented data storage device or circuit physically and/or structurally configured to store data in a non-transitory or otherwise nonvolatile, durable manner. This term is meant to encompass memory devices, memory device arrays (e.g., redundant arrays and/or distributed storage systems), electronic memory, magnetic memory, optical memory, and so on.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

More broadly, it may be further appreciated that a request-response RESTful system implemented in whole or in part over cloud infrastructure is merely one example architecture of a system as described herein. More broadly, a system as described herein can include a frontend and a backend configured to communicably couple and to cooperate in order to execute one or more operations or functions as described herein. In particular, a frontend may be an instance of software executing by cooperation of a processor and memory of a client device. Similarly, a backend may be an instance of software and/or a collection of instantiated software services (e.g., microservices) each executing by cooperation of a processor resource and memory resources allocated to each respective software service or software instance. Backend software instances can be configured to expose one or more endpoints that frontend software instances can be configured to leverage to exchange structured data with the backend instances. The backend instances can be instantiated over first-party or third-party infrastructure which can include one or more physical processors and physical memory devices. The physical resources can cooperate to abstract one or more virtual processing and/or memory resources that in turn can be used to instantiate the backend instances.

The backend and the frontend software instances can communicate over any suitable communication protocol or set of protocols to exchange structured data. The frontend can, in some cases, include a graphical user interface rendered on a display of a client device, such as a laptop computer, desktop computer, or personal phone. In some cases, the frontend may be a browser application and the graphical user interface may be rendered by a browser engine thereof in response to receiving HTML served from the backend instance or a microservice thereof.

Unless otherwise stated, the terms "include" and "comprise" (and variations thereof such as "including", "includes", "comprising", "comprises", "comprised" and the like) are used inclusively and do not exclude further features, components, integers, steps, or elements.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

It will be understood that the embodiments disclosed and defined in this specification extend to alternative combinations of two or more of the individual features mentioned in or evident from the text or drawings. All of these different combinations constitute alternative embodiments of the present disclosure.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Finally, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method comprising, in a content collaboration platform managing a plurality of electronic documents:

causing a client computer to display a graphical user interface including:

a content panel operating a content editor configured to receive user-generated content and store the user-generated content as an electronic document in the content collaboration platform; and a navigational panel including a hierarchical element tree, the hierarchical element tree comprising a plurality of hierarchically arranged selectable elements, each respective selectable element being selectable to cause display of respective document content of a respective electronic document;

in response to receiving a command to create a video object for embedding in the content panel, invoking a video-creation service hosted by an external platform and causing display of a video-creation window overlaying the graphical user interface of the content collaboration platform, the video-creation window comprising:

a content region comprising at least a portion of the content panel;

a user video region showing a video preview of a user of the client computer, the user video region overlayed with the content region; and a first selectable option configured to initiate a recording session for the video object;

in response to a command indicating an end of the recording, causing display of the video object in an editing interface, the editing interface comprising a second selectable option to edit the video object and a third selectable option to embed the video object in a content page of the content collaboration platform; and in response to a user selection of the third selectable option, causing the video object to be embedded in the user-generated content of the electronic document displayed in the content panel.

2. The method of claim 1, wherein initiating the recording session for the video object comprises accessing a content processing engine from the external platform accessible to the content collaboration platform, the content processing engine configured to generate the video object at the external platform.

3. The method of claim 2, wherein, in response to the user selection of the third selectable option, causing the video object to be saved at the external platform.

4. The method of claim 2, wherein the video object is formatted in accordance with a platform-specific data structure format defined by the external platform.

5. The method of claim 1, wherein:

the user video region is configured as a movable content object within the video-creation window; and in response a user selection of the user video region, the video-creation service is configured to move the user video region to a different location with respect to the content region.

6. The method of claim 1, wherein in response to a user selection of the second selectable option to edit the video object, instantiating the editing interface for the video object at a content processing engine managed by the external platform accessible to the content collaboration platform, the content processing engine configured to provide one or more editing tools for modifying the video object.

7. The method of claim 1, wherein:

the video-creation window comprises an option for selecting a source for the content region; and in response to detecting a user selection of a content source at the option for selecting the source, causing a corresponding content object to be displayed at the content region.

8. The method of claim 1, further comprising, while the video object is displayed in the content panel, and in response to a request to edit content displayed in the content panel:

transitioning the content panel from a view mode to an edit mode;

receiving a modification to the video object in the content panel; and storing the modification to the video object.

9. A method comprising, in a content collaboration platform managing a plurality of electronic documents:

causing a client computer to display a graphical user interface including:

a content panel operating a content editor configured to receive user-generated content and store the user-generated content as an electronic document in the content collaboration platform; and a navigational panel including a hierarchical element tree, the hierarchical element tree comprising a plurality of hierarchically arranged selectable elements, each respective selectable element being selectable to cause display of respective document content of a respective electronic document;

in response to receiving a command to select a video object managed by an external platform, invoking a video-insert service hosted by the external platform and causing display of a video-selection window overlaying the graphical user interface of the content collaboration platform, the video-selection window comprising:

a text input region;

content service selection element; and a results region that is configured to display a set of video objects obtained from a search query that is performed on the external platform, the search query generated using text inputs received at the text input region and a content type indicated by the content service selection element;

in response to receiving a selection of a video object of the set of video objects:

generating a collaboration page including the video object embedded with the user-generated content of the electronic document displayed in the content panel; and causing a selectable element associated with the collaboration page to be displayed in the hierarchical element tree; and in response to receiving a selection of the selectable element, causing the collaboration page including the video object to be displayed on the client computer.

10. The method of claim 9, wherein generating the collaboration page comprises:

extracting a title from the video object; and assigning the title from the video object as a title of the collaboration page.

11. The method of claim 10, further comprising:

receiving a user-generated title for the video object; and replacing the assigned title of the video object with the user-generated title.

12. The method of claim 9, further comprising:

while the video object is displayed in the content panel:

receiving user-generated content for display with the video object; and storing the user-generated content in association with the video object.

13. The method of claim 12, wherein the user-generated content is at least one of a title, a text comment, or an image.

14. The method of claim 9, further comprising, in response to a user input moving the selectable element associated with the collaboration page to a different position within the displayed hierarchical element tree, changing a hierarchical relationship between the collaboration page and other collaboration pages in the content collaboration platform.

15. The method of claim 9, wherein the search query is generated by the content collaboration platform and performed on the external platform accessible to the content collaboration platform, the external platform comprising a plurality of video objects generated at the external platform.

16. A content collaboration platform comprising:

a content collaboration backend application operating on one or more servers, the content collaboration backend application operably coupled to a frontend application operating on a client device, the content collaboration backend application configured to:

cause display of a graphical user interface on the frontend application operating on the client device, the graphical user interface including:

a content panel operating a content editor configured to receive user-generated content and store the user-generated content as an electronic document in the content collaboration platform; and a navigational panel including a hierarchical element tree, the hierarchical element tree comprising a plurality of hierarchically arranged selectable elements, each respective selectable element being selectable to cause display of respective document content of a respective electronic document;

in response to receiving a command to create a video object for embedding in the content panel, invoke a video-creation service hosted by an external platform and causing display of a video-creation window overlaying the graphical user interface of the content collaboration platform, the video-creation window comprising:

a content region comprising a user selected content object;

a user video region showing a video preview of a user of the client device, the user video region overlayed with the content region; and a first selectable option configured to initiate a recording session for the video object;

in response to detecting an input to the first selectable option, initiate the recording session for the video object, the recording session comprising a video recording of the user video region overlayed with the content region;

in response to a command indicating an end of recording, cause the video object to be embedded in the user-generated content of the electronic document displayed in the content panel.

17. The content collaboration platform of claim 16, wherein initiating the recording session for the video object comprises accessing a content processing engine from the external platform accessible to the content collaboration platform, the content processing engine configured to generate the video object at the external platform.

18. The content collaboration platform of claim 16, wherein:

the video-creation window comprises an option for selecting a source for the user selected content object; and in response to detecting a user selection of a content source at the option for selecting the source, causing a corresponding content object to be displayed in the content region.

19. The content collaboration platform of claim 16, wherein the user selected content object comprises a second collaboration page managed by the content collaboration platform.

20. The content collaboration platform of claim 16, wherein:

the user video region is configured as a movable content object within the video-creation window; and in response a user selection of the user video region, the video-creation service is configured to cause the user video region to move to a different location with respect to the content region.

* * * * *